US011080915B2

(12) United States Patent
Chang et al.

(10) Patent No.: US 11,080,915 B2
(45) Date of Patent: *Aug. 3, 2021

(54) GESTURE BASED CONTROLS FOR ADJUSTING DISPLAY AREAS

(71) Applicant: Apple Inc., Cupertino, CA (US)

(72) Inventors: Jae Woo Chang, San Jose, CA (US); Sean P. O'Brien, San Francisco, CA (US); Stephen O. Lemay, San Francisco, CA (US); Marcel van Os, Santa Cruz, CA (US); Usama M. Hajj, San Francisco, CA (US); Ryan D. Shelby, Mountain View, CA (US); Megan M. Frost, San Francisco, CA (US)

(73) Assignee: Apple Inc., Cupertino, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/901,373

(22) Filed: Jun. 15, 2020

(65) Prior Publication Data

US 2020/0312001 A1    Oct. 1, 2020

Related U.S. Application Data

(63) Continuation of application No. 15/275,224, filed on Sep. 23, 2016, now Pat. No. 10,733,776.

(Continued)

(51) Int. Cl.
 *G06T 11/60* (2006.01)
 *G06F 3/0482* (2013.01)
 (Continued)

(52) U.S. Cl.
 CPC ............ *G06T 11/60* (2013.01); *G01C 21/367* (2013.01); *G01C 21/3664* (2013.01);
 (Continued)

(58) Field of Classification Search
 CPC ....... G06T 11/60; G06T 3/40; G06T 2200/24; G01C 21/3664; G01C 21/3667;
 (Continued)

(56) References Cited

U.S. PATENT DOCUMENTS 8,104,048 B2   1/2012   Jalon et al.
8,555,203 B1   10/2013  Jin et al.
(Continued)

OTHER PUBLICATIONS

Chris Davies, "New Google Maps exits preview with features for all", posted Feb. 19, 2014, https://www.slashgear.com/new-google-maps-exits-preview-with-features-for-all-19317444/.

(Continued)

*Primary Examiner* — Tadesse Hailu
*Assistant Examiner* — Darrin Hope
(74) *Attorney, Agent, or Firm* — Invoke

(57) ABSTRACT

Some embodiments of the invention provide a map application with novel map exploration tools. In some embodiments, the map application executes on a mobile device (e.g., a handheld smartphone, a tablet, etc.) with a touch sensitive screen. The map application of some embodiments has a first display area to display a map of a region, and second and third display areas to display information about items displayed on the map in the first display area. In some embodiments, the second display area slides over the first display area to overlap at least a portion of the first display area. After the second display area slides over the first display area, the third display area in some embodiments slides over the first display area to overlap at least a portion of the first display area. In some embodiments, the second and third display areas slide over the first display area from one side of the first display area. This side is the bottom of the first display area in some embodiments. In some embodiments, the bottom side is expected to be closer to a position for resting the mobile device in a hand of a user than a top (Continued)

side of the first display area. Accordingly, in some embodiments, the second and third display areas slide up from the bottom side of the first display area so that information and/or controls that are provided in these display areas are more accessible for one handed operations (e.g., thumb-based touch operations) of the user as the user hold and interacts with the device with one hand.

17 Claims, 31 Drawing Sheets

Related U.S. Application Data

(60) Provisional application No. 62/358,083, filed on Jul. 4, 2016, provisional application No. 62/349,014, filed on Jun. 12, 2016.

(51) Int. Cl.
| | |
|---|---|
| *G06F 3/0488* | (2013.01) |
| *G06F 3/14* | (2006.01) |
| *G01C 21/36* | (2006.01) |
| *G06T 3/40* | (2006.01) |
| *G06F 3/0485* | (2013.01) |
| *G09G 5/14* | (2006.01) |
| *G09G 5/377* | (2006.01) |
| *G06F 3/0484* | (2013.01) |
| *G09G 5/34* | (2006.01) |
| *G06F 3/0346* | (2013.01) |

(52) U.S. Cl.
CPC ....... *G01C 21/3667* (2013.01); *G06F 3/0482* (2013.01); *G06F 3/0485* (2013.01); *G06F 3/0488* (2013.01); *G06F 3/04847* (2013.01); *G06F 3/04883* (2013.01); *G06F 3/14* (2013.01); *G06T 3/40* (2013.01); *G09G 5/14* (2013.01); *G09G 5/377* (2013.01); *G06F 3/0346* (2013.01); *G06F 2200/1637* (2013.01); *G06F 2203/04803* (2013.01); *G06F 2203/04806* (2013.01); *G06T 2200/24* (2013.01); *G09G 5/346* (2013.01); *G09G 2320/08* (2013.01); *G09G 2340/12* (2013.01)

(58) Field of Classification Search
CPC . G01C 21/367; G06F 3/0482; G06F 3/04847; G06F 3/0485; G06F 3/0488; G06F 3/04883; G06F 3/14; G06F 3/0346; G06F 2200/1637; G06F 2203/04803; G06F 2203/04806; G09G 5/14; G09G 5/377; G09G 5/346; G09G 2320/08; G09G 2340/12

USPC ........................................................ 715/798
See application file for complete search history.

(56) References Cited

U.S. PATENT DOCUMENTS

| | | |
|---|---|---|
| 9,021,384 B1 | 4/2015 | Beard et al. |
| 9,135,751 B2 | 9/2015 | Moore et al. |
| 9,140,571 B2 | 9/2015 | Sugiyama et al. |
| 9,207,093 B2 | 12/2015 | Barrett et al. |
| 9,303,997 B2 | 4/2016 | McGavran et al. |
| 2004/0243307 A1 | 12/2004 | Geelen |
| 2010/0026526 A1 | 2/2010 | Yokota |
| 2010/0058212 A1 | 3/2010 | Belitz et al. |
| 2010/0191798 A1 | 7/2010 | Seefeld et al. |
| 2011/0106429 A1 | 5/2011 | Poppen et al. |
| 2012/0072953 A1 | 3/2012 | James et al. |
| 2012/0223890 A1 | 9/2012 | Borovsky et al. |
| 2012/0278756 A1 | 11/2012 | Shah et al. |
| 2013/0050131 A1 | 2/2013 | Lee et al. |
| 2013/0145295 A1 | 6/2013 | Bocking et al. |
| 2013/0151149 A1 | 6/2013 | Kristinsson et al. |
| 2013/0325839 A1 | 12/2013 | Goddard et al. |
| 2013/0326407 A1 | 12/2013 | Van et al. |
| 2014/0040959 A1 | 2/2014 | Oyman Ozgur |
| 2014/0096092 A1 | 4/2014 | Johnson |
| 2014/0129387 A1 | 5/2014 | Kardell |
| 2014/0137036 A1* | 5/2014 | Han ................... G06F 3/0482 715/798 |
| 2014/0240364 A1 | 8/2014 | Ishikawa |
| 2014/0280180 A1 | 9/2014 | Edecker et al. |
| 2014/0310655 A1 | 10/2014 | Sims |
| 2014/0358411 A1 | 12/2014 | Khoe et al. |
| 2014/0365123 A1 | 12/2014 | Carlhian et al. |
| 2014/0365944 A1 | 12/2014 | Moore et al. |
| 2014/0372218 A1 | 12/2014 | Talluri et al. |
| 2015/0054842 A1 | 2/2015 | Cornell |
| 2015/0066165 A1 | 3/2015 | Everette et al. |
| 2015/0074596 A1 | 3/2015 | Djabarov et al. |
| 2015/0088411 A1 | 3/2015 | Foster et al. |
| 2015/0178397 A1 | 6/2015 | Garg et al. |
| 2015/0187127 A1 | 7/2015 | Jones et al. |
| 2015/0241225 A1 | 8/2015 | Liu et al. |
| 2015/0309689 A1 | 10/2015 | Jin et al. |
| 2016/0062616 A1 | 3/2016 | Lee et al. |
| 2016/0062955 A1 | 3/2016 | Maertens et al. |
| 2016/0069699 A1 | 3/2016 | Chen et al. |
| 2016/0259528 A1 | 9/2016 | Foss et al. |
| 2017/0303088 A1 | 10/2017 | Spears et al. |
| 2017/0344246 A1 | 11/2017 | Burfitt |

OTHER PUBLICATIONS

NSM, "MSN did it with its new maps service", Posted on Nov. 19, 2006, https://www.search3w.com/msn-did-it-with-its-new-maps-service/.

* cited by examiner

GESTURE BASED CONTROLS FOR ADJUSTING DISPLAY AREAS

INCORPORATION BY REFERENCE; DISCLAIMER

Each of the following applications are hereby incorporated by reference: application Ser. No. 15/275,224 filed on Sep. 23, 2016; application No. 62/358,083 filed on Jul. 4, 2016; application No. 62/349,014 filed on Jun. 12, 2016. The Applicant hereby rescinds any disclaimer of claim scope in the parent application(s) or the prosecution history thereof and advises the USPTO that the claims in this application may be broader than any claim in the parent application(s).

BACKGROUND

With proliferation of mobile devices (such as smartphones), numerous mobile-device applications have been developed to assist users with many of their daily activities. Map and navigation applications are one type of such applications. However, many of the applications today do not have optimal controls for one handed operations by their users. This is especially the case for applications that execute on smartphones with larger screen sizes.

SUMMARY

Some embodiments of the invention provide a map application with novel map exploration tools. In some embodiments, the map application executes on a mobile device (e.g., a handheld smartphone) with a touch sensitive screen. The map application of some embodiments has a first display area to display a map of a region, and second and third display areas to display information about items displayed on the map in the first display area. The map application allows the map in the first display area to be adjusted through pan and zoom operations (e.g., that are performed through gestural touch input received through the touch sensitive screen of the mobile device).

In some embodiments, the second display area slides over the first display area to overlap at least a portion of the first display area. After the second display area slides over the first display area, the third display area in some embodiments slides over the first display area to overlap at least a portion of the first display area. In some embodiments, the third display area slides over the first display area by sliding over the second display area while the second display area at least partially overlaps the first display area. In other embodiments, the second display area slides off the first display area, before the third display area slides over the first display area.

Also, in some embodiments, the second and third display areas slide over the first display area from one side of the first display area. This side is the bottom of the first display area in some embodiments. In some embodiments, the bottom side is expected to be closer to a position for resting the mobile device in a hand of a user than a top side of the first display area. Accordingly, in some embodiments, the second and third display areas slide up from the bottom side of the first display area so that information and/or controls that are provided in these display areas are more accessible for one handed operations (e.g., thumb-based touch operations) of the user as the user holds and interacts with the device with one hand.

In some embodiments, the second and third display areas appear as cards that slide over the first display area (e.g., with the second card initially sliding over the first display area, and after an input, the third display area subsequently sliding over the second display area). These cards in some embodiments include information about locations contained in the map displayed in the first display area, and/or controls for performing operations with respect to these locations (e.g., performing searches with respect to these locations, obtaining information about these locations, identifying routes to these locations, providing navigation presentations for these locations, etc.).

In some embodiments, the second display area is a search card with a search field for receiving a search parameter, and a list area for displaying a list of locations. When no search parameter is entered in the search field, the search display area provides a list of locations that includes search parameters previously entered in the search field, as well as predicted destinations for the device. After receiving a search parameter (e.g., for Coffee Shops) through the search field, the map application displays in the search card a list of locations (e.g., a list of coffee shops) that are associated with the search parameter, and displays identifiers on the map to identify the position of the listed locations (e.g., the position of the coffee shops) that are associated with the search parameter.

In some embodiments, the third display area is a location card that provides information about a particular location identified on the map. This location card in some embodiments provides information about the particular location after the location is selected from the list displayed in the second display area. In some embodiments, the location card also provides information about the particular location after the identifier for the location is selected on the map.

In other embodiments, the third display area is a route planning card that displays information and controls for planning a route to a particular location displayed on the map presented in the first display area. The map application in some embodiments can transition from the search card to the route planning card for each location identified through the search card (e.g., each location listed in the search card or each location identified by an identifier on the map that is displayed in response to a search). On the other hand, for some locations, the map application in some embodiments can only transition from the search card to location cards of these locations, before transitioning from their location cards to their route planning cards. In yet other embodiments, the map application cannot transition between the search card and the route planning card for any location without first going through the location card for that location.

In some embodiments, the map application not only sequentially presents the different cards, but requires the user to sequentially remove cards when the user wants to go back to an earlier card. The map application in these embodiment requires this sequential back trace in order to maintain the card-based design cue through the user interaction. In other embodiments, the map application provides a control on a later presented card to skip over one or more intermediate cards that are between the later presented card and an earlier presented card Also, in the embodiments that allow the cards to transition from a search card to a route planning card without first viewing an information card for a location, the map application provides a control that allows the user to transition from the route planning card back to the search card.

In some embodiments, each of the cards has four display states, which are a minimized state, an intermediate state, a maximized state, and an off-screen state. In other embodiments, these cards do not have an off-screen state, and thereby only have three display states: the minimized state, the intermediate state, and the maximized state. In these embodiments, the map application displays one of the cards in one of its states at all times, with the minimized search card being the default card during map browsing when no other card is open. Several examples illustrated in the figures and described below use all four display states. However, one of ordinary skill will realize that not all of these states (e.g. the off-screen state) are used by the cards of some embodiments of the invention.

In the minimized state, a card displays a small amount of information and/or controls. For example, a search card of some embodiments only presents its search field in the minimized state in some embodiments. When the search field has received a search parameter and the map is displaying the results of a search based on the received search parameter, the search field of the search field displays the search parameter.

In its intermediate state, a card in some embodiments provides more information and/or controls than in the minimized state. Also, the presentation of the information in a card's intermediate state provides a clue in some embodiments that the card has additional information and/or controls that are currently off screen. For example, in some embodiments, some of the information and/or controls that are displayed in the card's intermediate display state are cut off at the card's bottom to imply that there is more information and/or controls off screen. Also, in some embodiments, the height of a card in its intermediate state is selected so that the user can interact with this card's controls with the thumb of the hand that holds the device.

In some embodiments, the user can scroll the card's content while the card is in its intermediate state. In other embodiments, the user cannot scroll through the card's content while the card is in this state. To scroll through this content, the user has to expand the card to its maximized state in these embodiments. In its maximized state, the card displays the most amount of information and/or controls that it can display.

A card also has an off-screen state. In this state, no portion of the card is displayed on the screen. However, from the off-screen state, the map application in some embodiments can present the card (e.g., in its last displayed state or in its intermediate state) based on input from the user. In some embodiments, the card can transition to its off-screen state based on user input. For example, when the card is in its intermediate state, one tap of the map in the first display area causes the card to transition to its minimized state, while two taps of the map cause the card to transition to its off screen state. In some embodiments, a card can transition to its off-screen state though other inputs.

Different embodiments provide different controls for transitioning between minimized, intermediate and maximized display states of a card. In some embodiments, the user can transition between these states by touching the top of the card, and dragging this top to a larger display state (if any) or down to a smaller display state. Also, the user in some embodiments can change the display state of the card by performing a "flick" operation, which entails touching the top of the card and performing a quick up or down drag operation. When the speed or acceleration of the flick operation (i.e., of its drag operation) exceeds a threshold value, this operation in some embodiments can direct the map application to skip the intermediate display state as the card shrinks from its maximized state to its minimized state, or expands from its minimized state to its maximized state.

When the speed or acceleration of the flick operation does not exceed the threshold value, the flick operation in these embodiments direct the map application to stop at the intermediate display state when transitioning from the maximized or minimized state. One of ordinary skill will realize that other embodiments provide other controls for transitioning between these states. One of ordinary skill will also realize that some or all of the cards of some embodiments do not have one or more of the above-described states.

The preceding Summary is intended to serve as a brief introduction to some embodiments of the invention. It is not meant to be an introduction or overview of all-inventive subject matter disclosed in this document. The Detailed Description that follows and the Drawings that are referred to in the Detailed Description will further describe the embodiments described in the Summary as well as other embodiments. Accordingly, to understand all the embodiments described by this document, a full review of the Summary, Detailed Description and the Drawings is needed. Moreover, the claimed subject matters are not to be limited by the illustrative details in the Summary, Detailed Description and the Drawings, but rather are to be defined by the appended claims, because the claimed subject matters can be embodied in other specific forms without departing from the spirit of the subject matters.

BRIEF DESCRIPTION OF DRAWINGS

The novel features of the invention are set forth in the appended claims. However, for purposes of explanation, several embodiments of the invention are set forth in the following figures.

FIG. 16 illustrates a minimized search sidebar, while

DETAILED DESCRIPTION

Figure 1:
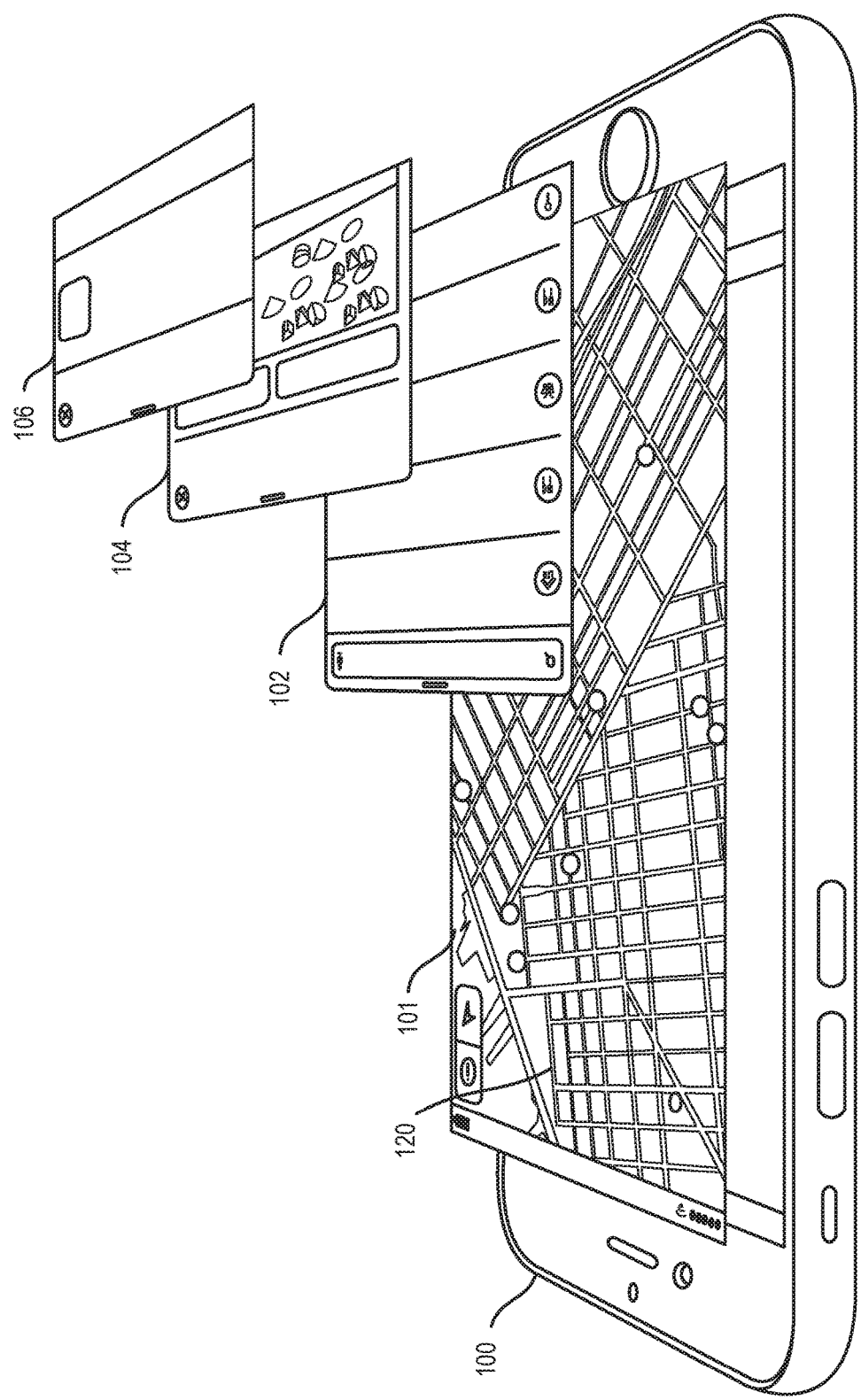
FIGS. 1 and 2 illustrate an example of the card-based design of the map application of some embodiments.

In the following detailed description of the invention, numerous details, examples, and embodiments of the invention are set forth and described. However, it will be clear and apparent to one skilled in the art that the invention is not limited to the embodiments set forth and that the invention may be practiced without some of the specific details and examples discussed.

Some embodiments of the invention provide a map application with novel map exploration tools. In some embodiments, the map application executes on a mobile device (e.g., a handheld smartphone, a tablet, etc.) with a touch sensitive screen. The map application of some embodiments has a first display area to display a map of a region, and second and third display areas to display information about items displayed on the map in the first display area.

In some embodiments, the second display area slides over the first display area to overlap at least a portion of the first display area. After the second display area slides over the first display area, the third display area in some embodiments slides over the first display area to overlap at least a portion of the first display area. In some embodiments, the third display area slides over the first display area by sliding over the second display area while the second display area at least partially overlaps the first display area. In other embodiments, the second display area slides off the first display area, before the third display area slides over the first display area.

Also, in some embodiments, the second and third display areas slide over the first display area from one side of the first display area. This side is the bottom of the first display area in some embodiments. In some embodiments, the bottom side is expected to be closer to a position for resting the mobile device in a hand of a user than a top side of the first display area. Accordingly, in some embodiments, the second and third display areas slide up from the bottom side of the first display area so that information and/or controls that are provided in these display areas are more accessible for one handed operations (e.g., thumb-based touch operations) of the user as the user holds and interacts with the device with one hand. When the device is flipped upside down, the mobile device of some embodiments rotates the displayed output of all its applications, including the map application, upside down (including the map display area and all the cards that slide over the map display area), because it is expected that the top of the device will now reside in the palm of the user's hand. This rotation of the displayed outputs is a common feature of mobile devices sold by Apple Inc., and it is facilitated by the position sensors of these mobile devices.

In some embodiments, the second and third display areas appear as cards that slide over the first display area (e.g., with the second card initially sliding over the first display area, and after an input, the third display area subsequently sliding over the second display area). These cards in some embodiments include information about locations contained in the map displayed in the first display area, and/or controls for performing operations with respect to these locations (e.g., performing searches with respect to these locations, obtaining information about these locations, identifying routes to these locations, providing navigation presentations for these locations, etc.).

Figure 2:
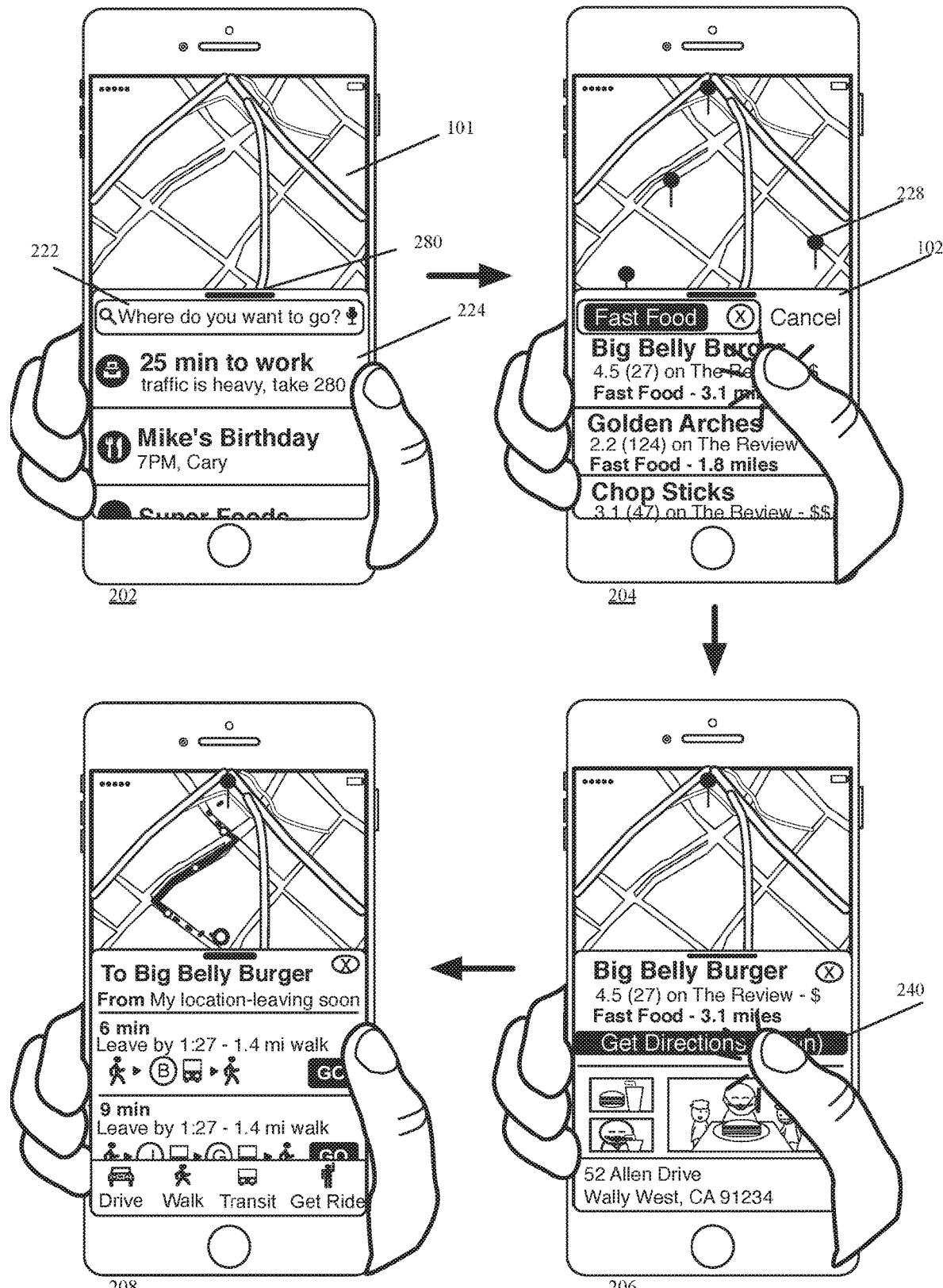

FIGS. 1 and 2 illustrate an example of the card-based design of the map application of some embodiments. In this example, the map application executes on a smartphone 100 with a touch sensitive screen. The card-based design illustrated in these figures has three cards that are in three successive card layers. The three cards are a search card 102, a location information card 104, and a route planning card 106. As shown in FIG. 1, the search card 102 slides over a map display area 101 of the map application that displays a map 120 of a region, the location information card 104 slides over the search card 102, and the route planning card 106 slides over the location information card 104. In some embodiments, the route planning card 106 can also slide over the search card 102 when the map application is directed to perform route planning while displaying the search card.

FIG. 2 illustrates one sequence of operations for stepping through these three cards. These operations are illustrated in terms of four operational stages 202-208 of the map application. The first stage 202 illustrates the displayed output generated by the map application after it opens in some embodiments. When it opens, the map application of some embodiments (1) displays a region (e.g., the current location of the phone 100, or the last region presented by the map application) in the map display area 101, and (2) a partially opened search card 102 with a search field 222 and a list of area 224. The top of the search card has a handle 280 that serves as a visual clue that the top of the search card can be selected for dragging the search card up or down.

The search card 102 is at the bottom of the map display area 101. As further described below, the search card can slide over the display area 101 to assume a maximized position, and slides down or off the map display area 101 to assume a minimized or off-screen position. As further discussed below (e.g., by reference to FIG. 6), each of these positions is referred to below as a display state. Even though in the examples below the cards have an off-screen display state, these cards in other embodiments do not have an off-screen state, and thereby only have three display states: the minimized state, the intermediate state, and the maximized state. In these embodiments, the map application displays one of the cards in one of its states at all times, with the minimized search card being the default card during map browsing when no other card is open. Several examples illustrated in the figures and described below use all four display states. However, one of ordinary skill will realize that not all of these states (e.g. the off-screen state) are used by the cards of some embodiments of the invention.

When the map application initially opens in some embodiments, the list area 224 displays several predicted locations to view on the map. In the starting stage 202, the map application proactively opens the search card in order to provide the user with quick access to the search field 222 and to the list of predicted locations. As further described in concurrently filed U.S. patent application Ser. No. 15/273,867 entitled "Proactive Search Window," the list of predicted locations in some embodiments is generated from a variety of sources, including previous searches entered in the search field, frequent destinations of the smartphone 100, addresses harvested from communication (e.g., emails and text messages) received by the smartphone, etc.

The second stage 204 illustrates the output display of the map application after a search term "Fast Food" has been entered in the search field 222. As shown, the map application identifies for this search several nearby fast food restaurant that it (1) identifies in the list area 224 in the search card 102, and (2) specifies with position identifiers 228 on the map 120. In some embodiments, the map application allows the map 120 in the map display area 101 to be adjusted through pan and zoom operations (e.g., that are performed through gestural touch input received through the touch sensitive screen of the mobile device) to see more or less of the map and to see other regions in the map. The search card 102 of some embodiments will be further described below.

The second stage 204 also illustrates the user touch selecting one of the locations (Big Belly Burger in this example) in the list area 224 of the search card 102. The third stage 206 illustrates that in response to this selection, the map application displays the selected location in the map display area 101, and displays the location-information card 104 for this selected location. To display this location card 104, the map application in some embodiments displays an animation that shows the location card 104 sliding from an off-screen position into the map application's output display. For instance, the animation in some embodiments shows the location card 104 slide from the bottom of the map display area 101 and the search card 102 over the search card 102. In other embodiments, the map application first shows the search card 102 slide down and off the screen, before or as the location card 104 slides up over the map display area 101.

The location card 104 provides information and controls about a particular location identified on the map. In this example, the location card 104 displays information and controls relating to Big Belly Burger selected in the second stage 204. In some embodiments, the map application also displays the location card 104 for a location after the identifier for the location is selected on a map displayed in the map display area 101. In some embodiments, the location card 104 displays for one location several of the following types of information: pictures, address, hours of operation, reviews, etc. It also displays controls for the map application to perform operations with respect to this card's associated location, such as identifying a route to the location. The location card 104 of some embodiments will be further described below.

The third stage 206 illustrates the user touch selecting a control 240 for requesting directions to the location associated with the location card 104. The fourth stage 208 illustrates that in response to this selection, the map application displays a route to the location in the map display area 101, and displays the route planning card 106 for this selected location. To display this route planning card 106, the map application in some embodiments displays an animation that shows the route planning card 106 sliding from an off-screen position into the map application's output display. For instance, the animation in some embodiments shows the location card 104 slide from the bottom of the map display area 101 and the location card 104 over the location card 104. In other embodiments, the map application first shows the location card 104 slide down and off the screen, before or as the route planning card 106 slides up over the map display area 101.

In some embodiments, the route planning card 106 displays information and controls for planning a route from a device's current location to a location displayed on the map presented in the map display area 101. As shown, the route planning card 106 includes a set of controls for specifying the mode of travel (which, in this example, are driving, walking, transit, and ride sharing) to the location. The route planning card 106 of some embodiments will be further described below.

The map application in some embodiments can transition from the search card 102 to the route planning card 106 for some locations identified on the search card (e.g., a Home location, or a Work location listed in the search card). On the other hand, for other locations identified through the search card 102, the map application in some embodiments can only transition from the search card 102 to location cards 104 of these locations, before transitioning from their location cards 104 to their route planning cards 106. In yet other embodiments, the map application cannot transition between the search card and the route planning card for any location without first going through the location card for that location.

In some embodiments, the map application not only sequentially presents the different cards, but requires the user to sequentially remove cards when the user wants to go back to an earlier card. The map application in these embodiment requires this sequential back trace in order to maintain the card-based design cue through the user interaction. In some embodiments, the map application provides a control on a later presented card to skip over one or more intermediate cards that are between the later presented card and an earlier presented card. Also, in the embodiments that allow the cards to transition from a search card to a route planning card without first viewing an information card for a location, the map application provides a control that allows the user to transition from the route planning card back to the search card.

Figure 3:
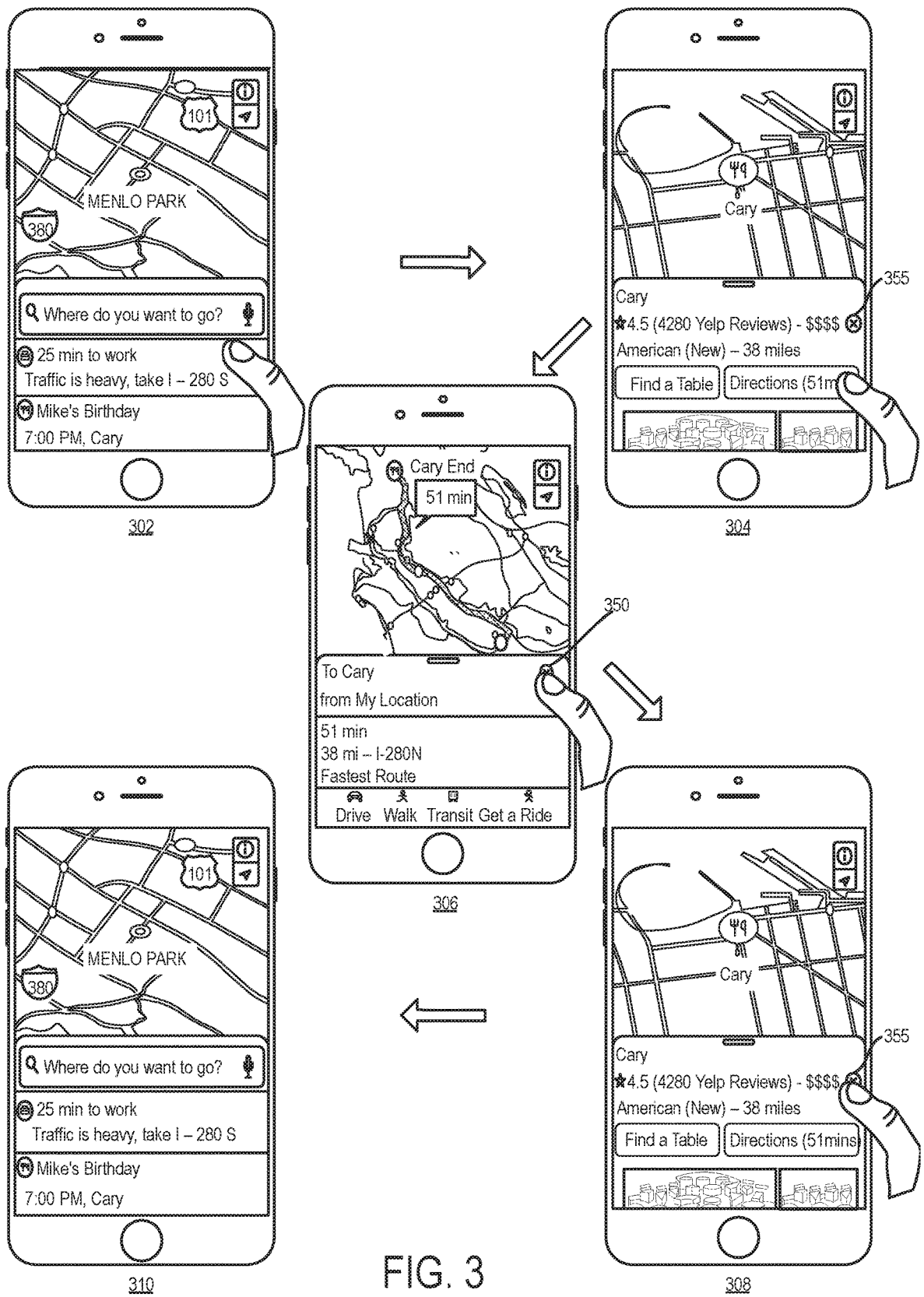
FIG. 3 illustrates an example of a back trace operation through a series of different cards.

FIG. 3 illustrates an example of a back trace operation. The first three stages 302-306 of this figure show the user selecting a predicted destination in an intermediate-sized search card, viewing the location card associated with the predicted destination, requesting a route to this location, and viewing the route-planning card for this location. The last three stages 306-310 of FIG. 3 then show the user sequentially first removing the route planning card and then removing the location card to get back to the search card, by selecting the cancel control 350 in the third stage 306 and then the cancel control 355 in the fourth stage 308.

Figure 4:
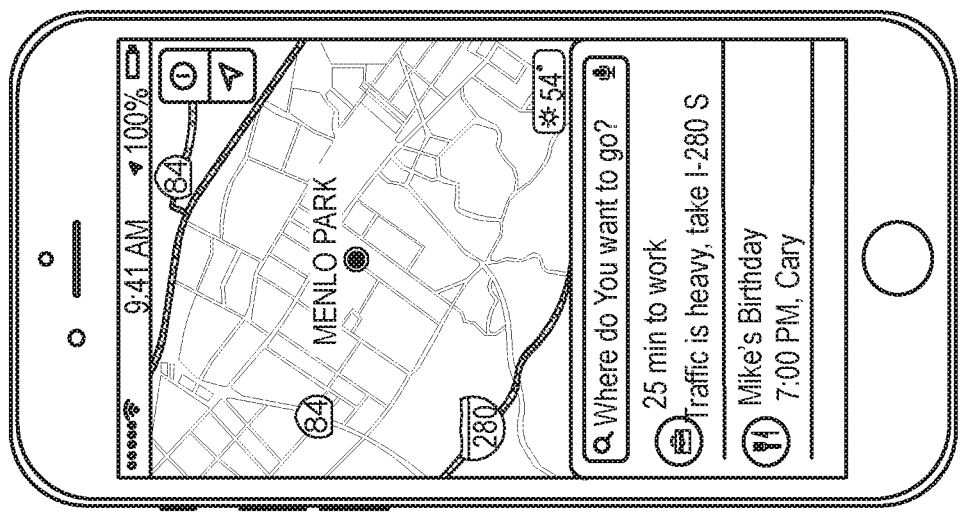
FIGS. 4 and 5 present two examples that illustrate the map application of some embodiments presents an earlier card in the same state in which it was being viewed before transitioning to a later presented card.
Figure 4:
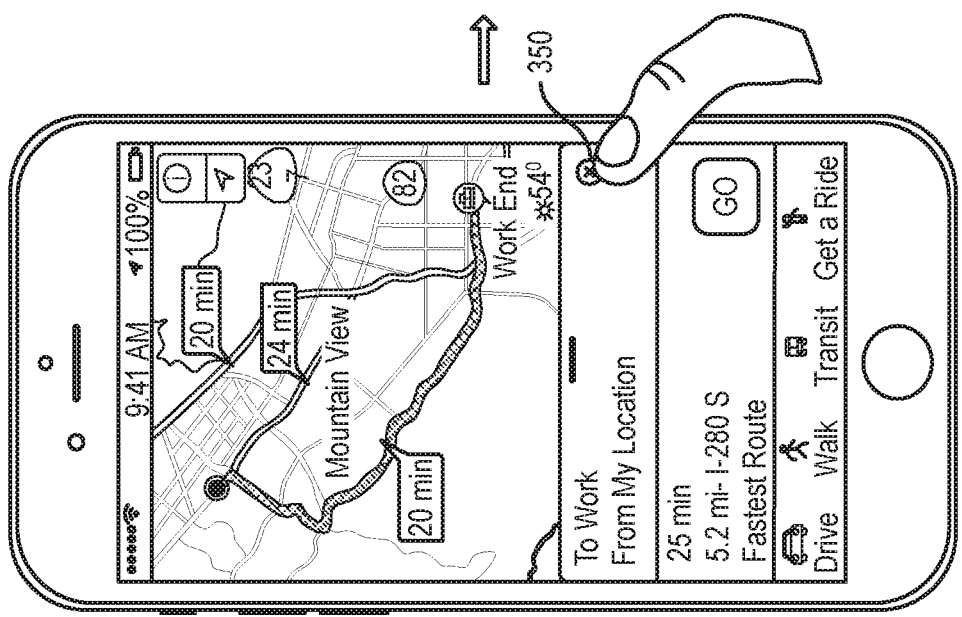
Figure 4:
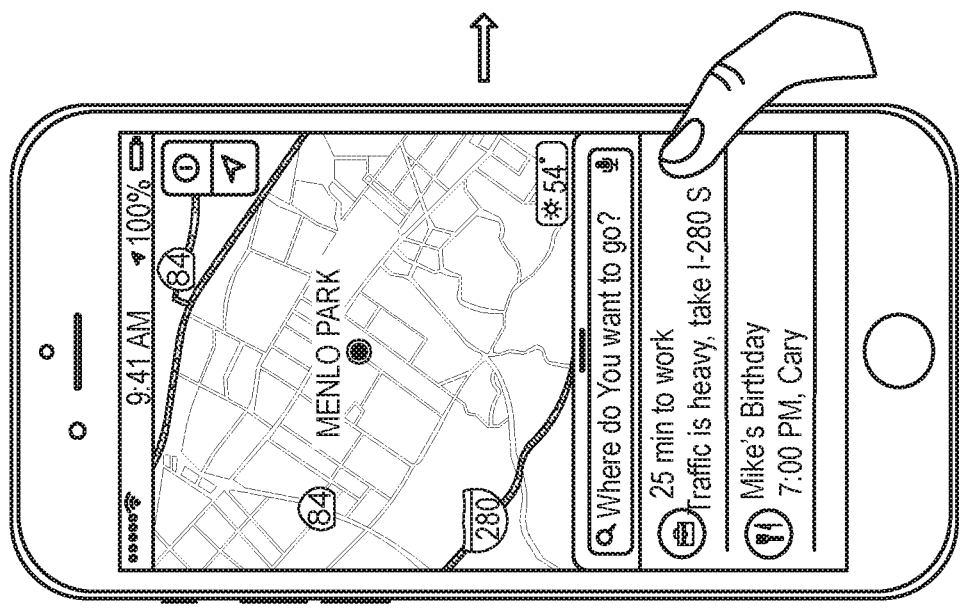
Figure 5:
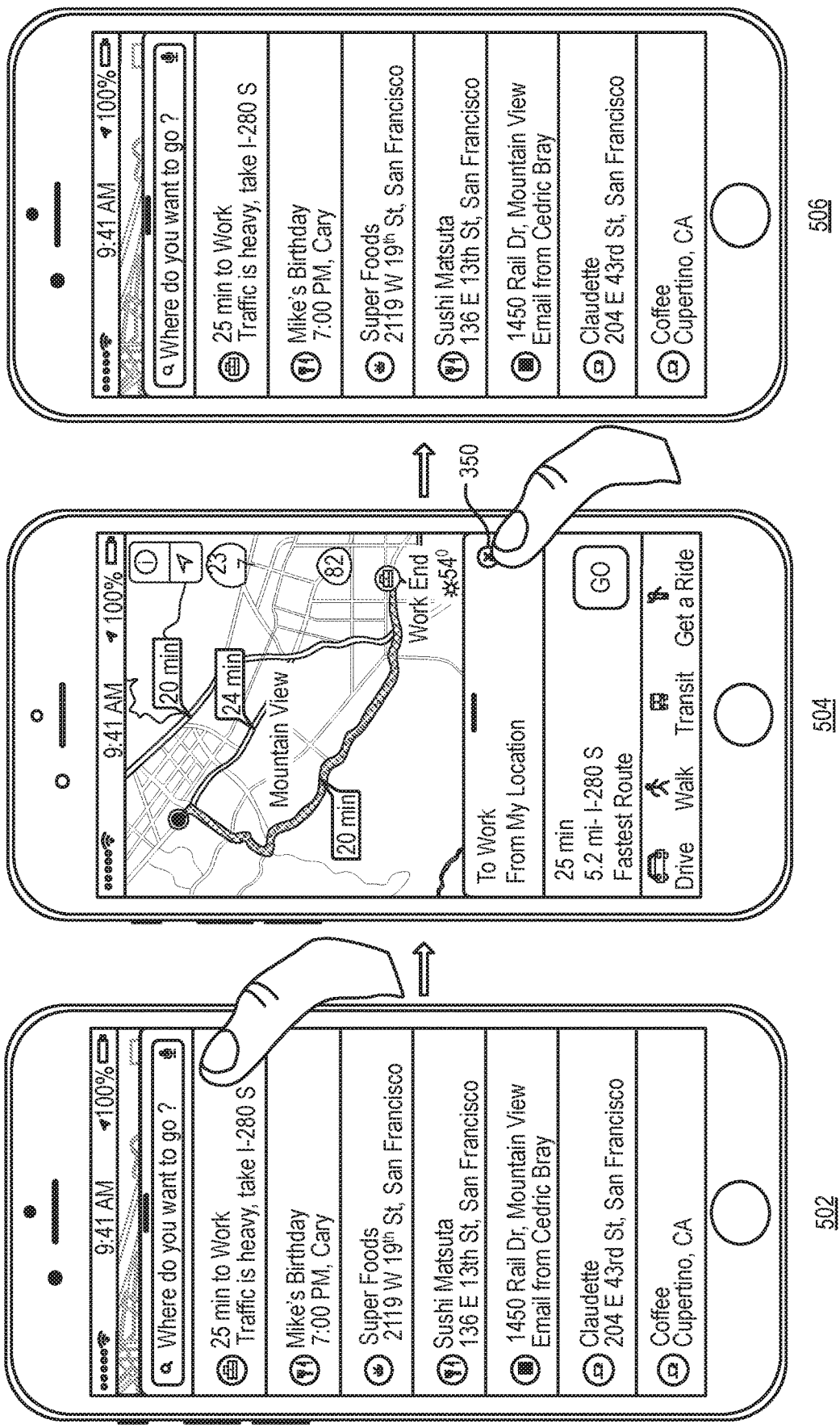

When going backwards from a later presented card to an earlier presented card, the map application of some embodiments presents the earlier card in the same state in which it was being viewed before transitioning to the later presented. FIGS. 4 and 5 present two examples that illustrate this point. FIG. 4 illustrates selection of the cancel control 350 directing the map application to transition backward from a route planning card to an intermediate version of the search card, when the intermediate version of the search card was used to select a predicted work location. FIG. 5 illustrates selection of the cancel control 350 directing the map application to transition backward from a route planning card to a maximized version of the search card, when the maximized version of the search card was used to select a predicted work location. These two figures also provide examples of how for certain locations identified in the search card (the work location in this example), the map application transitions from the search card to the route planning card, without first going through a location card.

In some embodiments, each of the cards has four display states, which are a minimized state, an intermediate state, a maximized state, and an off-screen state. In the minimized state, a card displays a small amount of information and/or controls. For example, a search card of some embodiments only presents its search field in the minimized state in some embodiments. When the search field has received a search parameter and the map is displaying the results of a search based on the received search parameter, the search field of the search field displays the search parameter.

In its intermediate state, a card in some embodiments provides more information and/or controls than in the minimized state. Also, the presentation of the information in a card's intermediate state provides a clue in some embodiments that the card has additional information and/or controls that are currently off screen. For example, in some embodiments, some of the information and/or controls that are displayed in the card's intermediate display state are cut off at the card's bottom to imply that there is more information and/or controls off screen. Also, in some embodiments, the height of a card in its intermediate state is selected so that the user can interact with this card's controls with the thumb of the hand that holds the device.

In some embodiments, the user can scroll the card's content while the card is in its intermediate state. In other embodiments, the user cannot scroll through the card's content while the card is in this state. Instead, to scroll through this content, the user has to expand the card to its maximized state in these embodiments. In its maximized state, the card displays the most amount of information and/or controls that it can display.

A card also has an off-screen state. In this state, no portion of the card is displayed on the screen. However, from the off-screen state, the map application in some embodiments can present the card (e.g., in its last displayed state or in its intermediate state) based on input from the user. In some embodiments, the card can transition to its off-screen state based on user input. For example, when the card is in its intermediate state, one tap of the map in the first display area causes the card to transition to its minimized state, while two taps of the map cause the card to transition to its off screen state. In some embodiments, a card can transition to its off-screen state though other inputs.

Different embodiments provide different controls for transitioning between the display states of a card (e.g., between the off-screen, minimized, intermediate and maximized states). In some embodiments, the user can transition between these states by touching the top of the card, and dragging this top to a larger display state (if any) or down to a smaller display state. Also, the user in some embodiments can change the display state of the card by performing a "flick" operation, which entails touching the top of the card and performing a quick up or down drag operation. When the speed or acceleration of the flick operation (i.e., of its drag operation) exceeds a threshold value, this operation in some embodiments can direct the map application to skip the intermediate display state as the card shrinks from its maximized state to its minimized state, or expands from its minimized state to its maximized state. When the speed or acceleration of the flick operation does not exceed the threshold value, the flick operation in these embodiments direct the map application to stop at the intermediate display state when transitioning from the maximized or minimized state. One of ordinary skill will realize that other embodiments provide other controls for transitioning between these states. One of ordinary skill will also realize that some or all of the cards of some embodiments do not have one or more of the above-described states.

In some embodiments, the map application allows some or all of the cards to be stationary in only one of its three displayed states without the user holding the cards stationary through input. These three states are the minimized, intermediate and maximized states. In these embodiments, the map application allows the card to go up and down between these states and provides animations of the card transitioning between these states. But the map application in these embodiments does not display the card stationary in any state between these states, unless the user is holding the card in such a state (e.g., by dragging the card to such a state and maintaining contact with the screen to hold the card in such a state). In other embodiments, the map application allows the card to remain stationary in a state between minimized and intermediate states, or between the minimized and maximized states.

Figure 6:
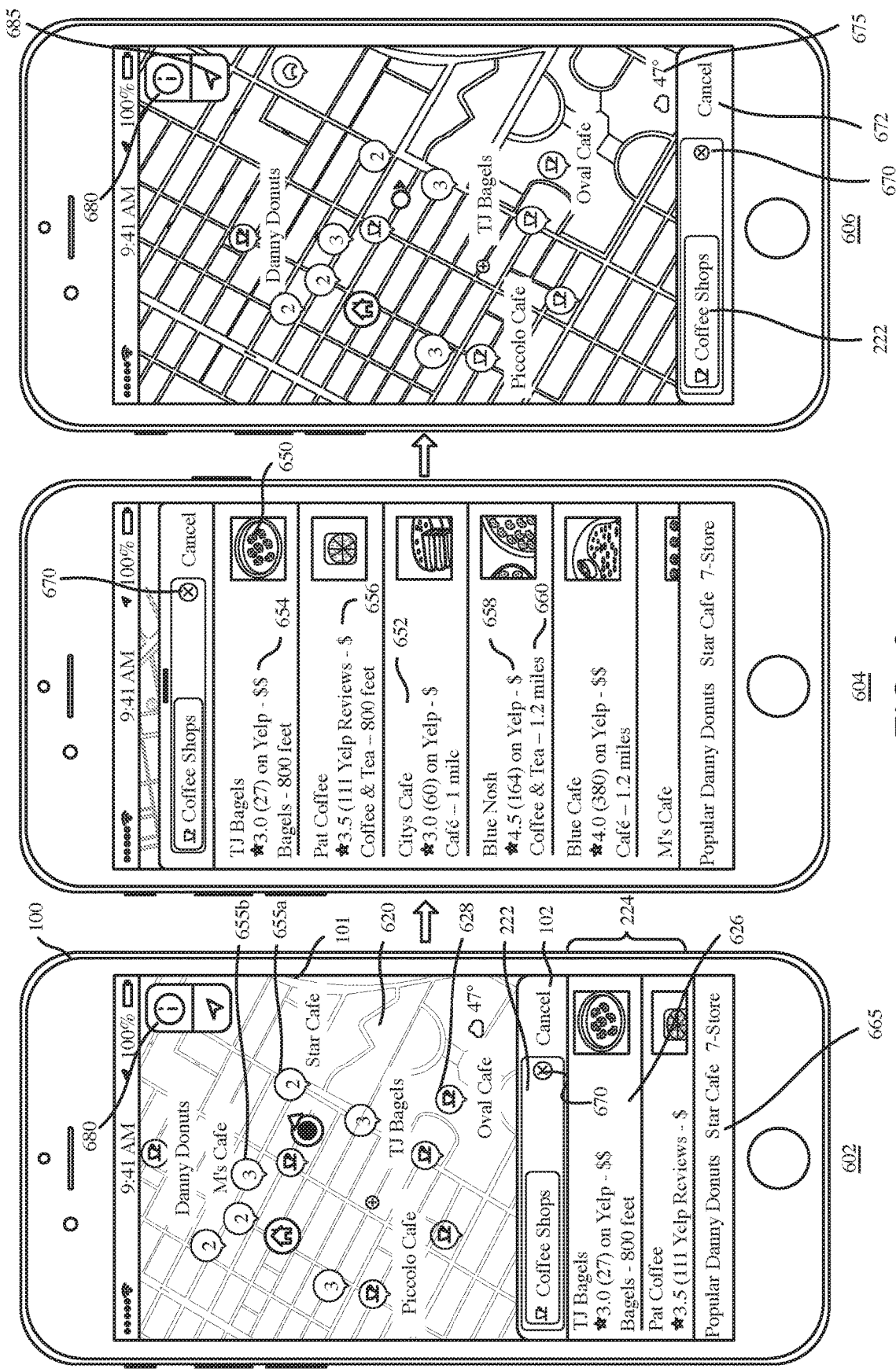
FIGS. 6-11 illustrate the minimized, intermediate, and maximized states of a search card, a general location card, and a route planning card of some embodiments.

FIGS. 6-11 illustrate the minimized, intermediate, and maximized states of the search card 102, general location card 104, and the route planning card 106 of some embodiments. FIG. 6 shows these three states 602, 604, and 606 of the search card 102 of a map application that executes on a smartphone 100. In this figure, state 602 is the intermediate state of the search card, state 604 is the maximized state of this card, and state 606 is the minimized state of this card.

In the example illustrated by these states, the search card has received a request for a search of coffee shops in a particular region of the map that is being displayed in the map display area 101. This search is identified by the search parameter "Coffee Shop" appearing in the search field 222 of this card in each of its three states 602, 604 and 606. The search is also identified by (1) a search result list 626 in the search card's list area 224 in the intermediate and maximized states 602 and 604, and (2) the position identifiers 628 (also referred to as position-of-interest (POI) markers) on the portion of the map 620 in the map area display that is not covered by the search card in its intermediate state 602, maximized state 604, or minimized state 606.

In the minimized state 606, the search card 102 overlaps a much smaller part of the map displayed in the map display area 101 than the space covered by this card in the intermediates state 602 and maximized state 604. The search card 102 in its minimized state 606 shows its search field 222 but does not show its list 224 of locations. In the minimized state 606, the intermediate state 602, and the maximized state 604, the search card shows control 670 for removing the displayed search parameter from the search field, and the control 672 for removing the search card to its off-screen state (i.e., to remove this card from overlapping any portion of the map display area 101). When the user wishes to interact with a card that is displayed in its minimized state, the user in some embodiments can select the card (e.g., tapping the card), which then opens up to its intermediate state. In other embodiments, the selection of a minimized card causes the card to open to its last non-minimized, non-off-screen state. When a card is in its minimized state displays one or more controls, the user selects the minimized card at a location that is not one of these controls in order to cause the card to transition from its minimized state to another state.

As shown in FIG. 6, the map display area 101 can display one or more pieces of metadata (e.g., name of location, type of location, etc.) for each position identifier 628 that identifies one search location on the map. Also, the map application of some embodiments provides search result group identifiers 655 for several locations that it identifies for a search parameter (Coffee Shops in this example) when these search locations are very close to each other so as to make individual identifiers for them overlap each other or too close to each other to provide a useful or an aesthetically pleasing map presentation. Each group identifier includes a number within the identifier to indicate the number of locations represented by the identifier. For example, the group identifier 655a specifies 2 on its face to indicate that it represents the location of two coffee shops, while the group identifier 655b specifies 3 on its face to indicate that it represents the location of three coffee shops.

When displaying intermediate and minimized cards (e.g., the search card 102 in intermediate and minimized states 602 and 606), the map application displays weather data 675 (e.g., temperature data, meteorological data, precipitation data, etc.) on the map (e.g., map 620) displayed in the map display area 101. Visible also on the map in the map display area 101 are an information control 680 and a position identifier 685 in the top corner of this display area when the application is displaying an intermediate card or a minimized card. The information control 680 allows the user to change certain aspects of the map presentation, e.g., to switch the map mode (e.g., driving mode, walking mode, transit mode, etc.), to display or hide the traffic conditions, to switch between 2D or 3D map presentation. The position identifier 685 directs the map application to show a region on the map that corresponds to the current location of the device, and to show the location of the device in that region. In some embodiments, the information control 680 and position identifier 685 provide other functionality that is currently provided by these controls in the current mobile device operating system.

In its intermediate and maximized states 602 and 604, the search result list 626 displays several pieces of information for each location in the list. In this example, this list shows for each location a thumbnail picture 650 associated with the location, a name 652, a rating 654, a price indicator 656 describing prices of items at the location, the type 658 of location and the distance 660 to the location. Below the search result list 626, the search card 102 can also provide a set of filter controls 665 for filtering the results displayed on the map and on the list. In this example, the set of filter controls 665 are names (Danny Donuts, Star Cafe, 7-Store, etc.) of popular coffee shops. These names are provided in a scrollable list (e.g., a list that can horizontally scroll to the right or left). Selection of any one of these names directs the map application to display coffee shops with the selected names on the map in the map display area and in the search result list 626.

In its intermediate state 602, the search card in some embodiments partially displays the search result list 626 to identify some but not all of the locations identified for the search. In this example, the second item on this list is only partially displayed in the map application's output display. This partial presentation provides a clue in some embodiments that the card has additional information and/or controls that are currently off screen.

Figure 7:
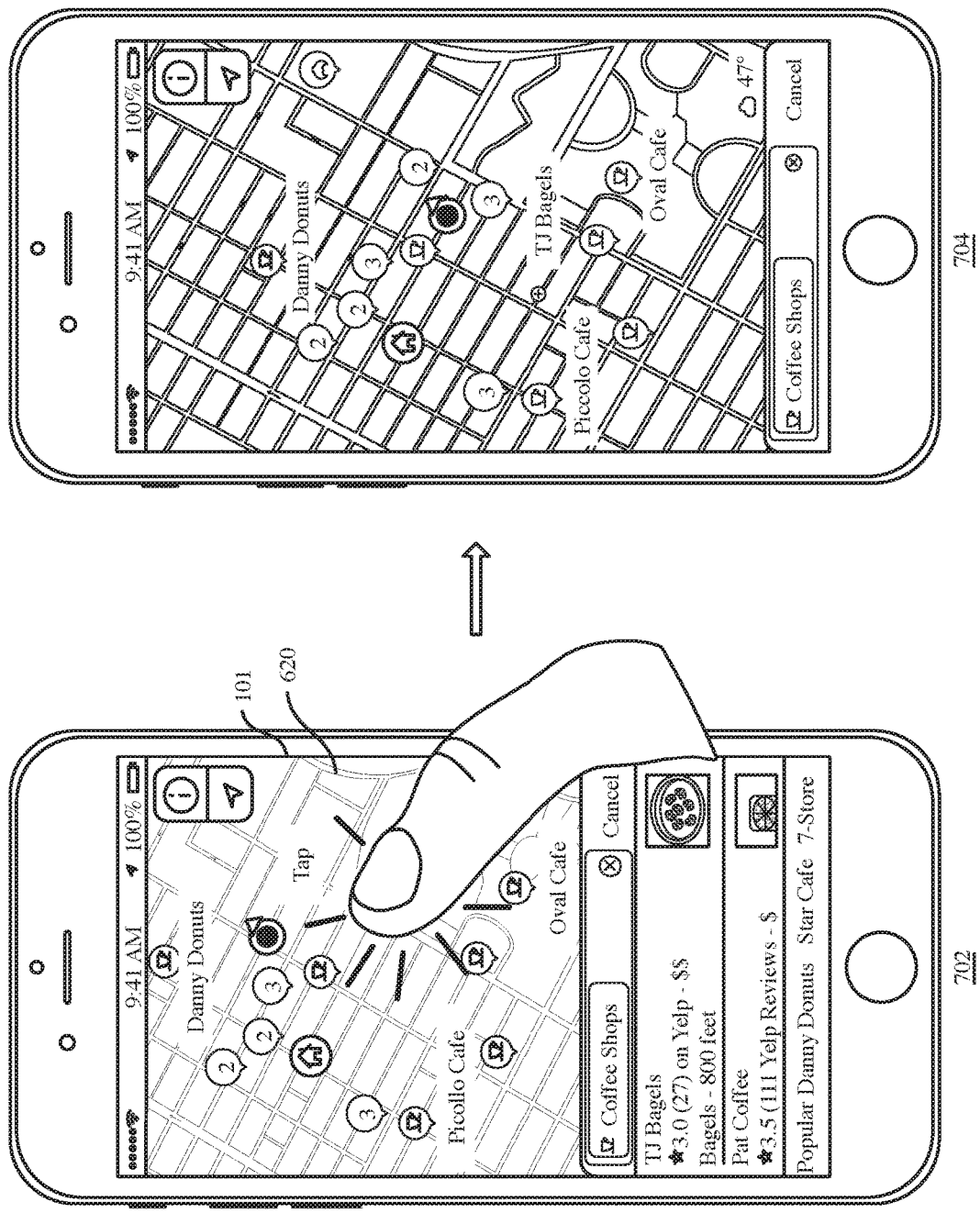

Also, in some embodiments, the height of a card in its intermediate state is selected so that the user can interact with this card's controls by the same hand that holds the device (e.g., with the thumb of the hand that holds the device). This point is illustrated in FIG. 7. This figure shows two operational stages 702 and 704 of the map application. In the first stage 702, the map application shows the search card 102 in its intermediate state 602, while a user holds the smartphone 100 in one hand. This stage 702 also shows the user's thumb touch selecting the map 620 displayed in the map display area 101 (i.e., shows the thumb contacting the phone's display screen at a location that displays the map). The touch operation causes the map application to slide down the search card 102 to its minimized state 606, as shown in the second stage 704. Because the search card 102 is relatively short in its intermediate state, the user's thumb can easily reach over the search card in this state in order to minimize this card.

Figure 8:
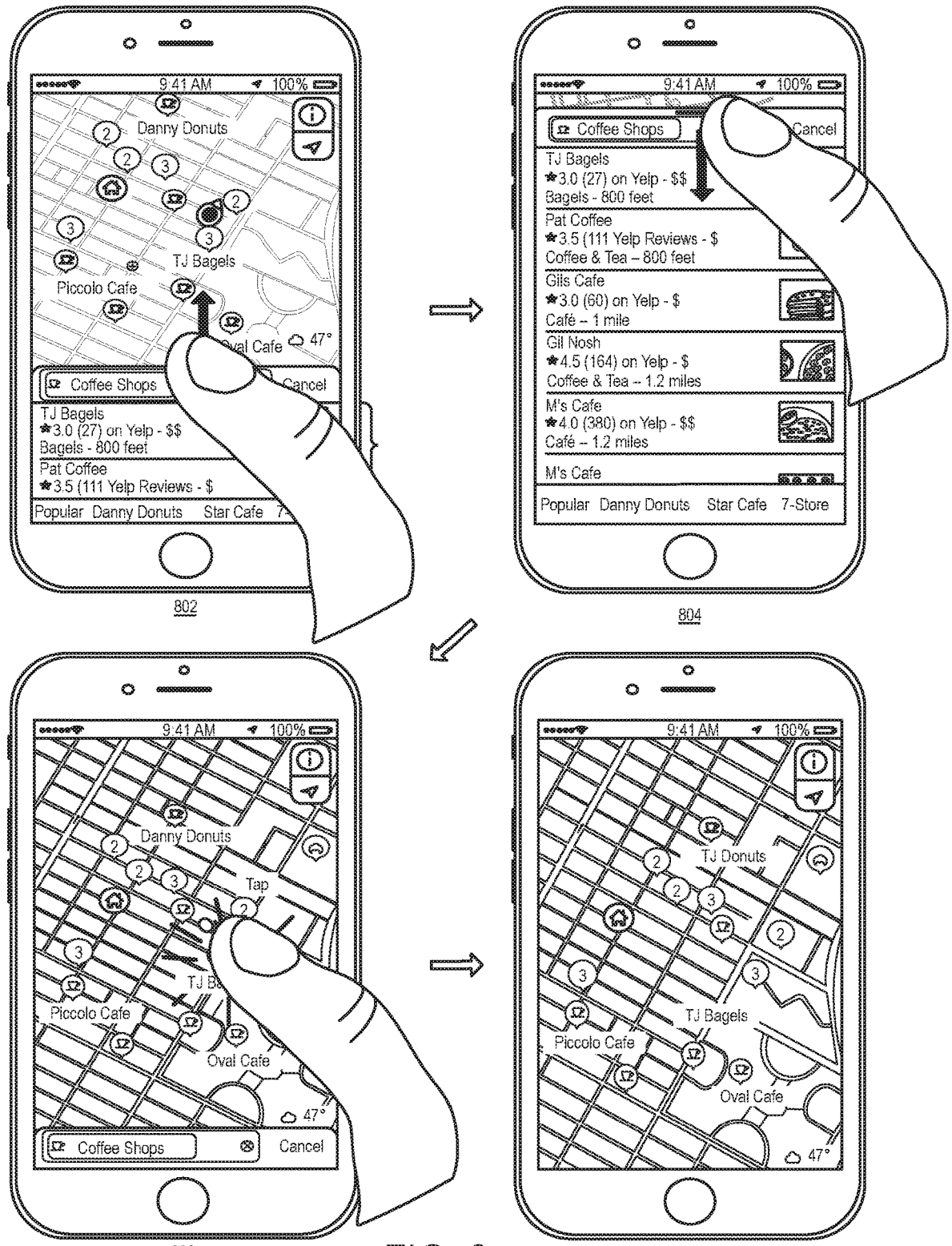

The map application in some embodiments provides several other ways to change the display state of a search card. FIG. 8 illustrates several of these ways. The example illustrated in this figure is presented in four operational stages 802-808 of the map application. The first stage 802 shows the search card 102 in its intermediate state 602. This stage also shows the user holding the phone 100 in one hand, while selecting the top of the search card with his thumb and performing an upward drag operation.

The second stage 804 shows that the drag operation of the first stage 802 causes the map application to slide the search card up to assume its maximized state 604. This stage also shows the user's thumb selecting the top of the search card and performing a downward drag operation. The downward drag operation directs the map application to slide down the search card to assume its minimized state 606, as shown in the third stage 806. To drag the card from its maximized state to its minimized state, the user can drag the card past (e.g., a threshold distance past) its intermediate state from its maximized state.

In some embodiments, the user can also perform a flick operation to move a card (e.g., a search card 102) between its minimized state (e.g., state 606), intermediate state (e.g., state 602), and maximized state (e.g., state 604). To perform a flick operation in some embodiments, the user can select a location on the card (e.g., the top of the card) and perform an upward or downward drag operation that has a velocity or acceleration that is greater than a first threshold velocity or acceleration value. By having the threshold velocity or acceleration, this flick operation allows the user to push the card to the next displayed state (e.g., from the intermediate state to the maximized or minimized state, from the minimized state to the intermediate state, or from the maximized state to the intermediate state) without maintaining the drag contact as long as it would be needed when the drag operation does not have the threshold velocity or acceleration. When the flick's drag operation has a velocity or acceleration that is greater than a second, larger threshold value, the flick operation in some embodiments can have the card skip the intermediate state and transition from the maximized state to the minimized state, or from the minimized state to the maximized state. This stronger flick operation is referred to as a strong flick operation below.

The third stage 806 of FIG. 8 shows the user's thumb touch selecting the map displayed in the map display area 101. As shown by the fourth stage 808, this tap operation while a card (e.g., a search card 102, a location card 104, or route planning card 106) is in its minimized state directs the map application of some embodiments to remove the card from the display screen, i.e., to move the card into its off-screen state. In some embodiments, the map application allows the user to move a card from its minimized state to its off-screen through other input. As mentioned above, the user can remove a minimized search card by selecting the cancel control 672 in some embodiments. Also, in some embodiments, the user can move a minimized card off-screen by selecting this card and performing a downward drag operation. In the example illustrated in FIG. 8, the map application displays weather, position and information controls 675, 680 and 685 on the map when the search card is in its off-screen state, as shown in stage 808. In other embodiments, however, the map application removes all controls that it previously displayed over a map in the map display area when it moves a card to its off-screen state, so that the user can have an unobstructed view of the map.

Figure 9:
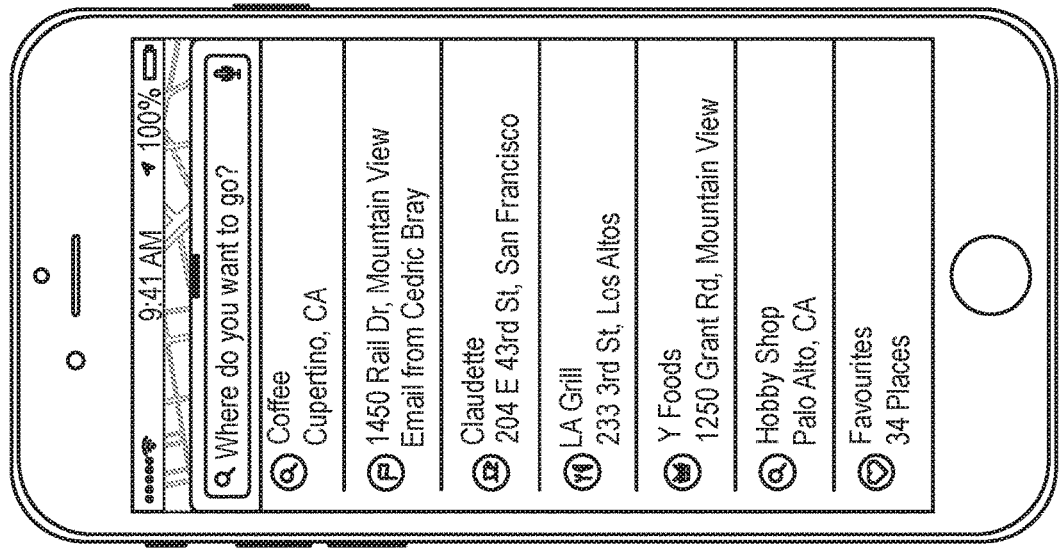
Figure 9:
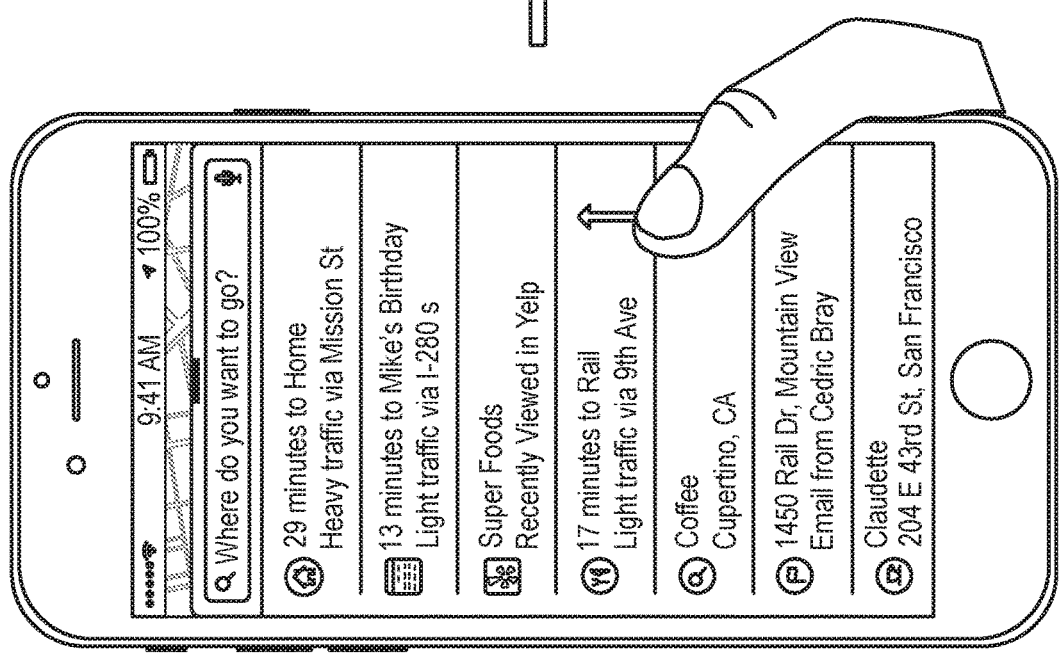

As mentioned above, a user cannot scroll a card's content while the card is in its intermediate state, but can scroll this content when the card is in its maximized state. FIG. 9 illustrates the user performing such a scroll operation while the search card is in its maximized state. This figures shows two operational stages 902 and 904 of the map application of some embodiments. The first stage 902 shows the search card 102 after it has been opened to its maximized state 604. In this stage, the search card in this example has not received any search parameter, and is displaying a list of predicted locations for display on the map. The first stage 902 also shows the user performing a drag operation, by using his thumb to select a location on the list of predicted locations (i.e., to touch the phone's display screen at a position that displays the list of predicted locations) and moving his thumb upwards.

The second stage 904 shows that in response to this drag operation, the map application scrolls the predicted-destination list upwards. This scrolling has moved entry 920 for Coffee Shop in Cupertino from a lower position in the first stage 902 to the top of the list. Because of this scrolling, four entries on the predicted-location list have scrolled off the list, while four other entries on this list are now displayed on this list. As shown, the thumb of the hand that holds the phone 100 can easily scroll through the displayed content of a card in its maximized state. In other words, this operation is yet another convenient one-handed interaction that is facilitated by the map application.

Figure 10:
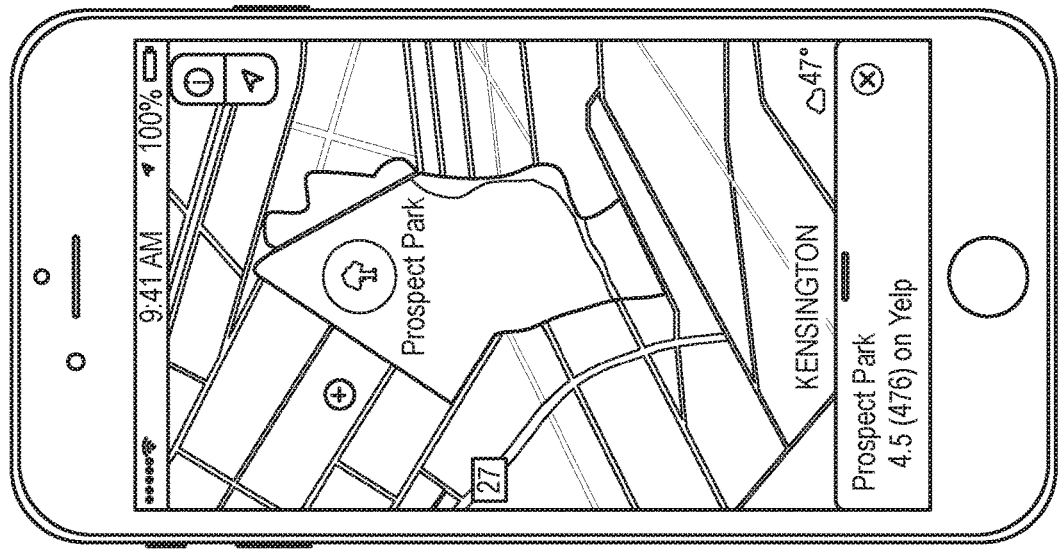
Figure 10:
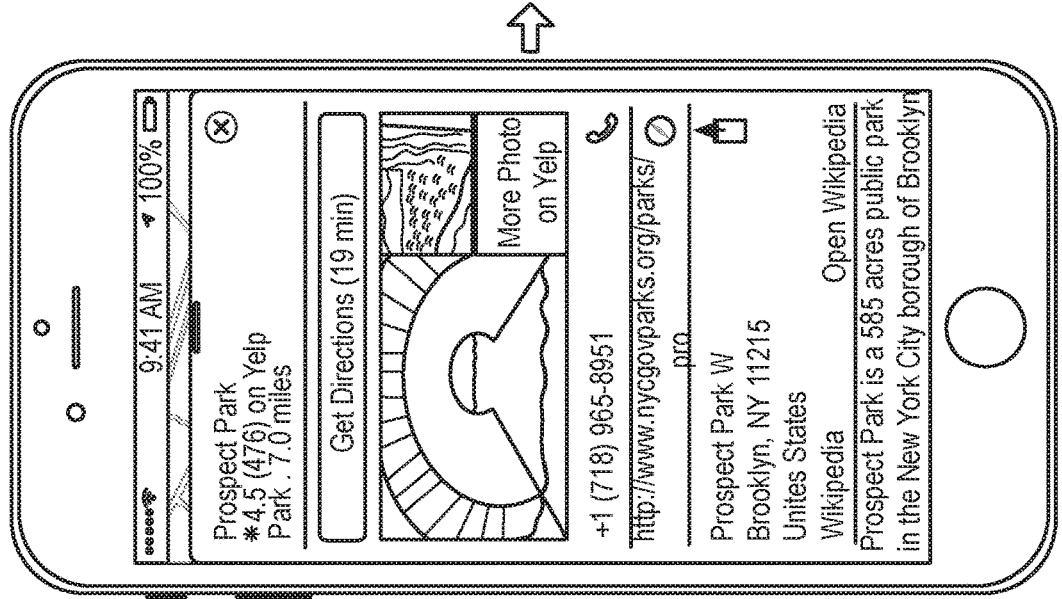
Figure 10:
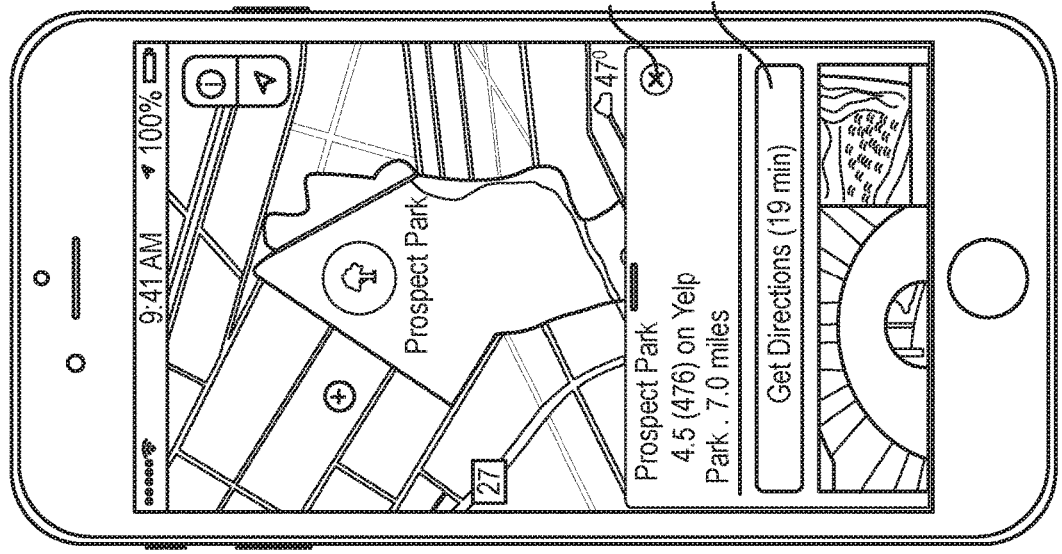

FIG. 10 illustrates the intermediate state 1002, the maximized state 1004, and the minimized state 1006 of the location card 104 of some embodiments. In some embodiments, the map application presents this card for a location after the user selects the location from a search result list in the search card, or after the user selects the location's position identifier on a map that is displayed in the map display area 101. In some embodiments, the map application allows a user to adjust the location card 104 between its intermediate state 1002, maximized state 1004, minimized state 1006 and off-screen state, by performing the same operations as those that were described above.

As shown, in each of the states 1002, 1004, and 1006, the location card 104 has a control 1008 for removing this card and returning to a previously displayed search card, or to a previously displayed view of the map that does not include either the search card or the location card. As further shown, the location card 104 displays in all its three states 1002, 1004, and 1006 the name of the location, and a review of the location from a social media service (e.g., Yelp) when such a review is available.

In its intermediate and maximized states 1002 and 1004, this card provides additional information about the location. In both of these states 1002 and 1004, this card displays the distance to the location form the current location of the device, and several photos associated with the location (e.g., several photos of the location). The card also displays a route-planning control 1010 that when selected, directs the map application to display a route from the current location of the device to the location associated with the card. As shown, the route-planning control 1010 displays an estimated time of travel to the location associated with the location card 104 from the current location of the device.

In its intermediate state 1002, the location card 104 in some embodiments displays only part of the set of information that this card has for the location. Also, this card partially displays some of the information in order to visually suggest that it contains additional information for display. In the example illustrated in FIG. 10, the location card 104 in its intermediate state 1002 partially displays one or more photos in order to provide a visual clue that the card has additional information and/or controls that are currently off screen. Also, like other cards in their intermediate states, the height of location card 104 in its intermediate state 1002 in some embodiments is selected so that the user can interact with this card's controls by the thumb of the hand that holds the device.

In addition, like other cards in their intermediate states, the content presented in the location card 104 in intermediate state 1002 is not scrollable in some embodiments. Instead, this content is scrollable in some embodiments only when the location card 104 is in its maximized state 1004. The scrollable content that is viewable in the maximized state of a location card depends on the type of the location associated with the card. As shown in FIG. 10, some examples of such information include the address, telephone number and website for the location. Examples of other information include information that other map applications (e.g., Maps in Apple iOS 9, Google Maps, etc.) provide today in their location placecards.

Figure 11:
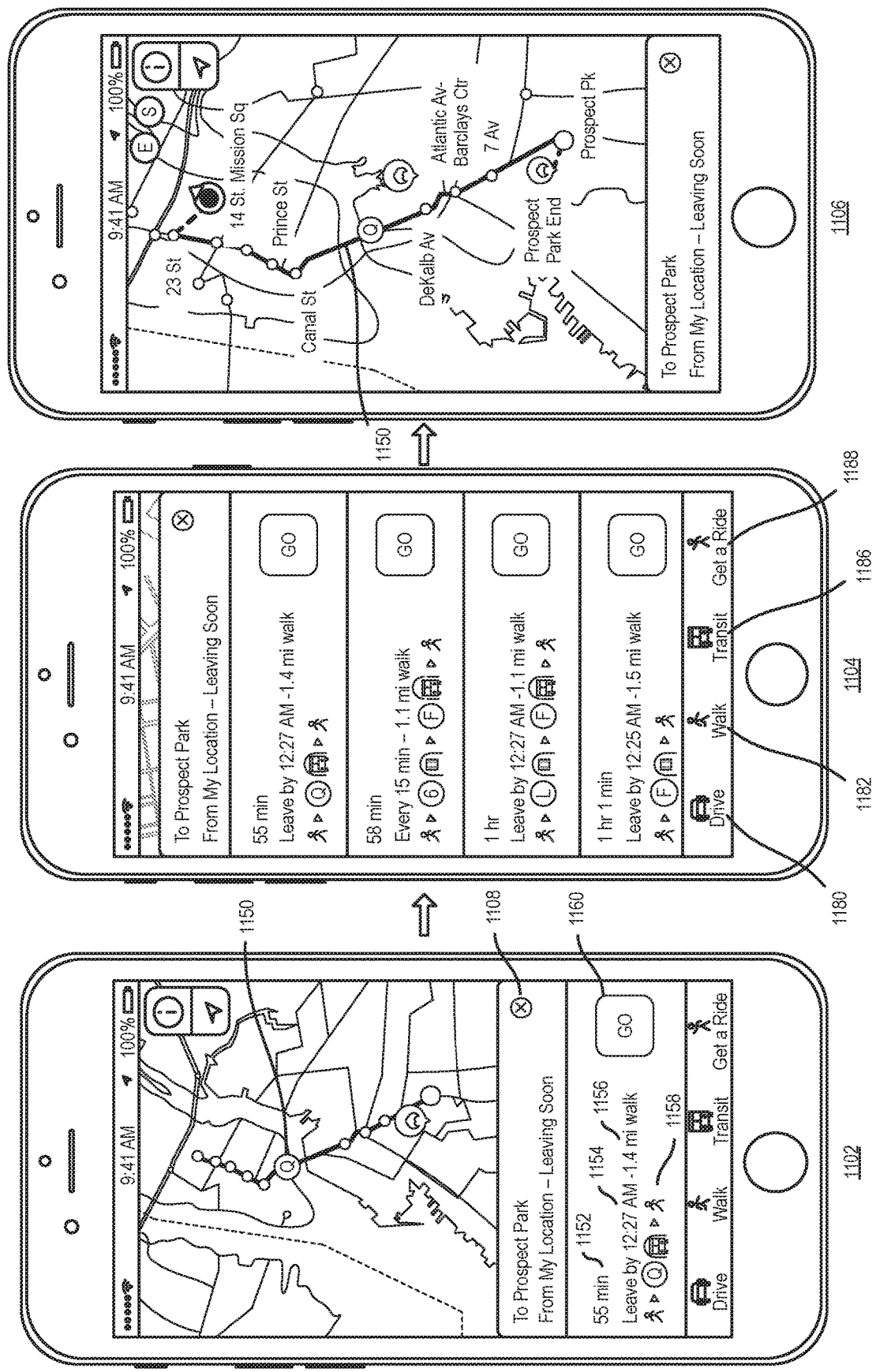

FIG. 11 illustrates the intermediate state 1102, the maximized state 1104, and the minimized state 1106 of the route planning card 106 of some embodiments. In some embodiments, the map application presents this card for a location after the user selects a route-planning affordance that is displayed near the location's position identifier 228 on a map. The map application in some embodiments also displays the route planning card 106 for a location after the user selects a route-planning control for this location in a location card for this location. In some embodiments, the map application displays the route planning card 106 for a location when the user selects the location from a search result list in the search card, when this location does not have an associated location card or when the search card provides an affordance to skip the location card for this location and transition directly to its route planning card. The map application displays a route planning card when the user requests a route between two locations, neither of which is the current location of the device.

In some embodiments, the map application allows a user to adjust the route-planning card 106 between its intermediate state 1102, maximized state 1104, minimized state 1106 and off-screen state, by performing the same operations as those that were described above. As shown, in each of the states 1102, 1104, and 1106, the route planning card 106 has a control 1108 for removing this card and returning to a previously displayed search card, a previously displayed location card, or to a previously displayed view of the map (e.g., a view of the map that does not include any card).

In its intermediate and minimized states 1102 and 1106, the map application displays the route planning card 106 along with a representation 1150 of at least one route on a map that is displayed in the map display area. In this example, the displayed route is a route from the device's current location to the destination location of the route. This displayed route 1150 is the route that the map application quantifies as the best route to the destination location based on a set of one or more metrics. In some embodiments, the map application in some cases displays on the map multiple routes to a destination, e.g., multiple driving routes to the destination.

As further shown, the route planning card 106 in each of its states 1102, 1104 and 1106 displays a description of the route being planned. This description in some embodiments is provided in terms of the start and end locations of the route, as shown. Also, in its intermediate and maximized states 1102 and 1104, the route planning card 106 provides additional description of the displayed route 1150. This description is dependent on the mode of travel in some embodiments. In the example illustrated in FIG. 11, the displayed route 1150 is a transit route, and hence the route description is a transit route description, which includes the time 1152 to destination, a travel time indication 1154, an indication 1156 of the total walking distance, and a pictorial representation 1158 of the different segments along the transit route. In some embodiments, the map application provides different travel time indications in different scenarios. Example of such indications include an indication of when the user should start the travel, when the next transit vehicle will leave, the frequency of transit vehicle departures, or another type of transit travel notification.

Figure 12:
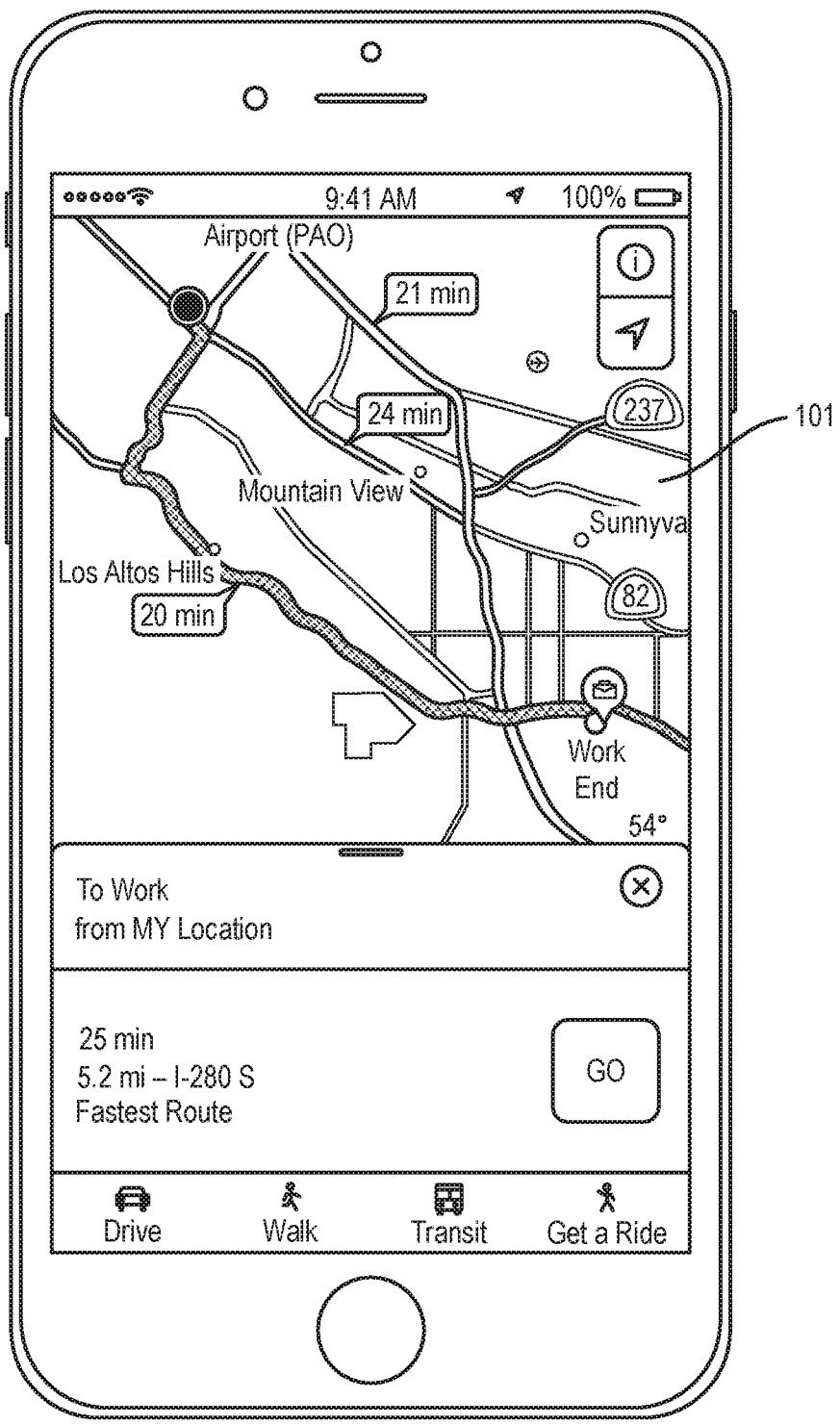
FIG. 12 illustrates an example of a route planning card of some embodiments.

For driving or walking mode navigation, the route planning card 106 in its intermediate and maximized states 1102 and 1104 can provide other descriptions of the route being displayed. For instance, in some embodiments, this card 106 in its intermediate and maximized states 1102 and 1104 provides (1) an estimated time to travel to the location, (2) an identification of one or more roads to travel (e.g., a primary road to travel), (3) the length of the route, as illustrated in the example presented in FIG. 12. This example also displays on the map three identified routes in the map display area 101. Although the map application selects one of these three routes, the user can select each of other two displayed routes so that the route planning card in its intermediate state or maximized state can display additional information about these other routes to described them. Also, while FIGS. 11 and 12 illustrate some exemplary route descriptions in the route planning cards, one of ordinary skill will realize that the route planning cards in some embodiments can display other information, such as traffic conditions along a displayed route.

For transit routes, the route planning card in its maximized state 1104 can display several different transit routes, as shown. However, in its intermediate state 1102, the route planning card 106 in some embodiments displays only a subset of (e.g., one of) the identified transit routes. Because the route planning card 106 in some embodiments is not scrollable when it is in its intermediate state, the user has to switch the card to its maximized state 1104 in order to view additional identified routes, and if needed, to scroll through these routes.

During route planning, the routes displayed on the map and described in the route planning cards are dependent on the mode of transportation that the map application or the user selects. In some embodiments, the map application selects the transportation mode based on the travel mode preference that the user has specified in the application's settings, or that the user has specified in particular for a particular journey. In its intermediate and maximized states 1102 and 1104, the route planning card 106 provides a set of travel mode controls that allow the user to specify the travel mode for navigating to a particular destination. These controls include (1) a driving mode control 1180 for requesting a driving route, (2) a walking mode control 1182 for requesting a walking route, (3) a transit mode control 1186 for requesting a transit route, and (4) a ride sharing control 1188 for requesting ride sharing to the destination.

Figure 13:
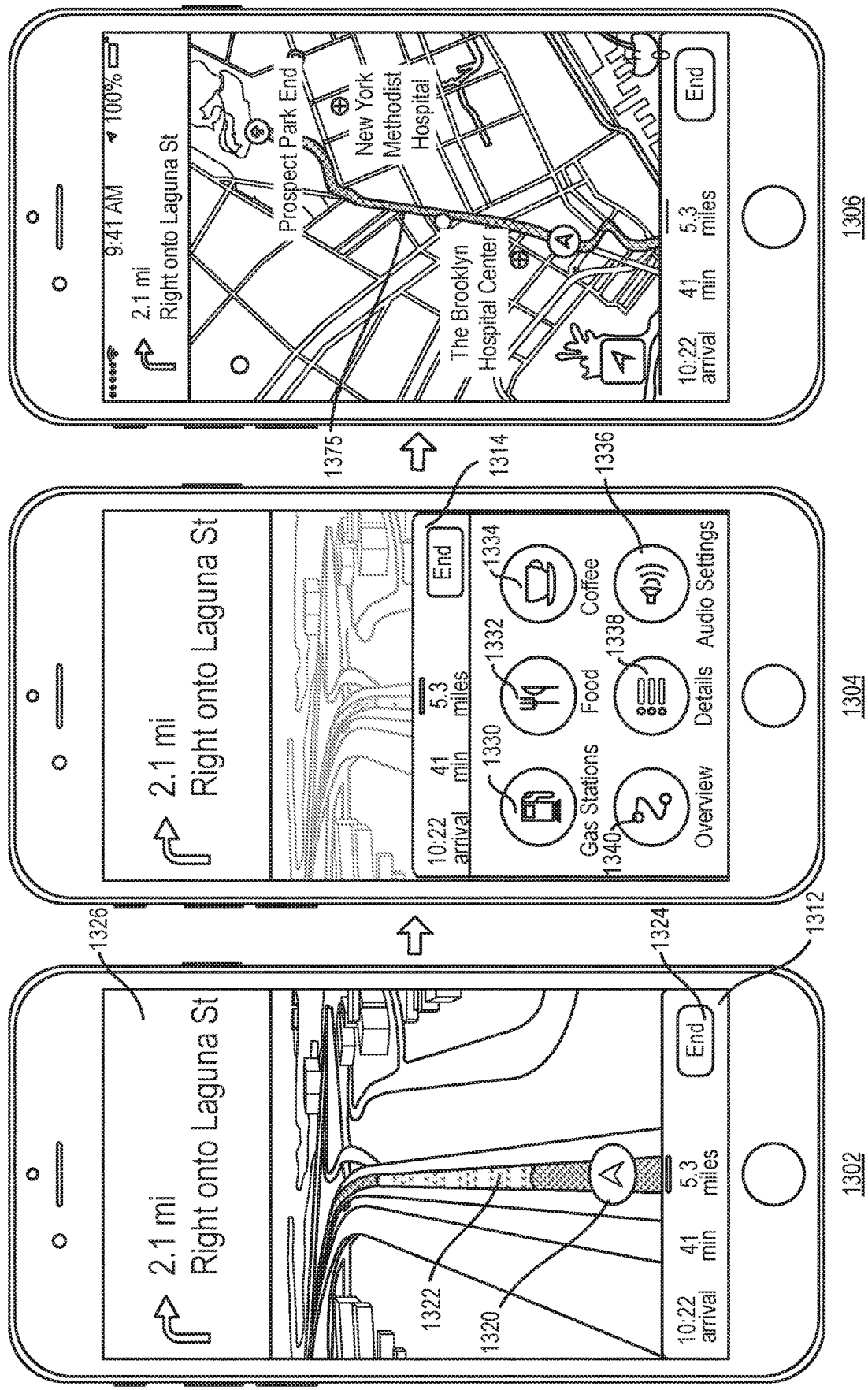
FIG. 13 presents an example of a navigation presentation that the map application presents upon the selection of the navigation launch control.

In its intermediate and maximized states 1102 and 1104, the route planning card 106 provides a navigation launch control 1160 for each route identified on the card. When selected for a route, the navigation launch control directs the map application to provide a navigation presentation for the selected route. FIG. 13 presents an example of a navigation presentation that the map application presents upon the selection of the navigation launch control 1160. This example illustrates that the map application uses a novel navigation card that during the navigation presentation can assume a minimized state 1312 or an intermediate state 1314 to provide additional information about the navigation. In this example, the navigation card does not have a maximized state, like those for the search card 102, location card 104, and route planning card 106. However, one of ordinary skill will realize that the navigation card of other embodiments has a maximized state.

These states of the navigation card are illustrated in three operational stages 1302-1306 of FIG. 13. The first stage 1302 shows the navigation card in a minimized state 1312 while a puck 1320 (representing the mobile device executing the map application) is traveling along a route 1322 to a destination. In this stage 1302, the minimized navigation card provides an estimated arrival time, a time to destination, a distance to destination, and a control 1324 for ending the navigation presentation. Also, in this stage and the other two stages 1304 and 1306, the navigation presentation displays a navigation banner 1326 to describe in text and graphics the maneuver at the next juncture along the route. In each of these three stages, the map application also provides an indication of traffic conditions along the navigated route, e.g., by using different colors for different segments along the route that have traffic congestion.

The second stage 1304 shows the navigation card after it has been expanded to its intermediate state 1314. In some embodiments, the navigation card assumes this state when the user selects the minimized version of this card, or selects the minimized card and drags it up. In some embodiments, the user can have the navigation card shrink from its intermediate state 1314 to its minimized state 1312 by tapping on the map that displays the navigation presentation or by selecting the intermediate version 1314 of this card (e.g., the top of the intermediate card) and dragging this card down.

In its intermediate state 1314, the navigation card displays several additional controls. In the illustrated example, the additional controls include three controls 1330, 1332, and 1334 for identifying gas stations, restaurants and coffee shops near the navigated route. Selection of these controls directs the map application to perform a search for gas stations, restaurants or coffee shops that are near the navigated route, and to display the search results on the map of the navigated route. The user can then select a displayed search result to get a navigation presentation to the location of the selected search result. Although FIG. 13 illustrates controls for specific types of businesses along the route (i.e., for gas stations, restaurants and coffees shops along the route), the map application of other embodiments provides controls for identifying other types of businesses or types of POIs along a navigated route (e.g., parks, vista points, etc.).

Another one of the controls displayed by the navigation card in its intermediate state 1314 is the audio setting control 1336, which when selected, opens a display area that provides controls for adjusting the audio settings (e.g., volume level, turning ON/OFF voice navigation instructions, etc.) for the navigation presentation. Yet another control is the route detail control 1338 that, when selected, provides a list of the maneuvers along the route. The last control is a route overview control 1340. As shown in the third state 1306, the selection of the route overview control 1340 causes the navigation card to shrink back to its minimized state, reduces the size of the navigation banner 1326, and provides an overview display 1375 of the navigated route. This overview display 1375 shows the position of the puck and the entire remaining portion of the route from the position of the puck to the destination.

Figure 14:
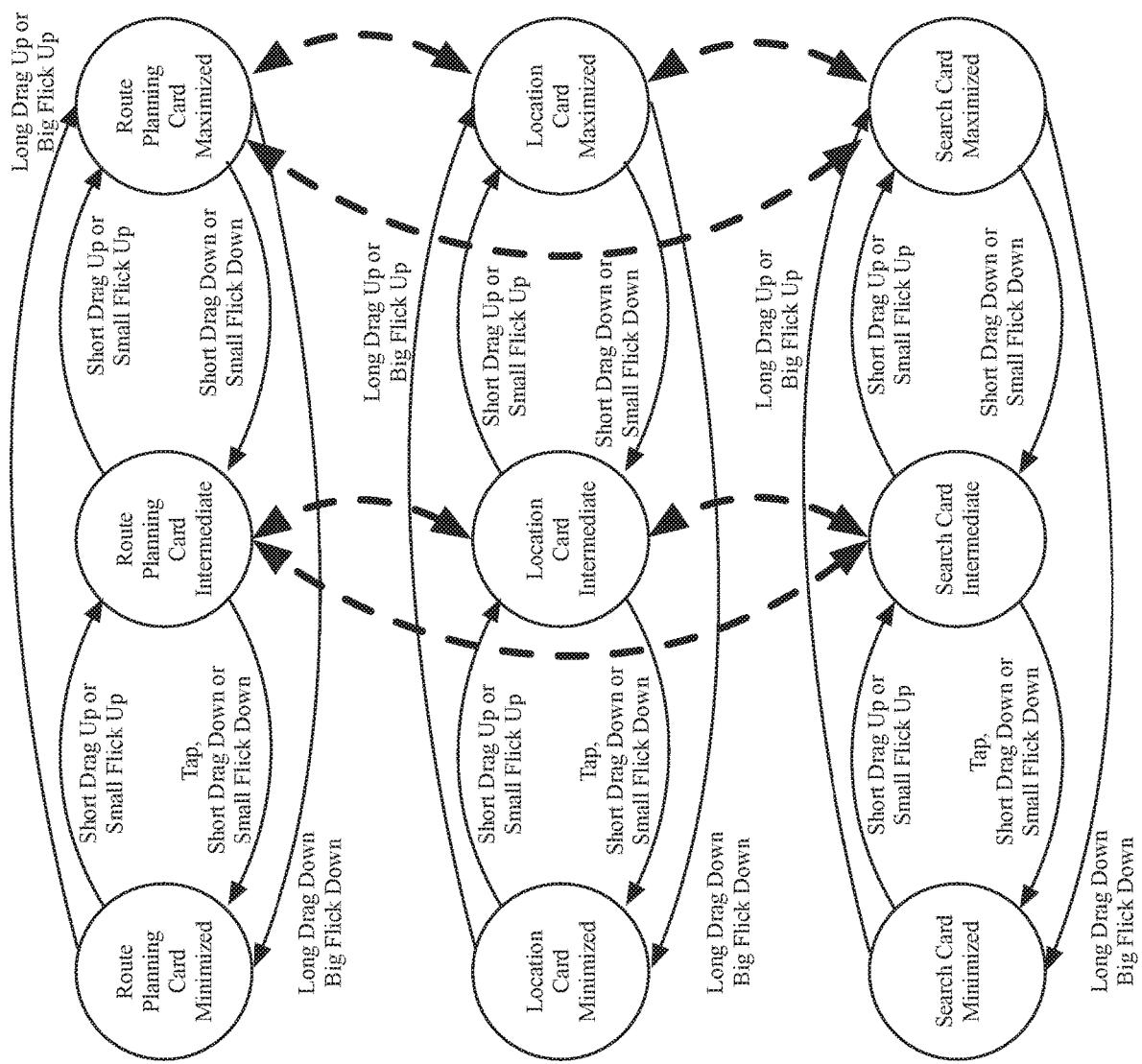
FIG. 14 illustrates a state diagram that shows (1) the various display states of search, location information, and route planning cards of some embodiments, and (2) transitions between these states.

FIG. 14 illustrates a state diagram that shows (1) the various display states of search, location information, and route planning cards of some embodiments, and (2) transitions between these states. This state diagram is implemented by a view coordinator of the map application that manages the views that are presented in the cards that are stacked on top of the map display area. This view coordinator will be further described below by reference to FIG. 20.

In the example illustrated in FIG. 14, three display states are shown for each of three cards, with the three display states being the minimized, intermediate and maximized states, and the three cards being the search card, the location information card, and the route planning card. As shown, the intra-state transitions between the states of any one of the cards is similar to the intra-state transitions of the other two states. Specifically, a small flick up or a short drag up directs the view coordinator to transition a card from its minimized state to its intermediate state, or from its intermediate state to its maximized state. Similarly, a small flick down or a short drag down directs the view coordinator to transition a card from its maximized state to its intermediate state, or from its intermediate state to its minimized state. A big flick up or a long drag up directs the view coordinator to transition a card from its minimized state to its maximized state, while a big flick down or a long drag down directs the view coordinator to transition a card from its maximized state to its minimized state.

Also, as shown, a tap operation directs the view coordinator to transition a card from its intermediate state to its minimized state. In some embodiments, such a tap operation can also be used to direct the view coordinator to transition a card from its maximized state to its intermediate state, and/or to transition a card from its minimized state to its intermediate state.

FIG. 14 also shows several sets of inter-state transitions from the search card to the location information card, from the search card to the route planning card, and from the location information card to the route planning card, from the location information card to the search card, from the route planning card to the search card, and from the route planning card to the location information card. This figure uses bi-directional arrows to represent two possible intra-state transitions between two card states so that this figure is not obscured with unnecessary detail.

As shown, when performing an inter-state transition from a first card to a second card, the view coordinator presents the second card in the same display state that it was presenting the first card before making the transition. Also, as described above, the map application in some embodiments transitions through the location information card when transitioning between the search card and route planning card for most locations. However, for certain locations (e.g., common locations (such as Work and Home), or locations without location information cards), the map application of these embodiments transitions between the search and route planning cards directly, without transitioning through the location information card. Other embodiments, on the other hand, provide affordances to allow the user to directly transition between the search and route planning cards for all locations.

In some embodiments, the card based UI design of the map application is part of a container based architecture that displays either cards or sidebars to provide search, location, route planning and navigation data and controls. This architecture of the map application of some embodiments dynamically picks either the cards or sidebars based on a set of criteria, which can include the dimensions of the device on which it executes, the content being displayed by the map application, and the orientation of the device.

Figure 15:
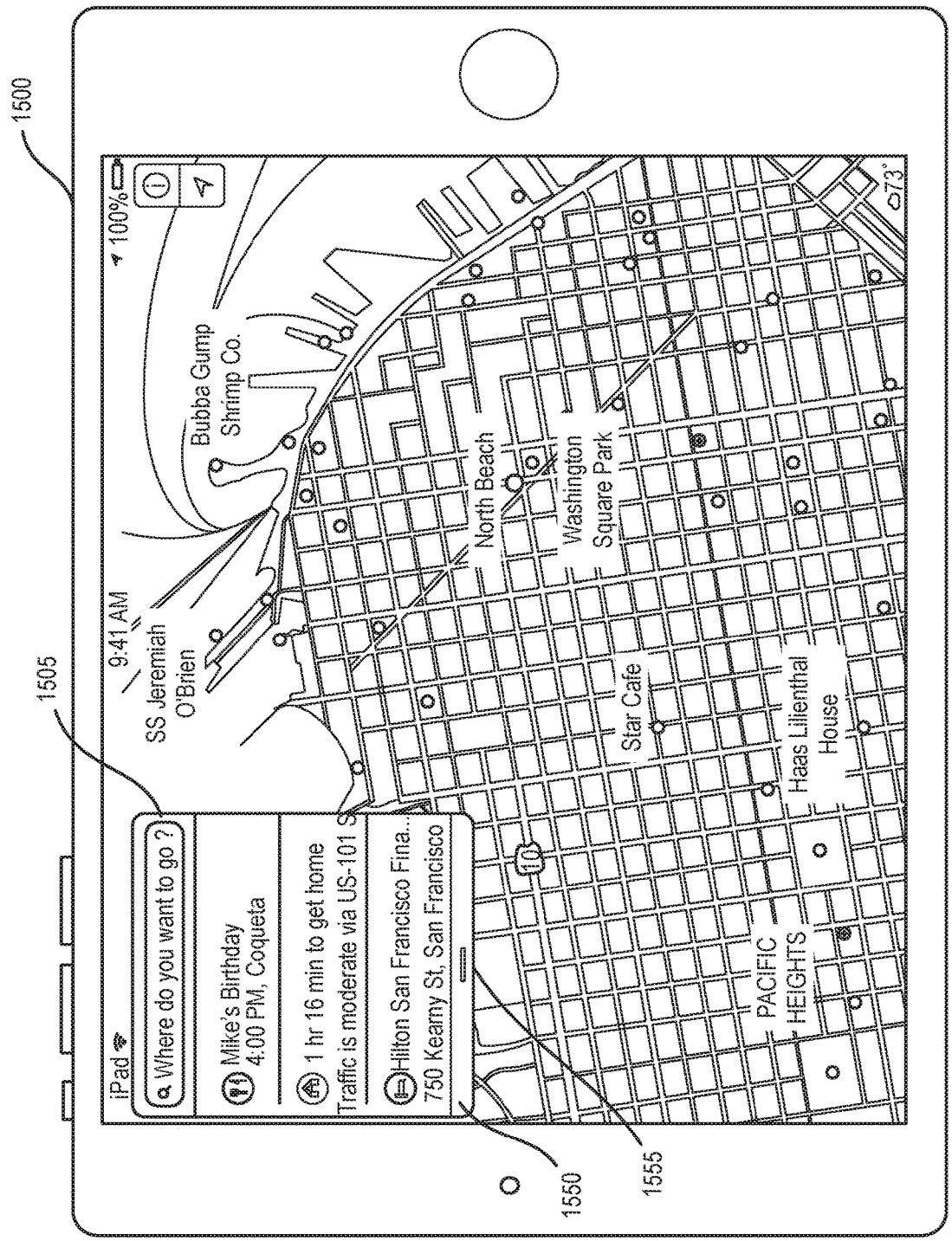
FIG. 15 illustrates an example of the sidebar based design of the map application of some embodiments. In this example, the map application is executing on a tablet, and a sidebar is displayed over the map display area on the left side of this area.

FIG. 15 illustrates an example of the sidebar based design of the map application of some embodiments. In this example, the map application is executing on a tablet 1500, and a sidebar 1505 is displayed over the map display area on the left side of this area. The sidebar in this example is a search sidebar in an intermediate state. Like the search, location, route planning and navigation cards described above, the map application in some embodiments also uses sidebars to display location, route planning, and navigation data and controls. Also, the user steps through these different types of sidebars following the same or similar sequence of operations that were described above for cards (e.g., like the sequence of operations shown in FIG. 2 for stepping through search, location, and route planning cards).

Figure 16:
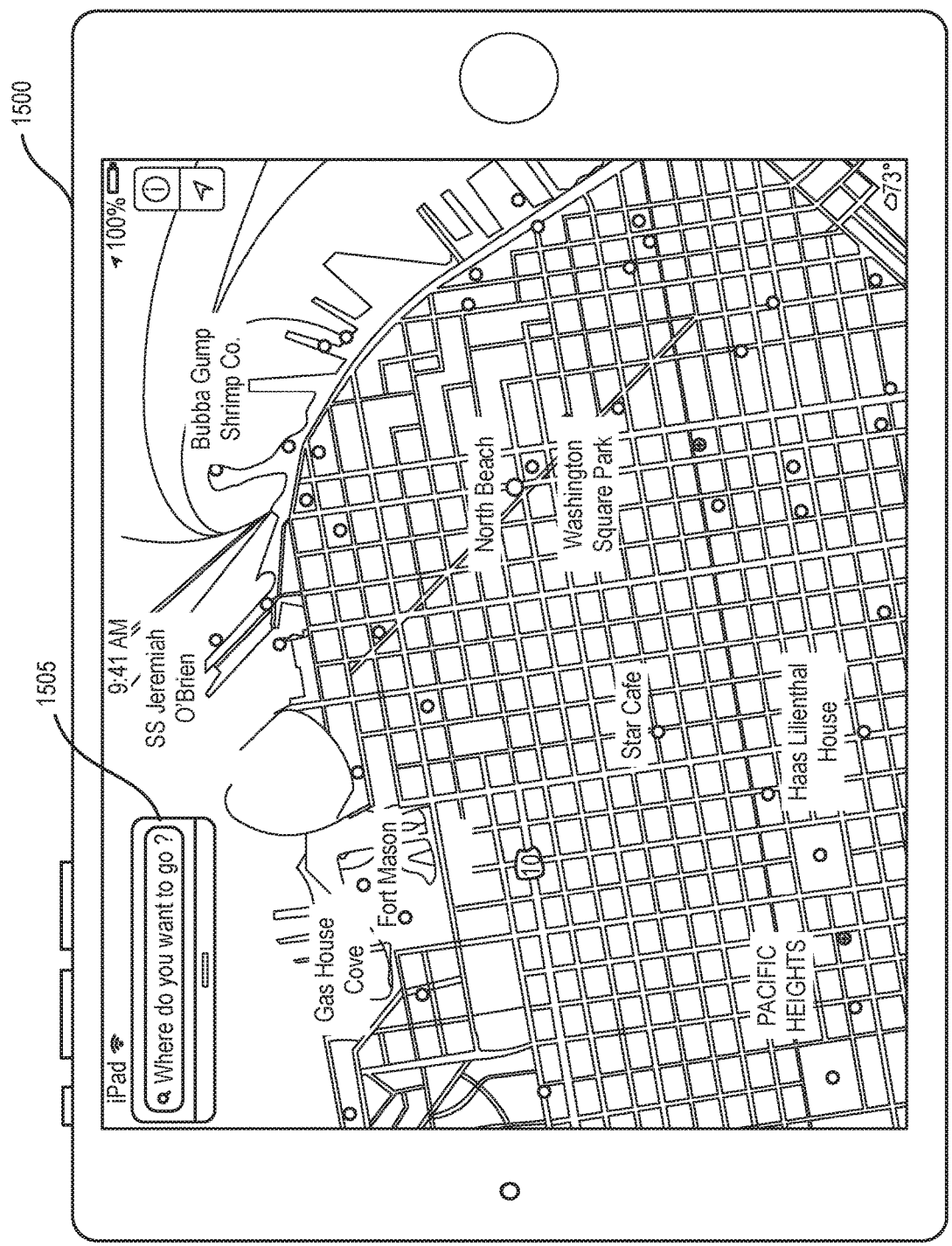
Figure 17:
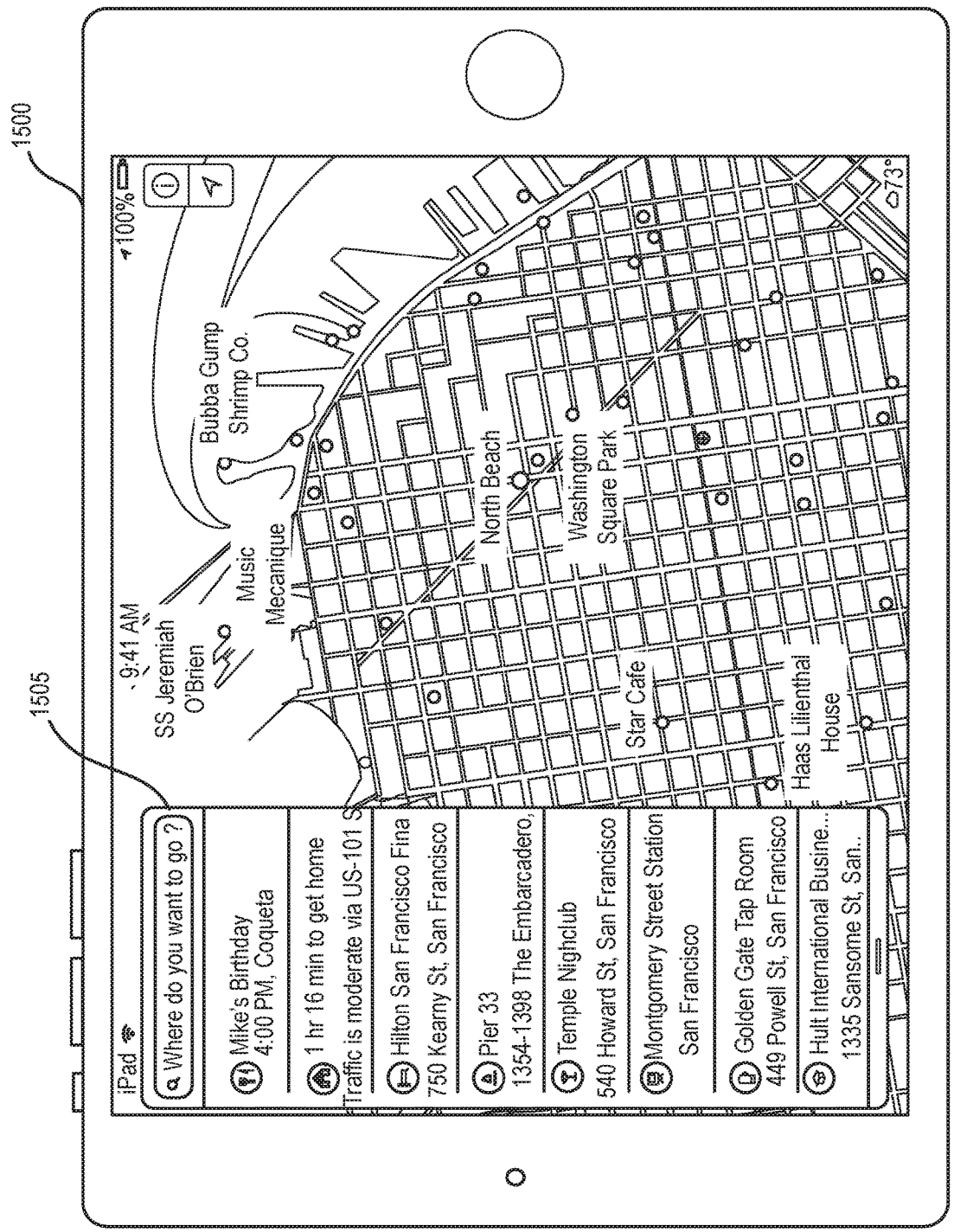
FIG. 17 illustrates a maximized search sidebar.

Also, like the search, location, and route planning cards, the search, location and route planning sidebars have three displays states, which are minimized, intermediate and maximized states. FIG. 15 illustrates the intermediate state of the search sidebar, populated with a list of predicted locations as no search parameter has been entered in the search field. FIG. 16 illustrates the minimized search sidebar, while FIG. 17 illustrates the maximized search sidebar. The user can direct a sidebar to transition between its different display states by performing the same or similar operations to those described above for the search, location, and route planning cards. For example, the user can touch select and drag the bottom 1550 of the search sidebar down or up to make this sidebar shrink from its intermediate state in FIG. 15 to its minimized state in FIG. 16, or its maximized state in FIG. 17. The bottom 1550 of the search sidebar has a handle 1555 that serves as a visual clue that the bottom of the sidebar is selectable.

Figure 18:
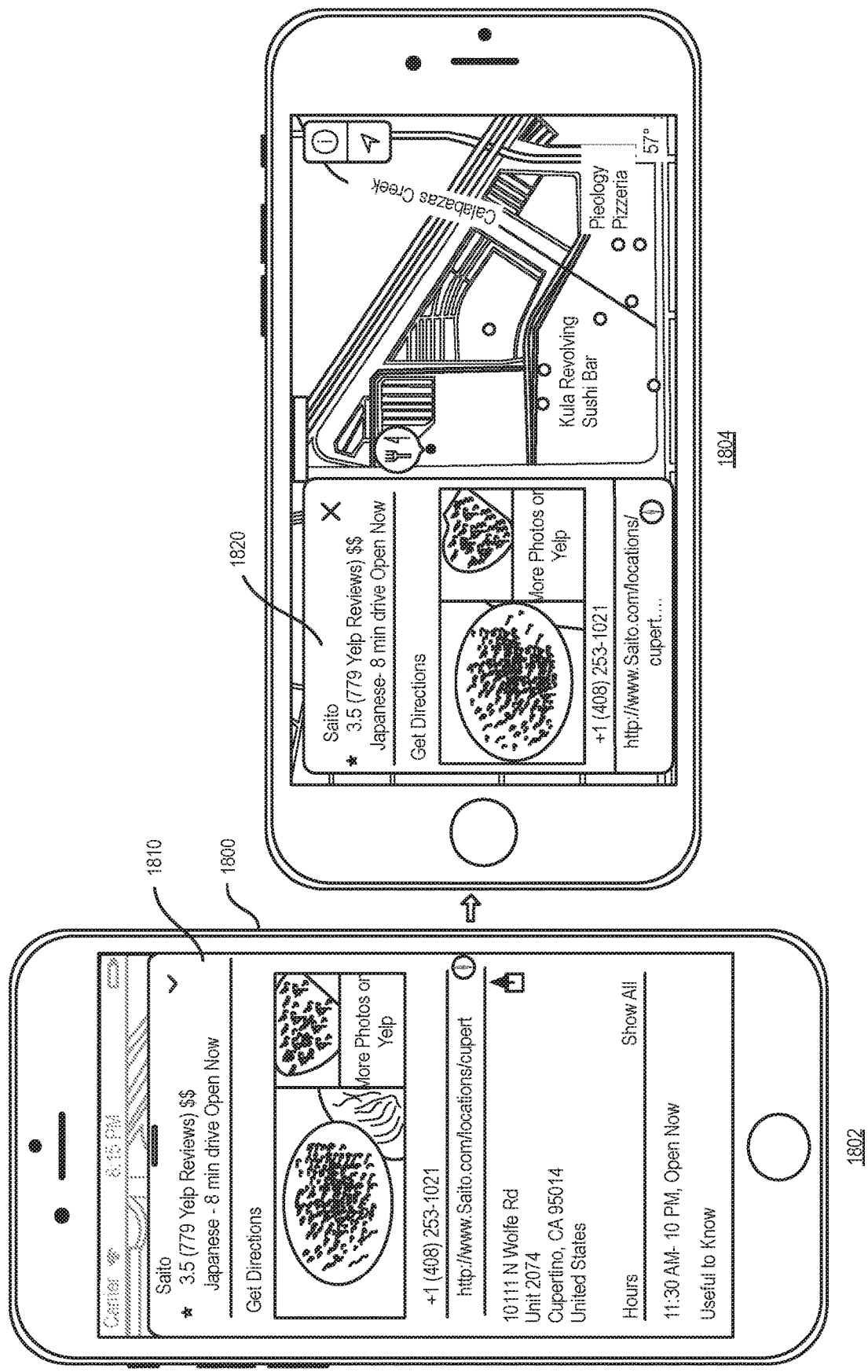
FIG. 18 illustrates an example of a location sidebar that is displayed for a location that is selected either in a search sidebar or on the map.

FIG. 18 illustrates an example of a location sidebar 1820 that is displayed for a location that is selected either in a search sidebar or on the map. In this example, the map application executes on a smartphone 1800 with a large display screen. Because of this phone's large screen, the map application can display the location information in either a card format or a sidebar format. Specifically, as shown in the first stage 1802 of FIG. 18, the map application shows a location card 1810 when the phone 1800 is held upright. On the other hand, when the device is rotated by 90 degrees and held in a sideway mode, the map application switches to the location sidebar 1820. This is because the phone's display screen is large and in the sideways position, it shows a sufficient amount of the map in the map display area, in order to allow the map application to switch from sidebar view that is more optimal view for the phone when it is operated in the sideways mode.

Figure 19:
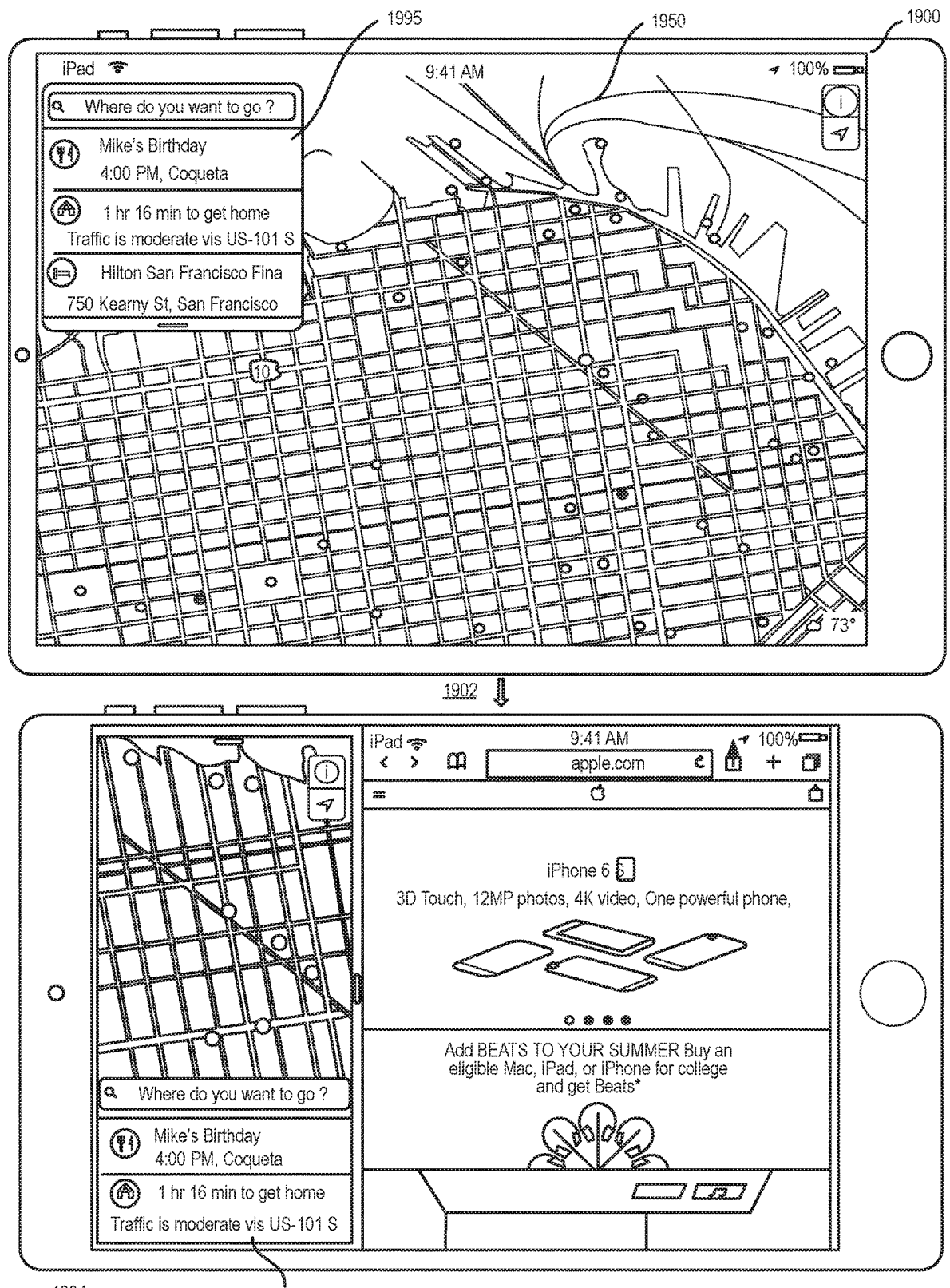
FIG. 19 illustrates an example of the map application switching from a sidebar style to a card style on a tablet when the map application is directed to share a portion of the tablet's display screen with another application.

FIG. 19 illustrates an example of the map application switching from a sidebar style to a card style on a tablet 1900 when the map application is directed to share a portion of the tablet's display screen with another application. This example is illustrated in two stages 1902 and 1904. The first stage 1902 shows the map application's output using the tablet's entire display screen to display a map display area 1950 and a search sidebar 1955 over the display area 1950. The second stage 1904 shows the output of the map application after it has switched from the search sidebar 1955 overlapping the left side of the map display area 1950 to a search card 1960 overlapping the bottom side of the map display area 1950. The map application has switched from the sidebar 1955 to the card 1960 because, as shown in the second stage 1904, the map application now shares part of the display screen with the output of another application. In other words, the tablet now operates in a split screen mode where the left side of the screen displays the output of the map application while the right side of the display screen displays the output of the other application.

Figure 20:
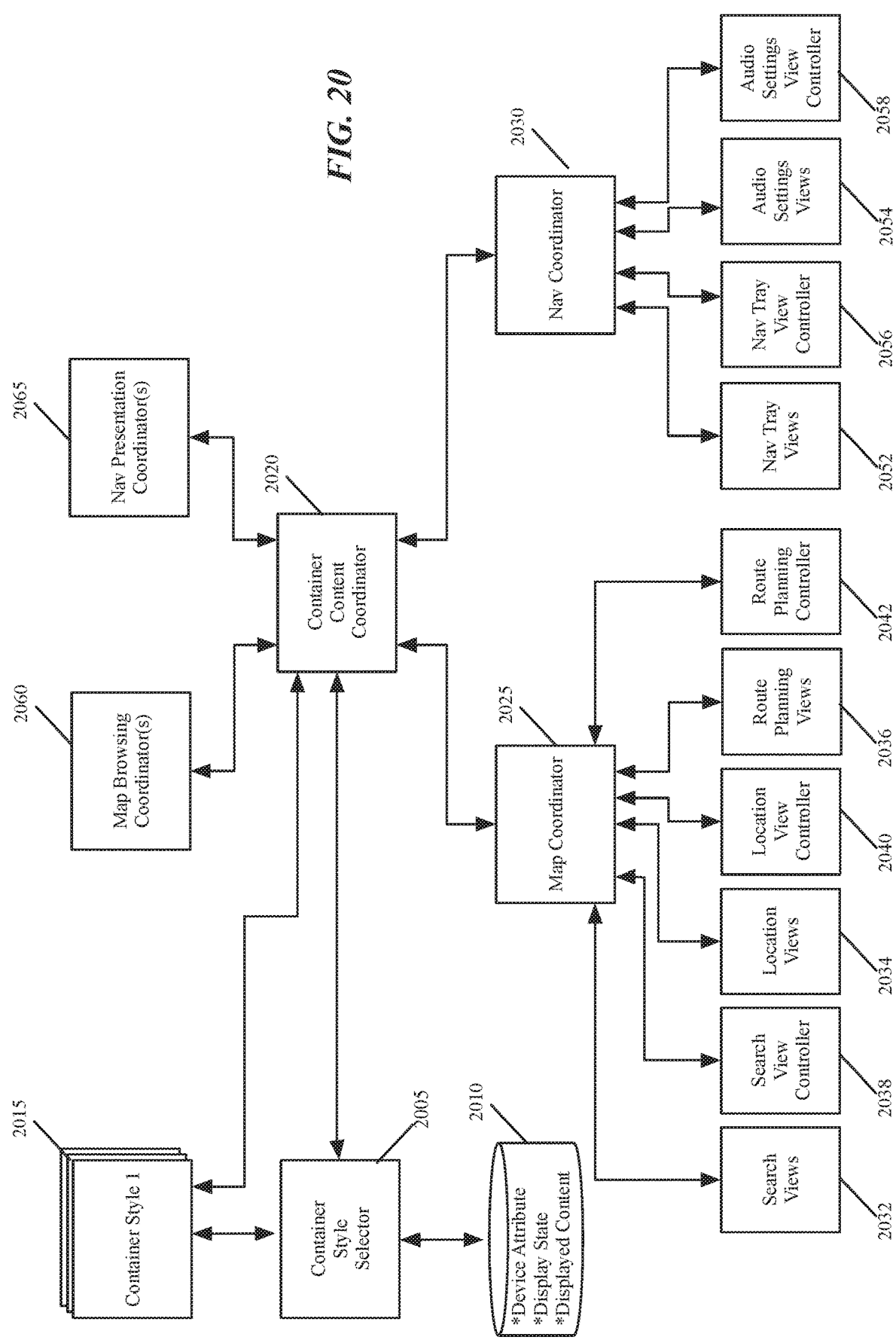
FIG. 20 illustrates an architectural block diagram of the map application that shows the modules that allow the map application to dynamically select the container style to use to display search, location, and route planning information and controls.

FIG. 20 illustrates an architectural block diagram of the map application that shows the modules that allow the map application to dynamically select the container style to use to display search, location, and route planning information and controls. As mentioned, the container styles in some embodiments are cards and sidebars, but in other embodiments they might include other types of containers. In this dynamic, container architecture, each container style specifies a particular type of display area (e.g., card, sidebar, etc.) (1) that stacks on top of the map display area at a particular location, (2) that has a number of display states (e.g., minimized, intermediate, and maximized states), and (3) that transitions between these display states based on user input.

As shown in FIG. 20, the map application has a container style selector 2005 that dynamically picks a container style 2015 (e.g., selects cards or sidebars) based on a set of criteria that are resolved by a set of attributes stored in the attribute storage 2010. Examples of these attributes include the dimensions of the device on which the map application executes, the orientation of the device, any other content that the device may be displaying concurrently with the map application, and the content being displayed by the map application. As the attributes change, the container selector on certain devices in some embodiments dynamically changes the container style that it picks to account for this change. On some devices, the map application in some embodiments does not change the container style that it picks, when only one container style on those devices.

The container style selector 2005 informs a container content coordinator 2020 of the container style that it selects, each time that it selects a new container style. In some embodiments, the container style selector 2005 informs the coordinator by setting a current container style parameter in a data storage accessible to the content coordinator 2020. For search, location or route planning container (e.g., card container or sidebar container), the content coordinator 2020 uses a map coordinator 2025 to present the different map views in the container, to resize the containers based on user input, and to transition between the different map views in the container. The content coordinator 2020 passes the container style to use to the map coordinator 2025.

As shown in FIG. 20, the views that are presented by the map coordinator 2020 include search views 2032, location views 2034, and route planning views 2036. These views include affordances (i.e., controls) that when selected require the map application to perform certain operations. To perform these operations, the map coordinator 2025 interacts with search view controller 2038, location view controller 2040, and route planning controller 2042. Examples of the operations that the view controllers 2038, 2040, and 2042 perform include changing the display state of the views, changing the content inside the views (e.g., filtering the search results in a search display area), and performing the transition between the views (e.g., the transition from a search view to location view, or from a location view to a route planning view). To perform these operations (e.g., to show the location information for an entry selected from the search container), the view controllers can call other modules of the map application to obtain the desired information and/or achieve the desired animation.

For the navigation container (e.g., navigation card or navigation sidebar), the content coordinator 2020 uses a navigation coordinator 2030 to present the different navigation views in the container, to resize the containers based on user input, and to transition between the different views in the container. The content coordinator 2020 passes the container style to use to the navigation coordinator 2030.

As shown in FIG. 20, the views that are presented by the navigation coordinator 2030 include (1) navigation tray views 2052 that we described above by reference to FIG. 13, and (2) audio setting views 2034 that display controls for adjusting audio settings for the navigation presentation. These views include affordances (i.e., controls) that when selected require the map application to perform certain operations. To perform these operations, the navigation coordinator 2030 interacts with navigation tray view controller 2056 and audio setting view controller 2058. Examples of the operations that the view controllers 2056 and 2058 perform include changing the display state of the views, adjusting the audio parameters for the audio portion of the navigation presentation, initiating searches for gas stations and restaurants near the navigated route, providing an overview of the route, etc.

To perform these operations (e.g., to perform a search along the route), the view controllers can call other modules of the map application to obtain the desired information and/or achieve the desired animation. FIG. 20 illustrates the content coordinator 2020 communicating with one or more map browsing coordinators 2060 and one or more navigation presentation coordinators 2065 in order to conceptually represent that this coordinator 2020 and its child coordinators 2025 and 2030 use map-browsing and navigation modules of the map application in some embodiments to process some of the operations that are initiated through the displayed containers and/or are presented in the displayed containers.

Figure 21:
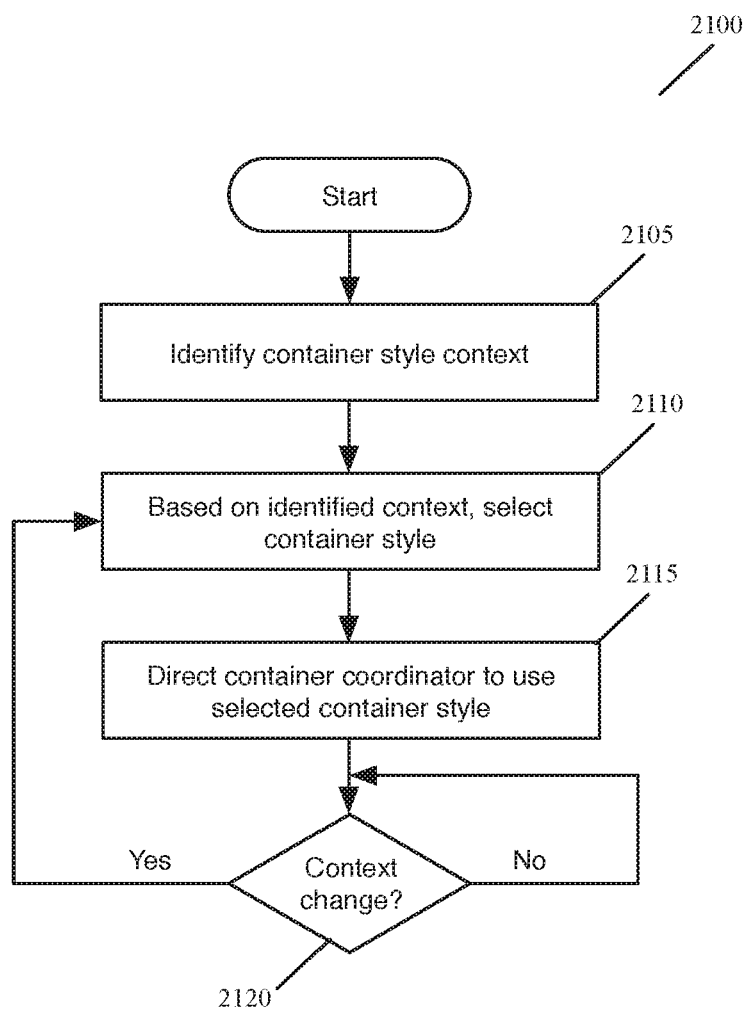
FIG. 21 illustrates that the container style selector performs in some embodiments to identify dynamically the container style to use.

FIG. 21 illustrates that the container style selector 2005 performs in some embodiments to identify dynamically the container style to use. The style selector 2005 performs this process in some embodiments on devices on which the container style can change while the map application is being displayed. For devices on which the container style cannot change (i.e., on devices on which only one container style is available), the container style selector 2005 only performs the first three operations 2105-2115 of this process 2100 when the map application initially starts to identify the container style to use on that device.

As shown, the process 2100 initially examines (at 2105) a set of one or more attributes that define the container style context. In some embodiments, this attribute set includes attributes related to the device on which the map application executes. Examples of these attributes include the dimensions of the device on which the map application executes, the orientation of the device, any other content that the device may be displaying concurrently with the map application, etc. In some embodiments, the attribute set also includes one or more attributes related to the operation of the map application, e.g., the content being displayed by the map application.

At 2110, the process selects a container style based on the identified container style context. In some embodiments, the process makes this selection based on a set of rules that specify the container style to select for the different attribute sets. For instance, one rule might say that on a tablet the sidebar container should be used unless with the map application output display, the device is concurrently displaying the output of another application that takes up more than a threshold amount (e.g., 30%, 40%, 50%, etc.) of screen space. For a smartphone with a large display screen, two rules might specify that the card container should be used when the phone is operated in an upright mode, while the sidebar container should be used when the phone is operated in the sideways mode.

At 2115, the process directs the container coordinator 2020 to use the selected container style. As mentioned above, the child map and navigation coordinators 2025 and 2030 of the container coordinator 2020 then use this setting to select the container style for the views that they manage. As the attributes change, the container selector on certain devices in some embodiments dynamically changes the container style that it picks to account for this change. Thus, after 2115, the process transitions to 2120, where it determines whether the container style context has changed. If not, the process remains in this state 2120 until the context changes or until the user closes the map application. When the process 2100 determines (at 2120) that the context has changed, the process returns to 2110, to select a container style based on the identified context and then direct the container coordinator to use the selected style.

Several touch and gesture operations for modifying the size of the cards were described above by reference to FIGS. 1-21. FIGS. 22-31 present examples that illustrate several other gesture operations that in some embodiments direct the map application to modify the size of a card that it displays over the map display area of the map application. In these examples, the card that is being resized is the search card. One of ordinary skill will realize that the same or similar gesture operations are used in some embodiments to modify the sizes of the other cards, such as the location information card 104 and the route planning card 106.

Figure 22:
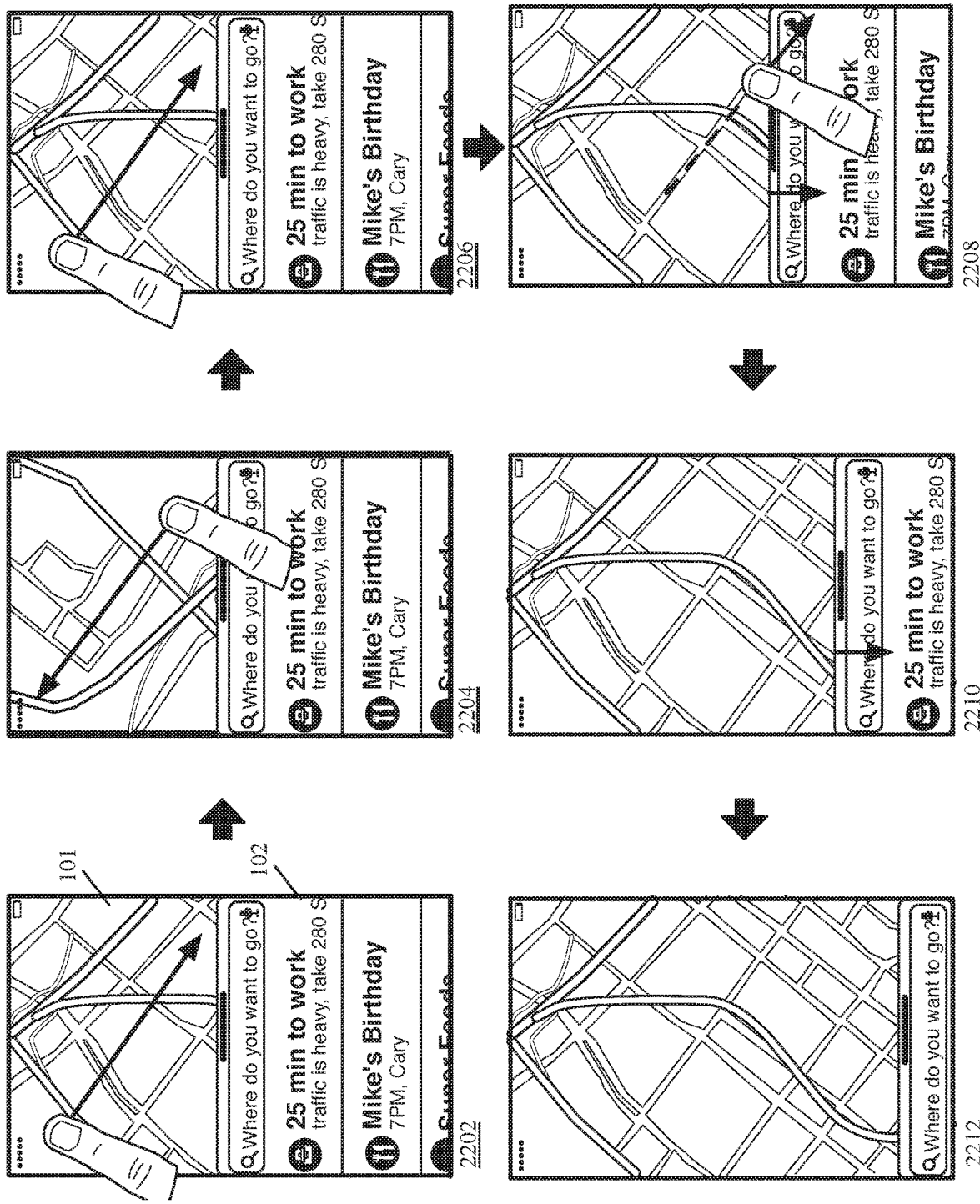
FIGS. 22-31 present examples that illustrate several other gesture operations that in some embodiments direct the map application to modify the size of a card that it displays over the map display area of the map application.

FIG. 22 presents an example that illustrates the map application minimizing an intermediate sized search card in response to a particular type of pan operation that is performed on the map display area. Specifically, this example shows that a touch drag operation (also called swipe operation) on the map display area that reaches a certain threshold vicinity of the intermediate sized search card causes the card to minimize, but such a touch drag operation does not cause the card to minimize when this drag operation does not reach the threshold vicinity of the intermediate sized search card.

The example in FIG. 22 is illustrated in terms of six operational stages 2202-2212 of the map application. To minimize clutter in this figure, the bezel of the mobile device (e.g., smartphone) that executes the map application is not displayed in this figure. However, one of ordinary skill will realize that the touch gestures illustrated in this figure are performed through the touch-sensitive display screen of this mobile device.

The first stage 2202 shows the search card 102 opened to its intermediate state to partially overlap the map display area 101. The map display area 101 displays a map of a region in the portion of this display area that the search card does not overlap. The first stage 2202 also shows the user starting a swipe operation on the portion of the map display area 101 that the search card 102 does not overlap. This stage shows the user touching the top left corner of the map display area and starting to drag his finger to the bottom right corner of this display area. In this example, the touch selection or swipe operation within the map display area does not direct the map application in some embodiments to minimize the search card, unlike some of the embodiments that were described above.

The second stage 2204 shows that as a result of this right downward swipe operation, the map display area is now displaying another portion of the map. This stage 2204 also shows the location of the user's finger at the end of this downward swipe. This location is not within the threshold vicinity of the intermediate search card to cause this card to minimize. Also, the second stage 2204 shows that at the end of the right downward swipe operation, the user starts a left upward swipe operation.

The third stage 2206 shows that as a result of the left upward swipe operation, the map display area displays another portion of the map. This stage 2206 also shows that at the end of the left upward swipe operation, the user starts another right downward swipe operation. The fourth stage 2208 shows that this second downward swipe operation reaches and passes the displayed position of the top of the intermediate sized search card. Once the finger reaches within a threshold distance of the top of the intermediate sized search card, the map application starts to reduce the size of the search card from its intermediate state to its minimized state. The fourth stage 2208 shows the search card moving downwards from its intermediate state to its minimized state.

To determine whether the finger is within the threshold distance of the top of the intermediate search card, the map application defines a bounding box around the search card. This bounding box has its bottom, right and left sides aligned with the bottom, right and left sides of the search card, but has a top side that is the threshold distance above the top side of the card. When the map application detects that the touch contact for the swipe input is within the bounding box, and the direction of the swipe is downwards, the map application in some embodiments starts to slide the search card down.

The fifth stage 2210 shows that even after the user has ended the downward swipe operation and has removed his finger (i.e., has terminated the touch contact with the mobile device's display screen), the search card continues its downward movement towards its minimized state. This is because once the map application starts a card's transition from its intermediate state to its minimized state in response to a swipe operation on the map display area, the map application in some embodiments continues with this transition even when the user ends the downward swipe operation by ending the touch contact, or by starting an upward or sideways swipe operation.

The sixth stage 2212 shows the search card in its minimized state after it has completed its transition to this stage. In the embodiments that have off-screen states for the cards, the gesture operation illustrated in FIG. 22 can direct the map application to move the card to an off-screen state. In some of these embodiments, a downward swipe operation first causes the card to stop at its minimized state, unless the swipe operation continues, in which case the card then is pushed off-screen to its off-screen state.

Also, other embodiments use other criteria for causing an intermediate sized card to shrink to its minimized state or to its off-screen state. For instance, in some embodiments, the map application shrinks the card from its intermediate state to its minimized or off-screen state when the swipe gesture in the map display area is larger than a certain amount and/or causes the map to pan by more than a threshold amount. In some embodiments, the intermediate sized card also shrinks to its minimized or off-screen state when the user performs on the map a downward swipe gesture that has a velocity or acceleration that is greater than a threshold velocity or acceleration.

Figure 23:
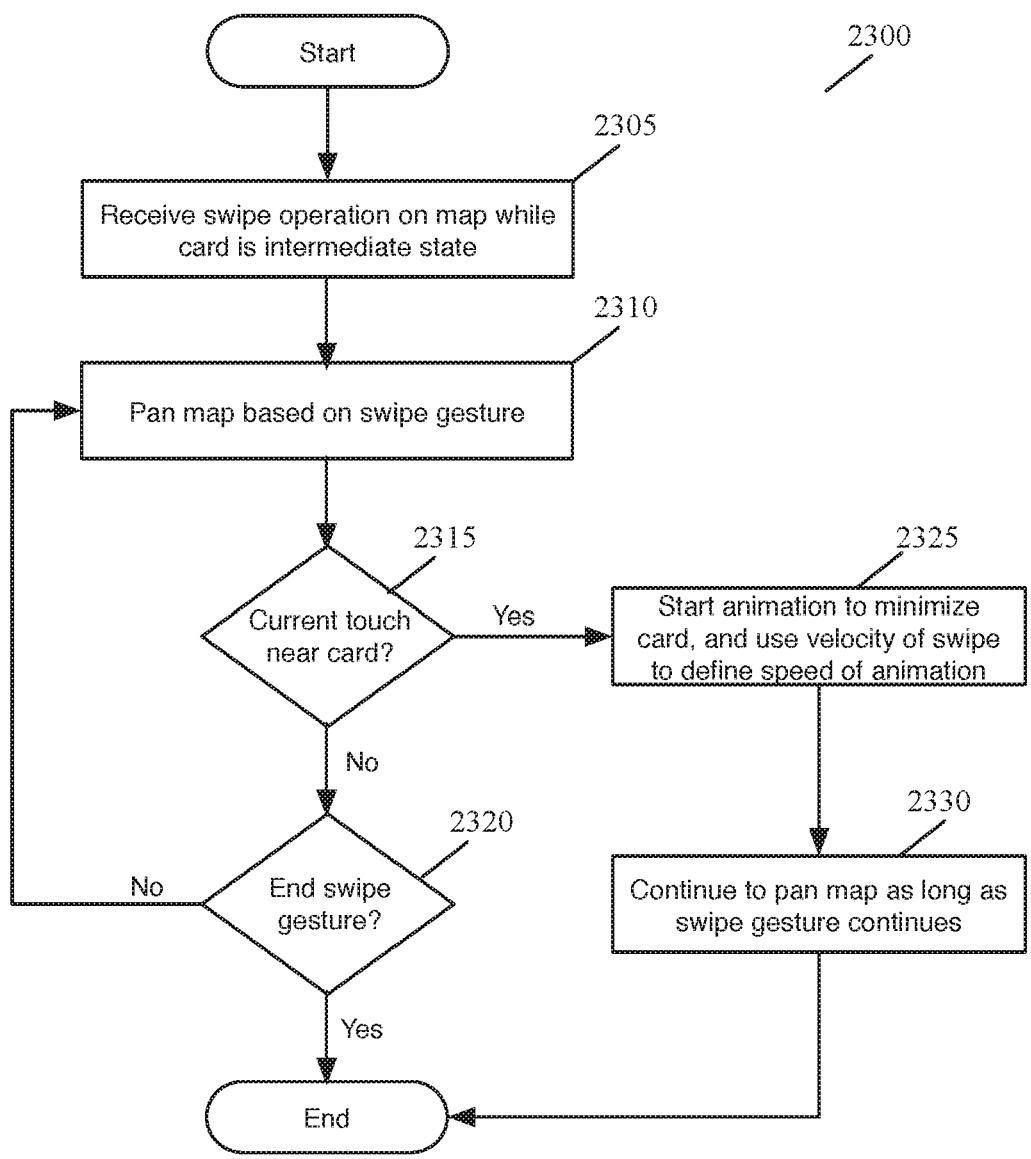

FIG. 23 conceptually illustrates a process 2300 that the map application of some embodiments performs to direct an intermediate sized card to shrink to the card's minimized state. As shown, the process starts (at 2305) when the map application detects the start of a swipe gesture on the map that is displayed in the map display area while the map application displays an intermediate sized card over the map display area. In response to the received swipe gesture, the process 2300 performs (at 2310) a pan operation that changes the portion of the map that is currently being displayed in the map display area. One example of such a pan operation was described above by references to stages 2202 and 2204 of FIG. 22.

Next, at 2315, the process determines whether the current location of the touch is within a threshold distance of the top of the intermediate sized card. If not, the process determines (at 2320) whether the swipe gesture has ended. If it has ended, the process ends. If the swipe gesture has not ended, the process returns to 2310 to perform another pan operation to again change the portion of the map that is currently being displayed in the map display area. In some embodiments, this operation changes the map based on the magnitude and direction of the last incremental portion of the swipe gesture (i.e., the portion received since the last iteration of the panning operation 2310). After this panning operation, the process again transitions to 2315.

If the process determines (at 2315) that the current touch location is within a threshold distance of the top of the intermediate sized card, the process 2300 starts (at 2325) an animation process that defines a series of successive positions for the card as it shrinks from its intermediate state to its minimized state. This animation process accounts for the velocity of the swipe gesture in some embodiments. Specifically, in some embodiments, the animation process shrinks the card faster (i.e., defines a shorter time duration for displaying the various shrinking states of the card) when the velocity of the swipe gesture is greater. The animation process in some embodiments applies a low pass filter to the velocity parameter values in order to smooth out the animation of the descending card. In some of these embodiments, the animation process slows down the card's speed of descent as the card gets closer to its minimized state.

After initiating the animation process (at 2325) to direct the card to minimize, the process 2300 continues (at 2330) to pan the map in the map display area based on the swipe gesture input, while this input lasts. The process 2300 ends when the swipe gesture ends. Although FIGS. 22 and 23 illustrate the use of pan gesture to shrink the card from an intermediate state to a minimized state, one of ordinary sill will realize that in some embodiments such gestures can be used to shrink any card from any non off-screen state to the minimized or off-screen states.

In some embodiments, the map application also allows a user to use upward and downward touch swipe operations to change the size of a minimized card or a maximized card. In some of these embodiments, however, these gestures have to meet certain criteria before the map application modifies the size of a minimized or maximized card in response to these gestures. For instance, in some embodiments, an upward or downward swipe operation can adjust the size of a minimized card or a maximized card when the swipe operation starts at the bottom side or top side of the display screen. The mobile device of some embodiments associates the bottom and top sides of the display screen with other affordances that are activated by upward and downward swipe operations. In some embodiments, the map application uses a set of rules to determine whether to resize a minimized or maximized card based on an upward or downward swipe operation that is initiated from the edge of the display screen, when such an operation might also be intended to activate other affordances provided by the mobile device.

Figure 24:
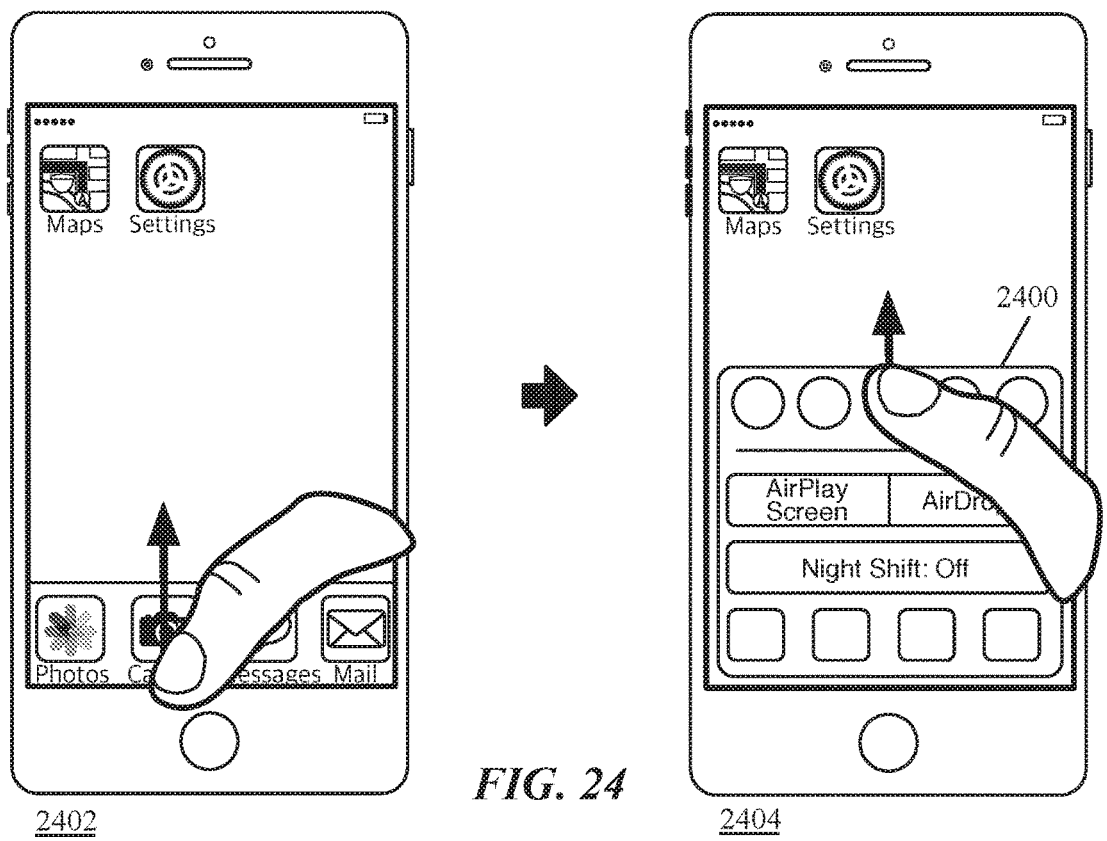
Figure 25:
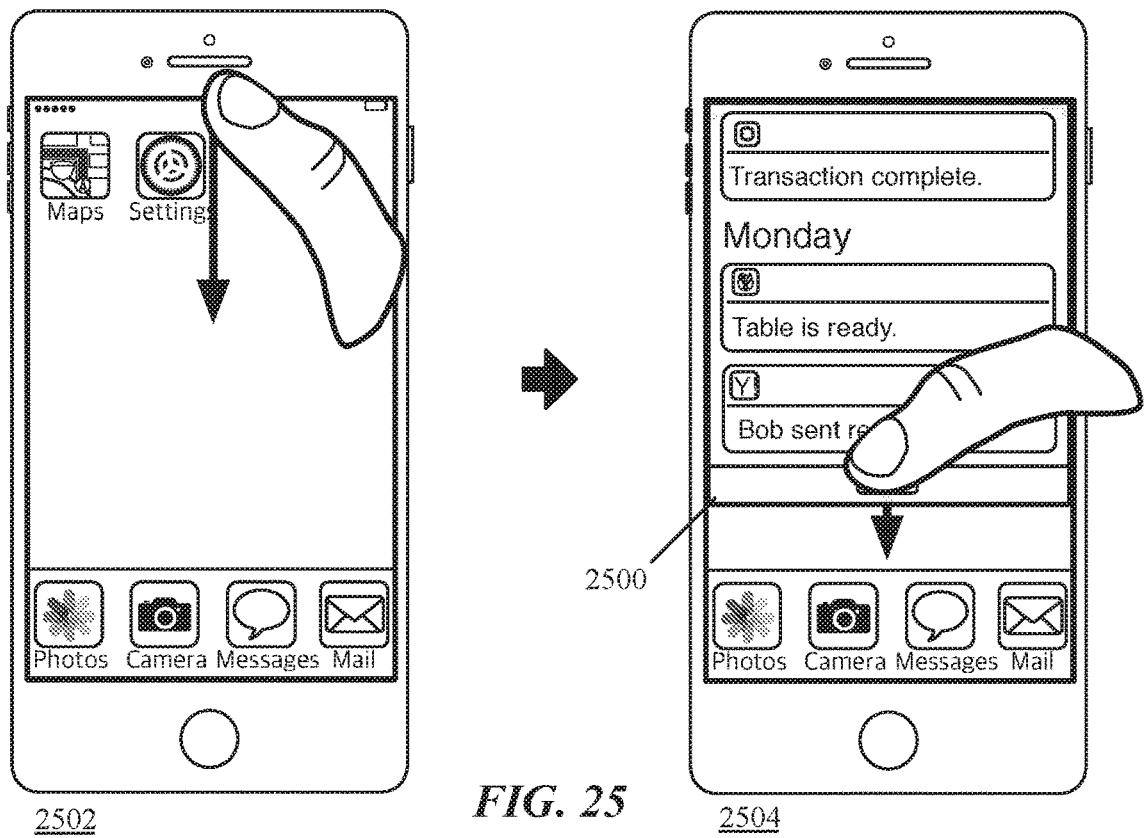

FIGS. 24 and 25 illustrate examples of two sets of controls that the mobile device of some embodiments provide when the user performs an upward swipe operation that starts at the bottom side of the device's display screen and a downward swipe operation that starts at the top side of the device's display screen. In two stages 2402 and 2404, FIG. 24 illustrates that in some embodiments an upward swipe operation starting from the bottom of the display screen directs the mobile device to present a control center 2400 that provides quick access to certain system level functions, such as a WiFi control, a Bluetooth control, a screen lock control, a clock, a calculator, etc. Similarly, in two stages 2502 and 2504, FIG. 25 illustrates that in some embodiments a downward swipe operation starting from the top of the display screen directs the mobile device to present a notification center 2500 that displays various notifications, such as calendar events, stock quotes, and data from one or more notification widgets.

Figure 26:
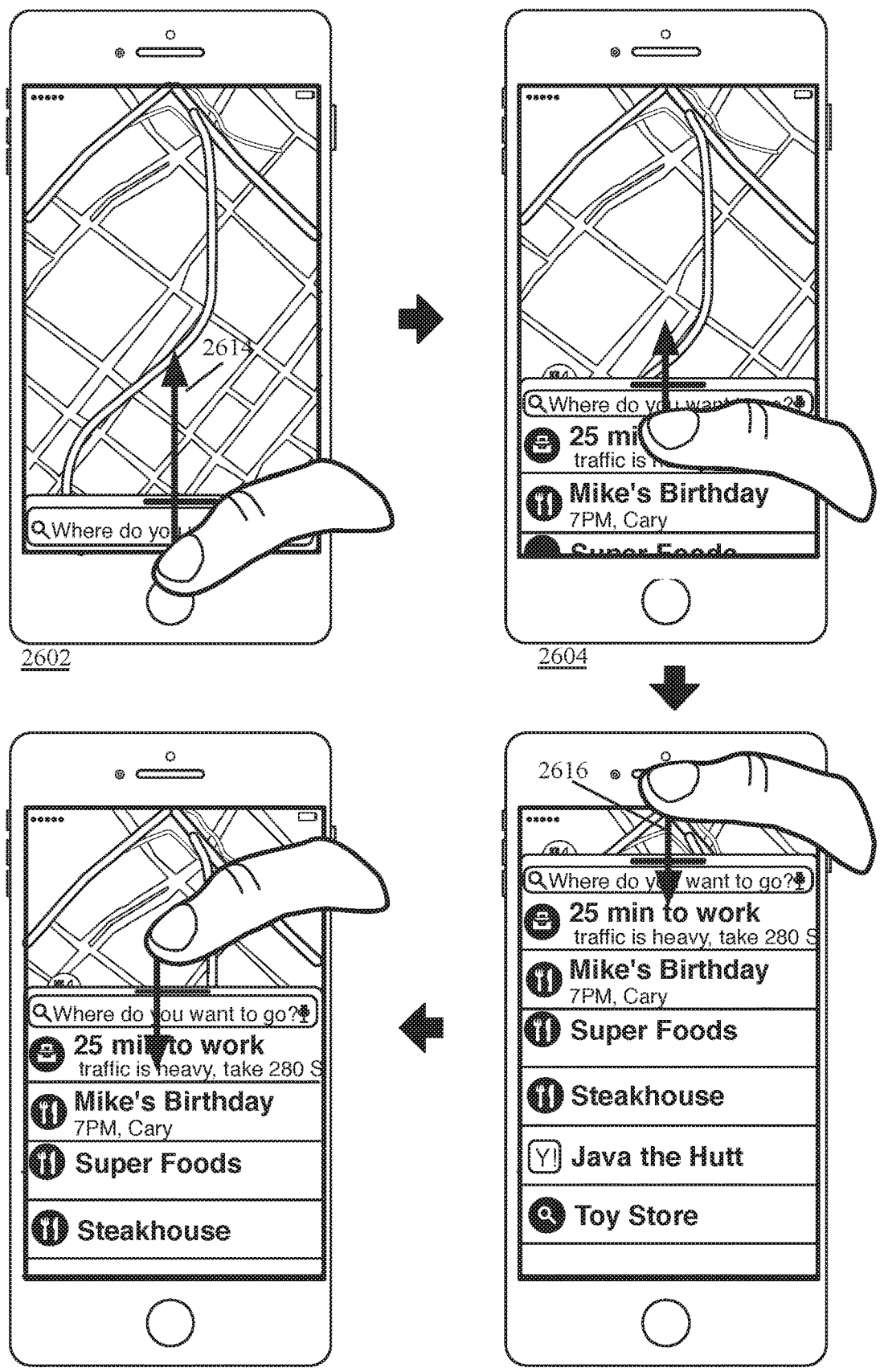

FIG. 26 presents an example that illustrates the map application changing the size of a minimized search card and a maximized search card in response first to an upward swipe and then to a downward swipe operation, where both operations start at the edge of the display screen. In some embodiments, the map application performs such a resizing operation even though the mobile device's operating system typically associates such operations with other sets of controls, such as the control center 2400 and the notification center 2500. The process that the map application employs to provide such functionality in an environment where the edge-initiated upward or downward swipe operations are associated with other functionality will be described below by reference to FIG. 31.

FIG. 26 illustrates the example in terms of four operational stages 2602-2608 of the map application. The first stage 2602 shows the search card 102 in a minimized state. It also shows the user's finger on the bezel of the mobile device below the display screen. The finger has started an upward swipe operation in this stage as represented by the arrow 2614. Once the user's finger reaches the edge of the display screen, the map application starts moving the search card upwards to increase its size. In some embodiments, the display screen covers the entire front side of the mobile device. In these embodiments, the swipe up or down operation that the map application processes to determine whether it should resize a minimized or maximized card is a swipe operation that reaches the boundary of the display area that presents the output display (e.g., the map display area and the search card) generated by the map application.

The second stage 2604 shows the card practically at its intermediate state as a result of the upward swipe gesture. It also shows the swipe gesture continuing. This stage also shows the location of the finger to be below the search field of the search card 102. The finger is at this location as the map application started moving the card upwards before the finger could pass the search field as the finger started to drag across the screen from the bottom side of the display screen.

When the upward swipe gesture continues after the search card has reached its intermediate state, the map application continues the movement of this card upward so that it can reach its maximized state. In some embodiments, the map application can transition the card from its minimized state to its maximized state even when the edge-initiated upward swipe gesture ends quickly (e.g., ends before the card reaches its intermediate state) if the swipe gesture has a velocity or acceleration that is greater than a threshold velocity or acceleration (e.g., when the swipe gesture is a flick with such velocity or acceleration). Thus, in these embodiments, the user does not need to push the card past its intermediate state to cause it to expand from its minimized state to its maximized state by performing an edge-initiated upward swipe gesture.

The third stage 2606 shows the card after it has reached its maximized state. This stage also shows the user starting a downward swipe gesture by placing his finger at the topside of the bezel and dragging it downward (as represented by arrow 2616). Once the user's finger reaches the top edge of the map display area, the map application starts moving the search card downwards to decrease its size. The fourth stage 2608 shows the card near its intermediate state as a result of the downward swipe gesture. It also shows the downward swipe gesture continuing. This stage also shows the location of the finger to be above the search card 102. The finger is at this location as the map application started moving the card downwards before the finger could reach the search card when the finger started to drag across the screen from the top of the map display area.

When the downward swipe gesture continues after the search card has reached its intermediate state, the map application continues the movement of this card downward so that it can reach its minimized state. In some embodiments, the map application can transition the card from its maximized state to its minimized state even when the edge-initiated downward swipe gesture ends quickly (e.g., ends before the card reaches its intermediate state) if the swipe gesture has a velocity or acceleration that is greater than a threshold velocity or acceleration. Thus, in these embodiments, the user does not need to push the card past its intermediate state to cause it to shrink from its maximized state to its minimized state by performing an edge-initiated downward swipe gesture.

In the embodiments that have off-screen states for the cards, a downward swipe gesture can direct the map application to move the card to an off-screen state. In some of these embodiments, the downward swipe gesture first causes a maximized card to stop at its minimized state, unless the swipe operation continues, in which case the card then is pushed off-screen to its off-screen state. Also, in some embodiments, the downward swipe gesture can cause the maximized card to transition directly to its off-screen state (without first stopping in its intermediate and minimized states) when the swipe gesture has a velocity or acceleration that is greater than a threshold velocity or acceleration.

In some embodiments, once the map application starts to slide the card upward or downward in response to an edge-initiated swipe gesture while the card is in the minimized or maximized state, the map application continues the upward slide or downward slide of the card even after the swipe gesture has ended. The map application of some of these embodiments stops the sliding card at its intermediate state when the swipe gesture ends quickly and the application has to continue sliding the card on its own. After the swipe gesture ends quickly, the map application of other embodiments slides the card to either its intermediate state or maximized/minimized state, depending on whether the velocity or acceleration of the swipe gesture is greater than a threshold amount (e.g., a first threshold amount to slide to the intermediate state, and a second threshold amount to slide to the maximized/minimized state).

On the other hand, after starting to slide the card upward or downward in response to an edge-initiated swipe gesture while the card is in the minimized or maximized state, the map application of other embodiments does not continue to slide the card upward or downward if the swipe gesture ends without reaching its intermediate state. In these embodiments, the map application returns the card to its minimized or maximized state. In still other embodiments, the map application continues to slide the card upward or downward in response to an upward or downward swipe gesture associated with a minimized or maximized card, but only continues this slide if the velocity or acceleration of the gesture at the start or end of the gesture was greater than a threshold velocity or acceleration. If the swipe gesture's velocity or acceleration is not greater than the threshold velocity or acceleration, the map application returns the card to its minimized or maximized state.

Figure 27:
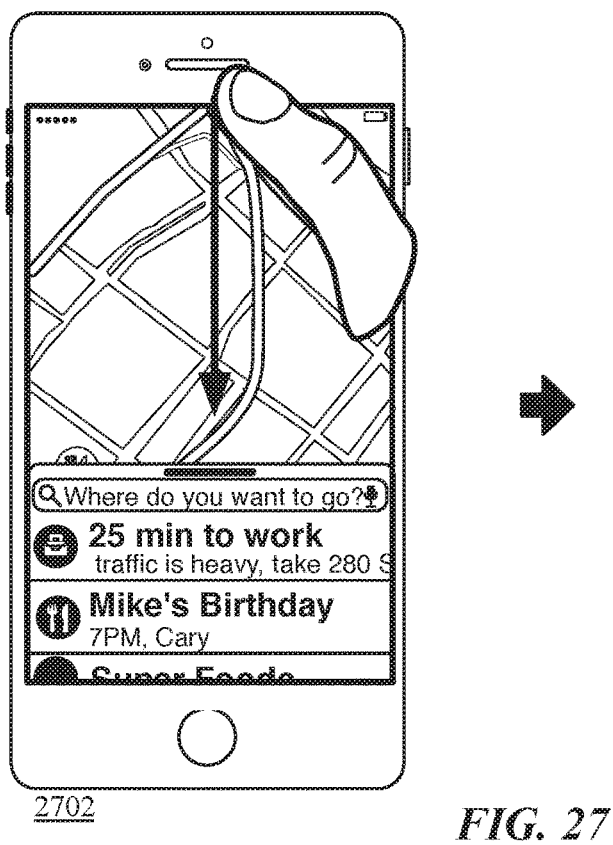
Figure 27:
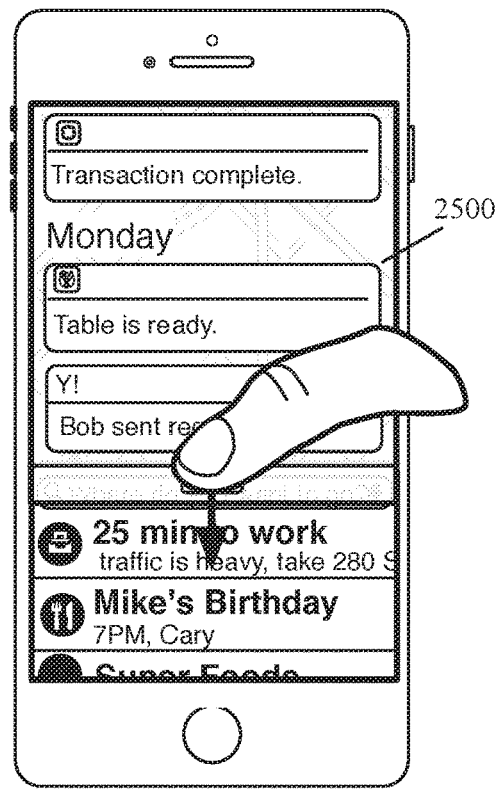
Figure 28:
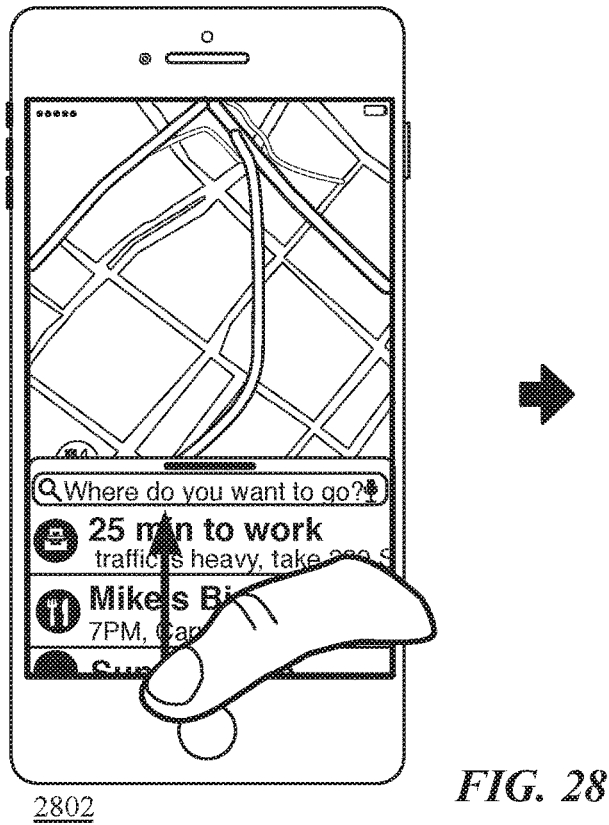
Figure 28:
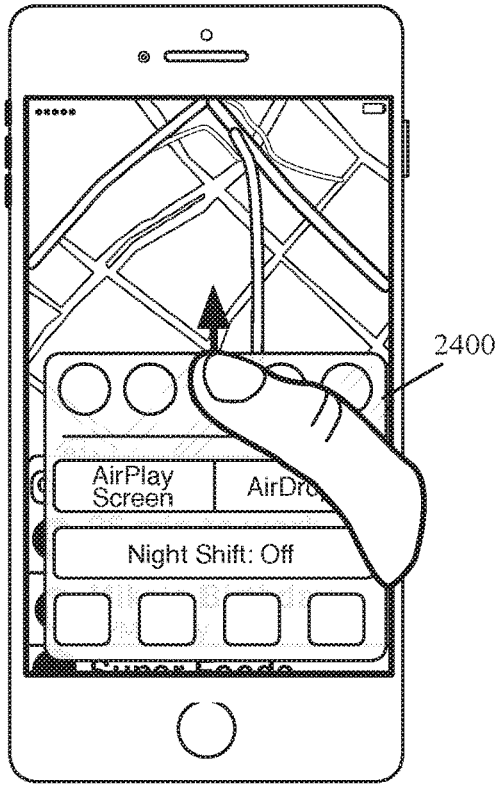

FIGS. 27-30 illustrate that even when the map application operates in the foreground, certain edge-initiated swipe operations in some embodiments do not direct the map application to resize a card. FIGS. 27-28 illustrate that the map application of some embodiments does not resize an intermediate card in response to edge-initiated downward or upward swipe operations. As shown in two stages 2702 and 2704 of FIG. 27, a downward swipe operation that starts at the top of the display screen does not direct the search card to change from its intermediate state to its minimized state in some embodiments, but rather directs the mobile device's operating system to slide down the notification center 2500. Similarly, as shown in two stages 2802 and 2804 of FIG. 28, an upward swipe operation that starts at the bottom of the display screen does not direct the search card to change from its intermediate state to its maximized state in some embodiments, but rather directs the mobile device's operating system to slide up the control center 2400.

Figure 29:
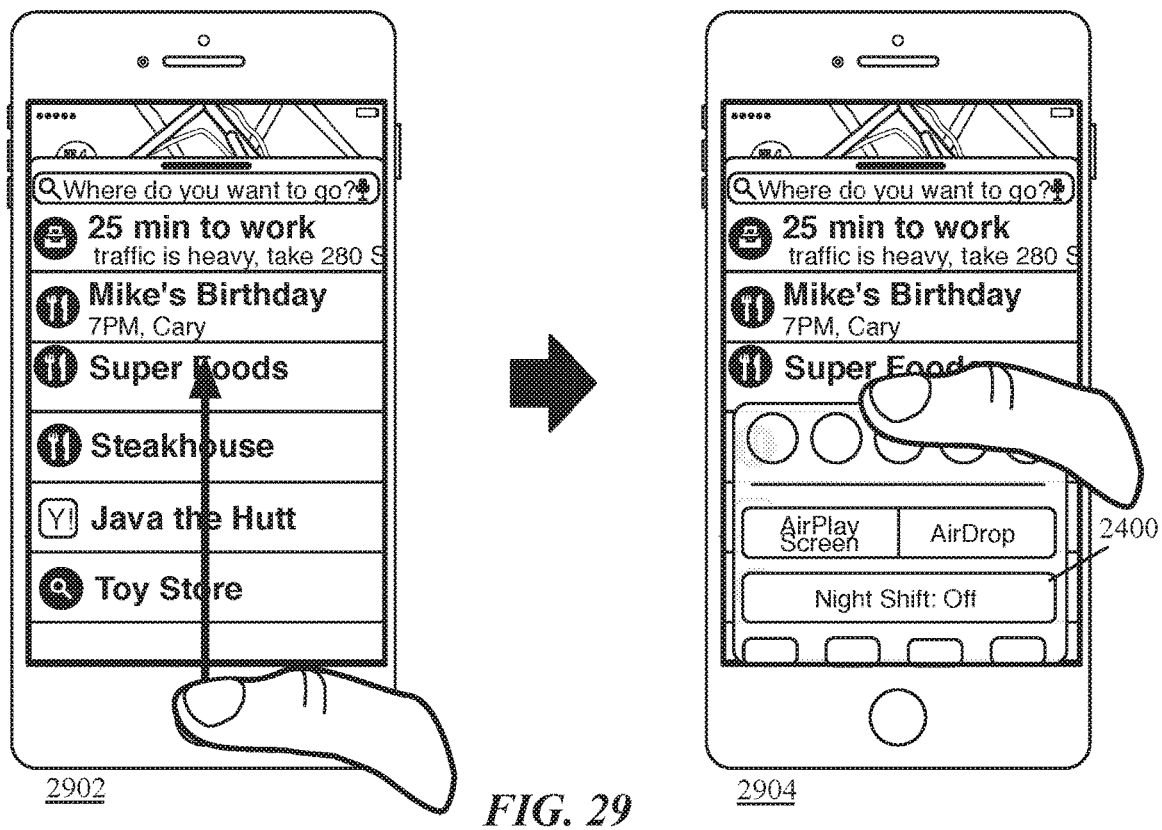
Figure 30:
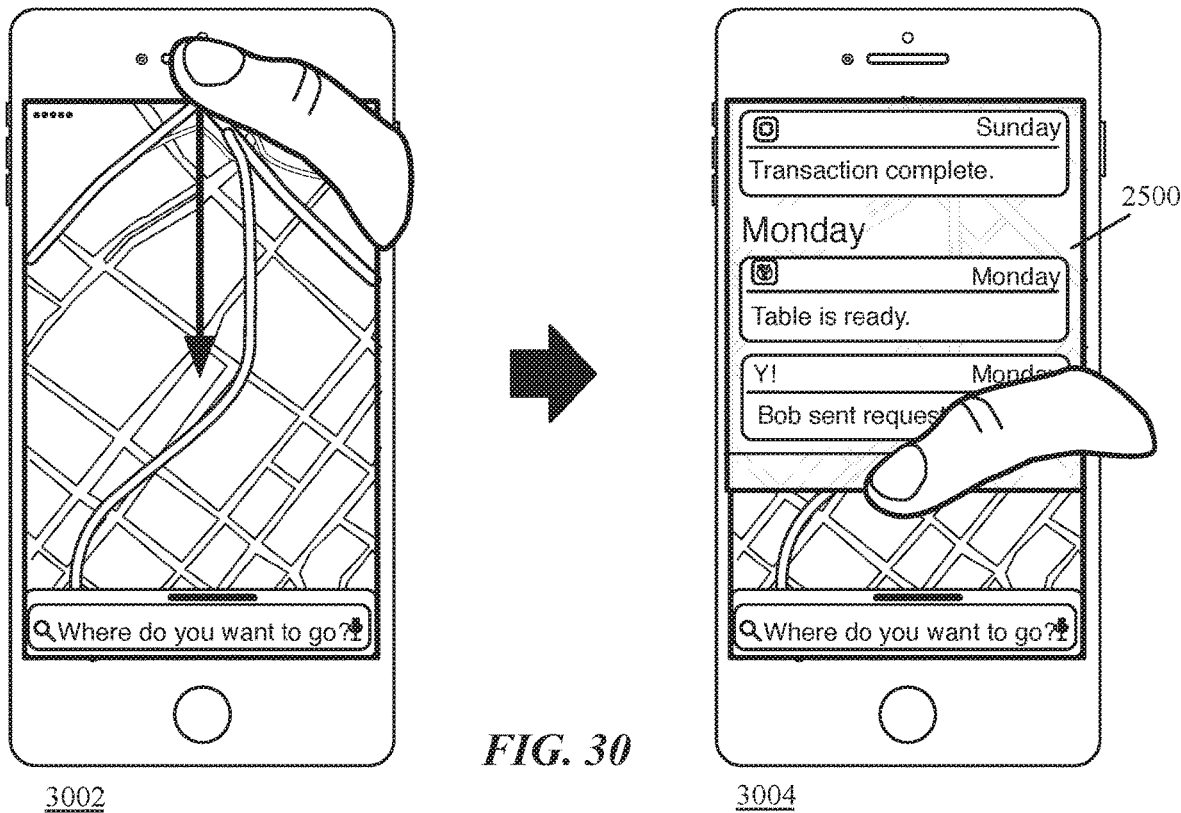

FIG. 29 illustrates that the map application of some embodiments does not move a maximized search card in response to edge-initiated upward swipe operation. Instead, as shown in two stages 2902 and 2904, the upward swipe operation that starts at the bottom of the display screen directs the mobile device's operating system to slide up the control center 2400. FIG. 30 illustrates that the map application of some embodiments does not affect a minimized search card (e.g., move it off-screen) in response to edge-initiated downward swipe operation. Instead, as shown in two stages 3002 and 3004, the downward swipe operation that starts at the top of the display screen directs the mobile device's operating system to slide down the notification center 2500.

Figure 31:
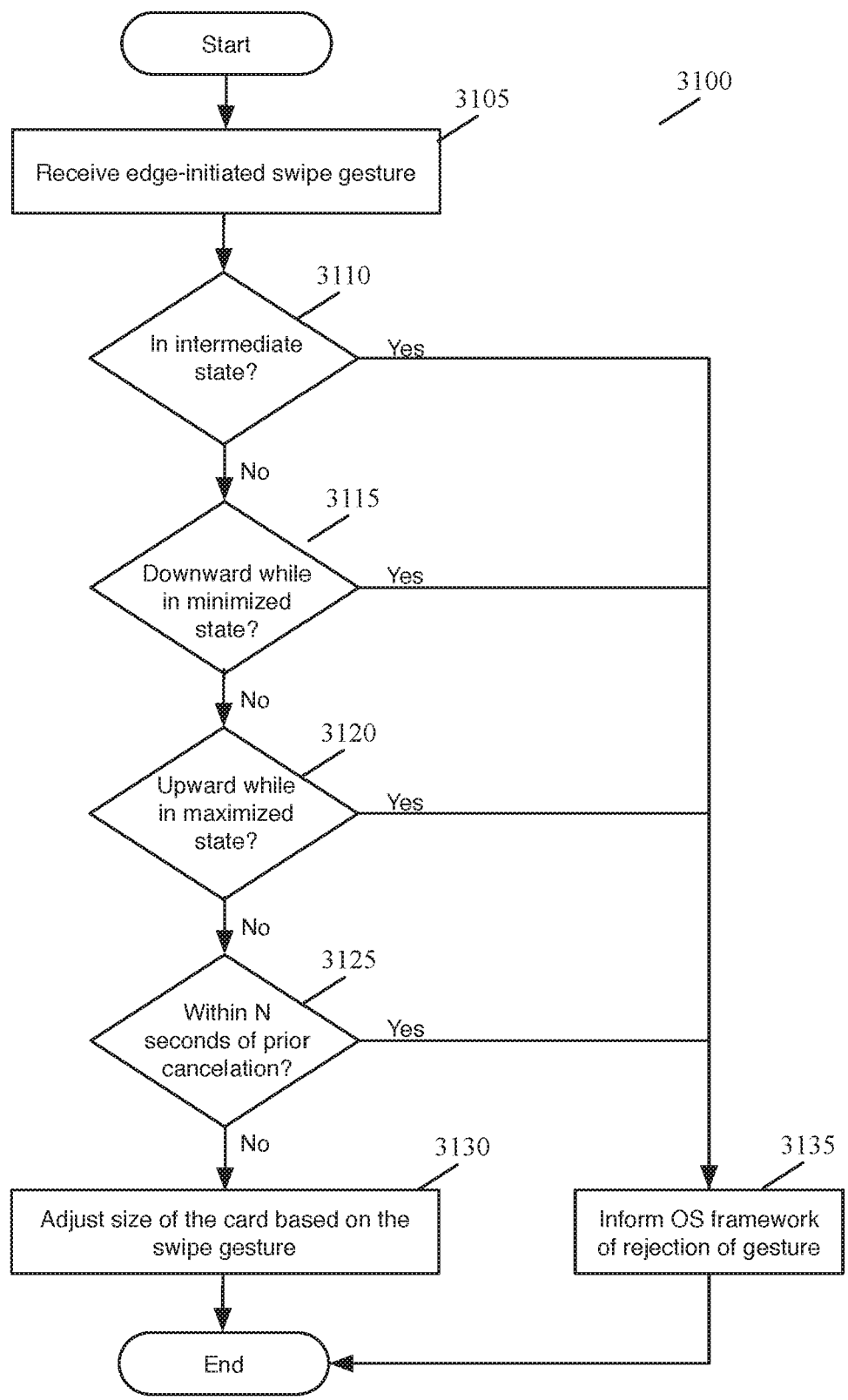

FIG. 31 illustrates a process 3100 that the map application performs when it receives an upward or downward swipe operation that starts at the bottom or top of the display screen. As shown, the process starts (at 3105) when the map application receives from the OS touch framework an indication of a swipe gesture input that starts at the bottom or the top of the display area that is provided to the map application to present its output display. This display area is the entire display screen in some embodiments.

In some embodiments, the OS touch framework provides this input to the map application when the map application operates in the foreground (i.e., the map application is generating the content currently displayed on the device's display screen). In these embodiments, the OS touch framework does not provide this input to the map application when the map application is not open or it operates in the background. For instance, when the device is displaying the home screen or another page that is generated by the OS, the upward or downward swipe operation that starts at the bottom or top of the display screen causes the mobile device in some embodiments to display the notification center 2500 or the control center 2400.

After receiving this input, the process determines (at 3110) whether the map application is currently displaying a card in its intermediate state. If so, the process informs (at 3135) the OS touch framework that the gesture input is not needed by the map application. The OS touch framework then provides this input to the next system or application process that should receive an upward or downward swipe operation that starts at the bottom or top of the display screen. In this manner, the gesture input that the map application rejects (at 3135) results in the display of the control center 2400 or the notification center 2500, as the OS framework then relays this input to an OS or application process that generates the display of these display areas. After 3135, the process ends.

When the process determines (at 3110) that the map application is not currently displaying a card in its intermediate state, the process determines (at 3115) whether the swipe gesture is a downward swipe that started at the top of the screen while the card is in a minimized state. If so, the process transitions to 3135 to reject the input, and then ends, because, as described above by reference to FIG. 30, a downward swipe while the card is minimized should not cause the map application to do anything but rather should cause the mobile device to present the notification center 2500.

When the process determines (at 3115) that the swipe gesture is not a downward swipe that started at the top of the screen while the card is in a minimized state, the process determines (at 3120) whether the swipe gesture is an upward swipe that started at the bottom of the screen while the card is in a maximized state. If so, the process transitions to 3135 to reject the input, and then ends, because, as described above by reference to FIG. 29, an upward swipe while the card is maximized should not cause the map application to do anything but rather should cause the mobile device to present the control center 2400.

When the process determines (at 3120) that the swipe gesture is not an upward swipe that started at the bottom of the screen while the card is in a maximized state, the swipe gesture is either an edge-initiated upward swipe while the card is in a minimized state, or an edge-initiated downward swipe while the card is in a maximized state. However, such operations in some embodiments do not necessarily cause the map application to increase or decrease the size of the minimized or maximized card. This is because the map application disregards such a swipe gesture when this gesture is received with N seconds (e.g., 3 seconds) of a prior edge-initiated swipe gesture that initially started to expand or contract the minimized or maximized card, but then was canceled before expanding or contracting the card (e.g., the gesture reversed course and returned the card back to its minimized or maximized state).

Therefore, when the process determines (at 3120) that the swipe gesture is not an upward swipe that started at the bottom of the screen while the card is in a maximized state, the process determines (at 3125) whether this swipe input is received within N seconds of a prior swipe input that was canceled before expanding or contracting the card. If so, the process transitions to 3135 to reject the input, and then ends. Otherwise, the process adjusts (at 3130) the size of the card based on the swipe gesture. Examples of such adjustments were described above by reference to FIG. 26. After 3130, the process ends.

Many of the above-described features and applications are implemented as software processes that are specified as a set of instructions recorded on a computer readable storage medium (also referred to as computer readable medium). When these instructions are executed by one or more computational or processing unit(s) (e.g., one or more processors, cores of processors, or other processing units), they cause the processing unit(s) to perform the actions indicated in the instructions. Examples of computer readable media include, but are not limited to, CD-ROMs, flash drives, random access memory (RAM) chips, hard drives, erasable programmable read-only memories (EPROMs), electrically erasable programmable read-only memories (EEPROMs), etc. The computer readable media does not include carrier waves and electronic signals passing wirelessly or over wired connections.

In this specification, the term "software" is meant to include firmware residing in read-only memory or applications stored in magnetic storage which can be read into memory for processing by a processor. Also, in some embodiments, multiple software inventions can be implemented as sub-parts of a larger program while remaining distinct software inventions. In some embodiments, multiple software inventions can also be implemented as separate programs. Finally, any combination of separate programs that together implement a software invention described here is within the scope of the invention. In some embodiments, the software programs, when installed to operate on one or more electronic systems, define one or more specific machine implementations that execute and perform the operations of the software programs.

Figure 32:
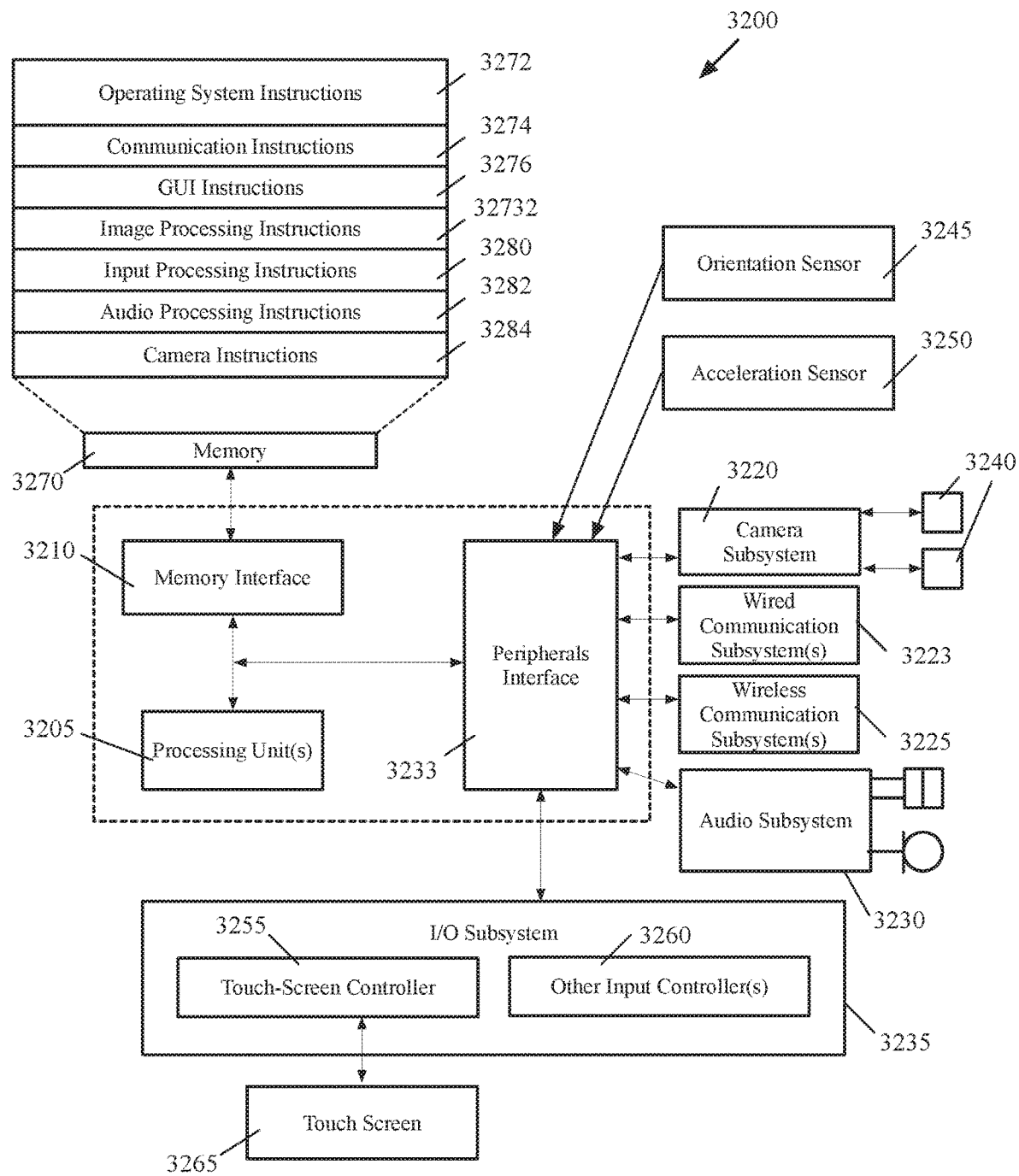
FIG. 32 is an example of an architecture of a mobile computing device that implements some embodiment of the invention.

The applications of some embodiments operate on mobile devices, such as smart phones (e.g., iPhones®) and tablets (e.g., iPads®). FIG. 32 is an example of an architecture 3200 of such a mobile computing device. Examples of mobile computing devices include smartphones, tablets, laptops, etc. As shown, the mobile computing device 3200 includes one or more processing units 3205, a memory interface 3210 and a peripherals interface 3215.

The peripherals interface 3215 is coupled to various sensors and subsystems, including a camera subsystem 3220, a wireless communication subsystem(s) 3225, an audio subsystem 3230, an I/O subsystem 3235, etc. The peripherals interface 3215 enables communication between the processing units 3205 and various peripherals. For example, an orientation sensor 3245 (e.g., a gyroscope) and an acceleration sensor 3250 (e.g., an accelerometer) is coupled to the peripherals interface 3215 to facilitate orientation and acceleration functions.

The camera subsystem 3220 is coupled to one or more optical sensors 3240 (e.g., a charged coupled device (CCD) optical sensor, a complementary metal-oxide-semiconductor (CMOS) optical sensor, etc.). The camera subsystem 3220 coupled with the optical sensors 3240 facilitates camera functions, such as image and/or video data capturing. The wireless communication subsystem 3225 serves to facilitate communication functions. In some embodiments, the wireless communication subsystem 3225 includes radio frequency receivers and transmitters, and optical receivers and transmitters (not shown in FIG. 32). These receivers and transmitters of some embodiments are implemented to operate over one or more communication networks such as a GSM network, a Wi-Fi network, a Bluetooth network, etc. The audio subsystem 3230 is coupled to a speaker to output audio (e.g., to output voice navigation instructions). Additionally, the audio subsystem 3230 is coupled to a microphone to facilitate voice-enabled functions, such as voice recognition (e.g., for searching), digital recording, etc.

The I/O subsystem 3235 involves the transfer between input/output peripheral devices, such as a display, a touch screen, etc., and the data bus of the processing units 3205 through the peripherals interface 3215. The I/O subsystem 3235 includes a touch-screen controller 3255 and other input controllers 3260 to facilitate the transfer between input/output peripheral devices and the data bus of the processing units 3205. As shown, the touch-screen controller 3255 is coupled to a touch screen 3265. The touch-screen controller 3255 detects contact and movement on the touch screen 3265 using any of multiple touch sensitivity technologies. The other input controllers 3260 are coupled to other input/control devices, such as one or more buttons. Some embodiments include a near-touch sensitive screen and a corresponding controller that can detect near-touch interactions instead of or in addition to touch interactions.

The memory interface 3210 is coupled to memory 3270. In some embodiments, the memory 3270 includes volatile memory (e.g., high-speed random access memory), non-volatile memory (e.g., flash memory), a combination of volatile and non-volatile memory, and/or any other type of memory. As illustrated in FIG. 32, the memory 3270 stores an operating system (OS) 3272. The OS 3272 includes instructions for handling basic system services and for performing hardware dependent tasks.

The memory 3270 also includes communication instructions 3274 to facilitate communicating with one or more additional devices; graphical user interface instructions 3276 to facilitate graphic user interface processing; image processing instructions 3278 to facilitate image-related processing and functions; input processing instructions 3280 to facilitate input-related (e.g., touch input) processes and functions; audio processing instructions 3282 to facilitate audio-related processes and functions; and camera instructions 3284 to facilitate camera-related processes and functions. The instructions described above are merely exemplary and the memory 3270 includes additional and/or other instructions in some embodiments. For instance, the memory for a smartphone may include phone instructions to facilitate phone-related processes and functions. The above-identified instructions need not be implemented as separate software programs or modules. Various functions of the mobile computing device can be implemented in hardware and/or in software, including in one or more signal processing and/or application specific integrated circuits.

While the components illustrated in FIG. 32 are shown as separate components, one of ordinary skill in the art will recognize that two or more components may be integrated into one or more integrated circuits. In addition, two or more components may be coupled together by one or more communication buses or signal lines. Also, while many of the functions have been described as being performed by one component, one of ordinary skill in the art will realize that the functions described with respect to FIG. 32 may be split into two or more integrated circuits.

Figure 33:
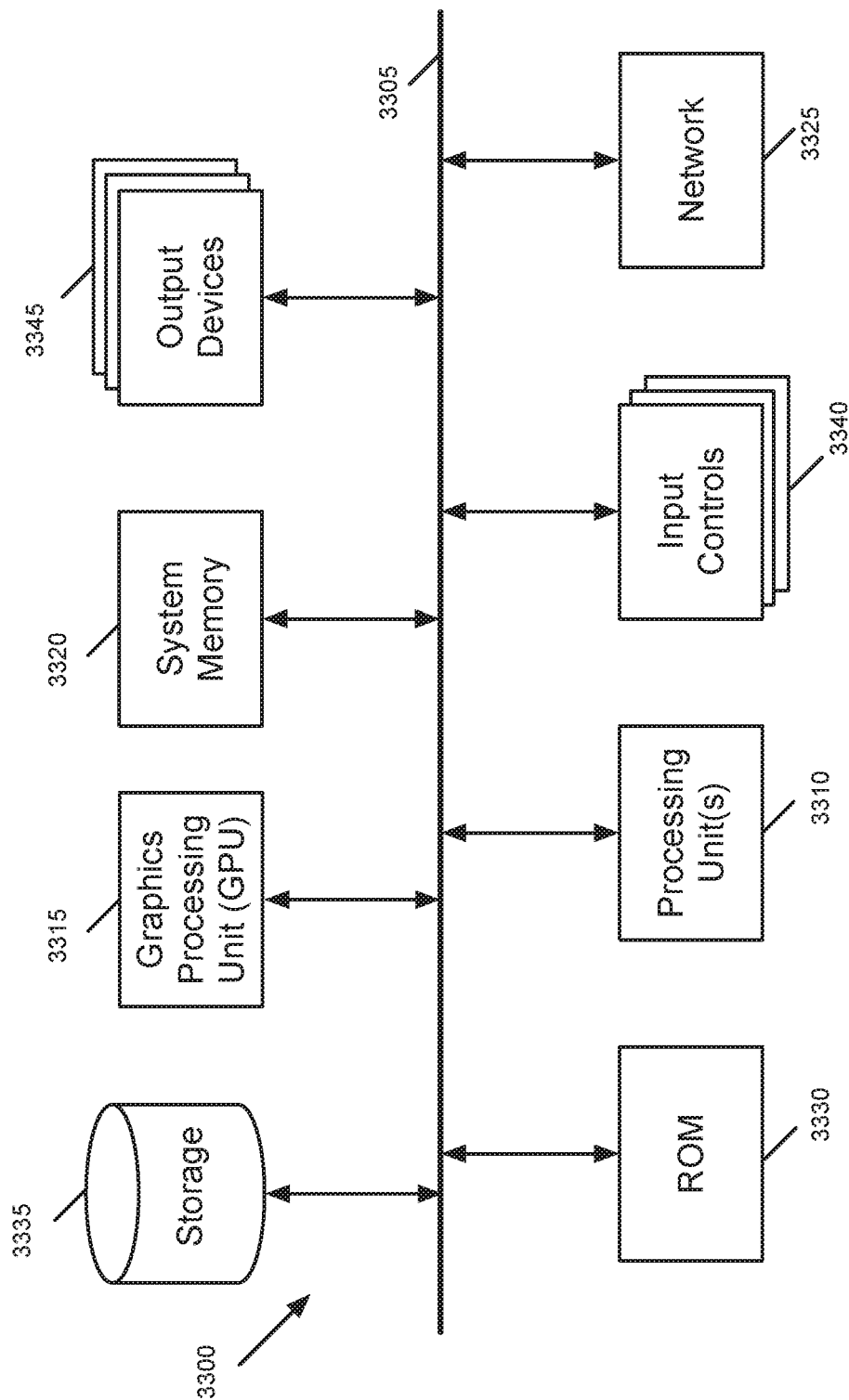
FIG. 33 is an example of another electronic system that implements some embodiment of the invention.

FIG. 33 conceptually illustrates another example of an electronic system 3300 with which some embodiments of the invention are implemented. The electronic system 3300 may be a computer (e.g., a desktop computer, personal computer, tablet computer, etc.), phone, PDA, or any other sort of electronic or computing device. Such an electronic system includes various types of computer readable media and interfaces for various other types of computer readable media. Electronic system 3300 includes a bus 3305, processing unit(s) 3310, a graphics processing unit (GPU) 3315, a system memory 3320, a network 3325, a read-only memory 3330, a permanent storage device 3335, input devices 3340, and output devices 3345.

The bus 3305 collectively represents all system, peripheral, and chipset buses that communicatively connect the numerous internal devices of the electronic system 3300. For instance, the bus 3305 communicatively connects the processing unit(s) 3310 with the read-only memory 3330, the GPU 3315, the system memory 3320, and the permanent storage device 3335.

From these various memory units, the processing unit(s) 3310 retrieves instructions to execute and data to process in order to execute the processes of the invention. The processing unit(s) may be a single processor or a multi-core processor in different embodiments. Some instructions are passed to and executed by the GPU 3315. The GPU 3315 can offload various computations or complement the image processing provided by the processing unit(s) 3310.

The read-only-memory (ROM) 3330 stores static data and instructions that are needed by the processing unit(s) 3310 and other modules of the electronic system. The permanent storage device 3335, on the other hand, is a read-and-write memory device. This device is a non-volatile memory unit that stores instructions and data even when the electronic system 3300 is off. Some embodiments of the invention use a mass-storage device (such as a magnetic or optical disk and its corresponding disk drive, integrated flash memory) as the permanent storage device 3335.

Other embodiments use a removable storage device (such as a floppy disk, flash memory device, etc., and its corresponding drive) as the permanent storage device. Like the permanent storage device 3335, the system memory 3320 is a read-and-write memory device. However, unlike storage device 3335, the system memory 3320 is a volatile read-and-write memory, such a random access memory. The system memory 3320 stores some of the instructions and data that the processor needs at runtime. In some embodiments, the invention's processes are stored in the system memory 3320, the permanent storage device 3335, and/or the read-only memory 3330. For example, the various memory units include instructions for processing multimedia clips in accordance with some embodiments. From these various memory units, the processing unit(s) 3310 retrieves instructions to execute and data to process in order to execute the processes of some embodiments.

The bus 3305 also connects to the input and output devices 3340 and 3345. The input devices 3340 enable the user to communicate information and select commands to the electronic system. The input devices 3340 include alpha-numeric keyboards and pointing devices (also called "cursor control devices"), cameras (e.g., webcams), microphones or similar devices for receiving voice commands, etc. The output devices 3345 display images generated by the electronic system or otherwise output data. The output devices 3345 include printers and display devices, such as cathode ray tubes (CRT) or liquid crystal displays (LCD), as well as speakers or similar audio output devices. Some embodiments include devices such as a touchscreen that function as both input and output devices.

Finally, as shown in FIG. 33, bus 3305 also couples electronic system 3300 to a network 3325 through a network adapter (not shown). In this manner, the computer can be a part of a network of computers (such as a local area network ("LAN"), a wide area network ("WAN"), or an Intranet), or a network of networks, such as the Internet. Any or all components of electronic system 3300 may be used in conjunction with the invention.

Some embodiments include electronic components, such as microprocessors, storage and memory that store computer program instructions in a machine-readable or computer-readable medium (alternatively referred to as computer-readable storage media, machine-readable media, or machine-readable storage media). Some examples of such computer-readable media include RAM, ROM, read-only compact discs (CD-ROM), recordable compact discs (CD-R), rewritable compact discs (CD-RW), read-only digital versatile discs (e.g., DVD-ROM, dual-layer DVD-ROM), a variety of recordable/rewritable DVDs (e.g., DVD-RAM, DVD-RW, DVD+RW, etc.), flash memory (e.g., SD cards, mini-SD cards, micro-SD cards, etc.), magnetic and/or solid state hard drives, read-only and recordable Blu-Ray® discs, ultra density optical discs, any other optical or magnetic media, and floppy disks. The computer-readable media may store a computer program that is executable by at least one processing unit and includes sets of instructions for performing various operations. Examples of computer programs or computer code include machine code, such as is produced by a compiler, and files including higher-level code that are executed by a computer, an electronic component, or a microprocessor using an interpreter.

While the above discussion primarily refers to microprocessor or multi-core processors that execute software, some embodiments are performed by one or more integrated circuits, such as application specific integrated circuits (ASICs) or field programmable gate arrays (FPGAs). In some embodiments, such integrated circuits execute instructions that are stored on the circuit itself. In addition, some embodiments execute software stored in programmable logic devices (PLDs), ROM, or RAM devices.

As used in this specification and any claims of this application, the terms "computer", "server", "processor", and "memory" all refer to electronic or other technological devices. These terms exclude people or groups of people. For the purposes of the specification, the terms display or displaying means displaying on an electronic device. As used in this specification and any claims of this application, the terms "computer readable medium," "computer readable media," and "machine readable medium" are entirely restricted to tangible, physical objects that store information in a form that is readable by a computer. These terms exclude any wireless signals, wired download signals, and any other ephemeral signals.

Figure 34:
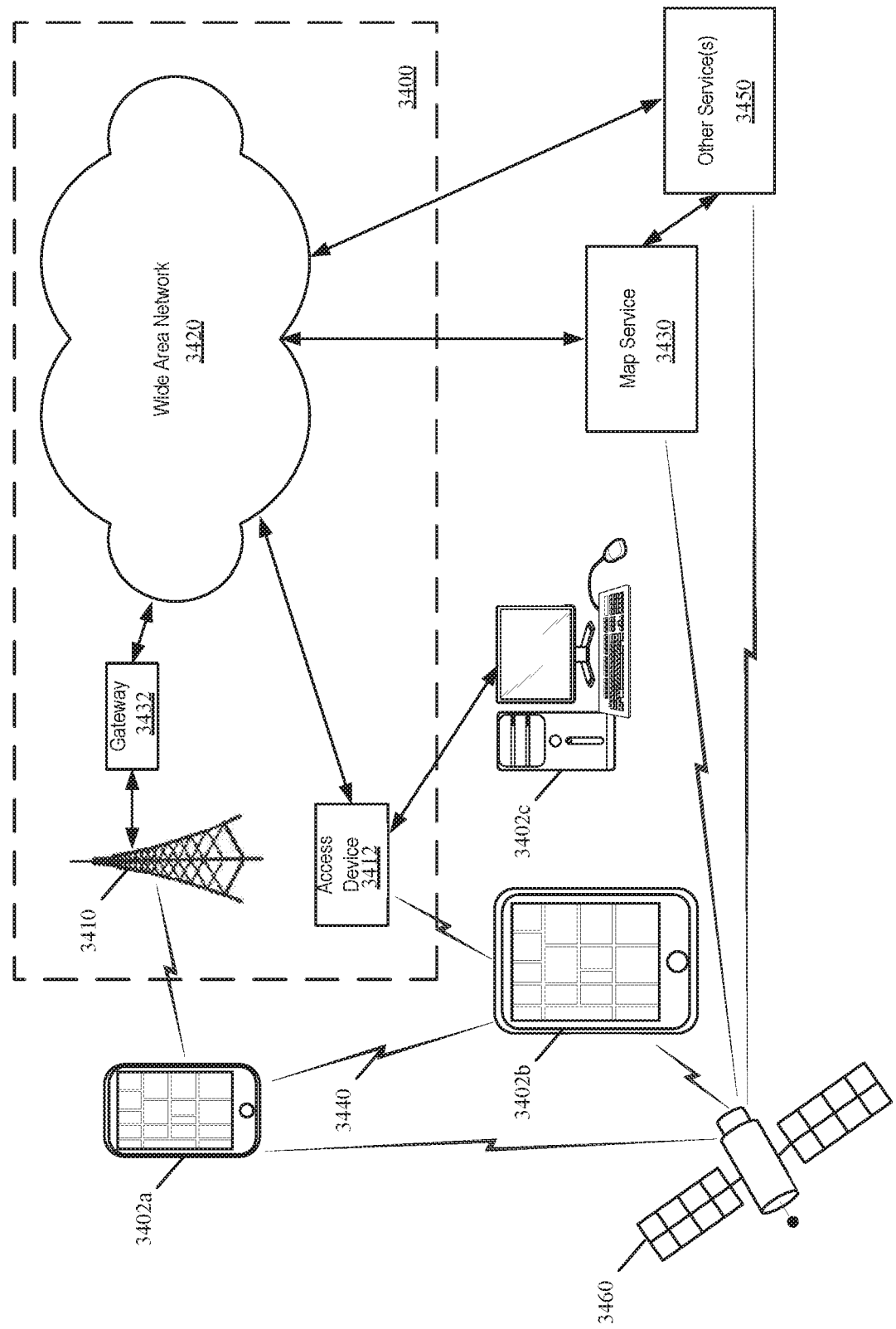
FIG. 34 illustrates a map service that is used by some embodiments of the invention.

Various embodiments may operate within a map service operating environment. FIG. 34 illustrates one possible embodiment of an operating environment 3400 for a map service (also referred to as a mapping service) 3430 and client devices 3402a-3402c. In some embodiments, devices 3402a, 3402b, and 3402c communicate over one or more wired or wireless networks 3410. For example, wireless network 3410, such as a cellular network, can communicate with a wide area network (WAN) 3420, such as the Internet, by use of gateway 3414. A gateway 3414 in some embodiments provides a packet oriented mobile data service, such as General Packet Radio Service (GPRS), or other mobile data service allowing wireless networks to transmit data to other networks, such as wide area network 3420. Likewise, access device 3412 (e.g., IEEE 802.11g wireless access device) provides communication access to WAN 3420.

The client devices 3402a and 3402b can be any portable electronic or computing device capable of communicating with a map service (e.g., smart phone, tablet, laptop computer, etc.). Device 3402c can be any non-portable electronic or computing device capable of communicating with a map service (e.g., desktop computer, etc.). These devices may be multifunction devices capable of various functions (e.g., placing phone calls, sending electronic messages, producing documents, etc.). Though the devices 3402a-3402c are not shown as each accessing the map service 3430 via either the wireless network 3410 and gateway 3414 or the access device 3412, one of ordinary skill in the art will recognize that the client devices of some embodiments may access the map service via multiple different wired and/or wireless protocols.

Devices 3402a-3402c can also establish communications by other means. For example, these devices may communicate with other wireless devices (e.g., other devices 3402b, cell phones, etc.) over the wireless network 3410 or through access device 3412. Likewise the devices 3402a-3402c can establish peer-to-peer communications 3440 (e.g., a personal area network) by use of one or more communication subsystems, such as Bluetooth® communication or similar peer-to-peer protocols.

Devices 3402a-3402c may also receive Global Positioning Satellite (GPS) signals from GPS satellites 3460. In addition, in some embodiments the map service 3430 and other services 3450 may also receive GPS signals from GPS satellites 3460.

A map service 3430 may provide map services for one or more client devices 3402a-3402c in communication with the map service 3430 through various communication methods and protocols. A map service 3430 in some embodiments provides map information (e.g., map tiles used by the client devices to generate a two-dimensional or three-dimensional map presentation) and other map-related data, such as two-dimensional map image data (e.g., aerial view of roads utilizing satellite imagery), three-dimensional map image data (e.g., traversable map with three-dimensional features, such as buildings), route and direction calculations (e.g., driving route data, ferry route calculations, directions between two points for a pedestrian, etc.), real-time navigation data (e.g., turn-by-turn visual navigation data in two or three dimensions), traffic data, location data (e.g., where the client device currently is located), and other geographic data (e.g., wireless network coverage, weather, traffic information, or nearby points-of-interest). In various embodiments, the map service data may include localized labels for different countries or regions. Localized labels may be utilized to present map labels (e.g., street names, city names, points of interest) in different languages on client devices. The client devices 3402a-3402c may utilize these map services to obtain the various map service data, then implement various techniques to process the data and provide the processed data to various entities (e.g., internal software or hardware modules, display screens of the client devices, external display screens, or other external systems or devices.

The map service 3430 of some embodiments provides map services by generating and distributing the various types of map service data listed above, including map information used by the client device to generate and display a map presentation. In some embodiments, the map information includes one or more map tiles. The map tiles may include raster image data (e.g., bmp, gif, jpg/jpeg/, png, tiff, etc. data) for display as a map presentation. In some embodiments, the map tiles provide vector-based map data, with the map presentation data encoded using vector graphics (e.g., svg or drw data). The map tiles may also include various other information pertaining to the map, such as metadata. Some embodiments also encode style data (e.g., used to generate textures) into the map tiles. The client device processes (e.g., renders) the vector and/or raster image data to generate a map presentation for display as a two-dimensional or three-dimensional map presentation. To transmit the map tiles to a client device 3402a-3402c, the map service 3430 of some embodiments, performs various optimization techniques to analyze a map tile before encoding the tile.

In some embodiments, the map tiles are generated by the map service 3430 for different possible display resolutions at the client devices 3402a-3402c. In some embodiments, the higher zoom levels may include more detail (e.g., more street level information, etc.). On the other hand, map tiles for lower zoom levels may omit certain data (e.g., the street level details would not be used when displaying the entire earth).

To generate the map information (e.g., map tiles), the map service 3430 may obtain map service data from internal or external sources. For example, satellite imagery used in map image data may be obtained from external services, or internal systems, storage devices, or nodes. Other examples may include, but are not limited to, GPS assistance servers, wireless network coverage databases, business or personal directories, weather data, government information (e.g., construction updates or road name changes), or traffic reports. Some embodiments of a map service may update map service data (e.g., wireless network coverage) for analyzing future requests from client devices.

In some embodiments, the map service 3430 responds to requests from the client devices 3402a-3402c for map information. The client devices may request specific portions of a map, or specific map tiles (e.g., specific tiles at specific zoom levels). In some embodiments, the client devices may provide the map service with starting locations (or current locations) and destination locations for a route calculations, and request turn-by-turn navigation data. A client device may also request map service rendering information, such as map textures or style sheets. Requests for other geographic data may include, but are not limited to, current location, wireless network coverage, weather, traffic information, or nearby points-of-interest.

The client devices 3402a-3402c that obtain map service data from the map service 3430 and render the data to display the map information in two-dimensional and/or three-dimensional views. Some embodiments display a rendered map and allow a user, system, or device to provide input to manipulate a virtual camera for the map, changing the map display according to the virtual camera's position, orientation, and field-of-view. Various forms and input devices are implemented to manipulate a virtual camera. In some embodiments, touch input, through certain single or combination gestures (e.g., touch-and-hold or a swipe) manipulate the virtual camera. Other embodiments allow manipulation of the device's physical location to manipulate a virtual camera. Other input devices to the client device may be used including, e.g., auditory input (e.g., spoken words), a physical keyboard, mouse, and/or a joystick. Some embodiments provide various visual feedback to virtual camera manipulations, such as displaying an animation of possible virtual camera manipulations when transitioning from two-dimensional map views to three-dimensional map views.

In some embodiments, a client device 3402a-3402c implements a navigation system (e.g., turn-by-turn navigation), which may be part of an integrated mapping and navigation application. A navigation system provides directions or route information, which may be displayed to a user. As mentioned above, a client device may receive both map image data and route data from the map service 3430. In some embodiments, the navigation feature of the client device provides real-time route and direction information based upon location information and route information received from a map service and/or other location system, such as a Global Positioning Satellite (GPS) system. A client device may display map image data that reflects the current location of the client device and update the map image data in real-time. The navigation features may provide auditory or visual directions to follow a certain route, and some embodiments display map data from the perspective of a virtual camera biased toward the route destination during turn-by-turn navigation.

The client devices 3402a-3402c of some embodiments implement various techniques to utilize the received map service data (e.g., optimized rendering techniques). In some embodiments, a client device locally stores some of the information used to render map data. For instance, client devices may store style sheets with rendering directions for image data containing style identifiers, common image textures (in order to decrease the amount of map image data transferred from the map service), etc. The client devices of some embodiments may implement various techniques to render two-dimensional and three-dimensional map image data, including, e.g., generating three-dimensional buildings out of two-dimensional building footprint data; modeling two-dimensional and three-dimensional map objects to determine the client device communication environment; generating models to determine whether map labels are seen from a certain virtual camera position; and generating models to smooth transitions between map image data.

In various embodiments, map service 3430 and/or other service(s) 3450 are configured to process search requests from any of the client devices. Search requests may include but are not limited to queries for businesses, addresses, residential locations, points of interest, or some combination thereof. Map service 3430 and/or other service(s) 3450 may be configured to return results related to a variety of parameters including but not limited to a location entered into an address bar or other text entry field (including abbreviations and/or other shorthand notation), a current map view (e.g., user may be viewing one location on the multifunction device while residing in another location), current location of the user (e.g., in cases where the current map view did not include search results), and the current route (if any). In various embodiments, these parameters may affect the composition of the search results (and/or the ordering of the search results) based on different priority weightings. In various embodiments, the search results that are returned may be a subset of results selected based on specific criteria including but not limited to a quantity of times the search result (e.g., a particular point of interest) has been requested, a measure of quality associated with the search result (e.g., highest user or editorial review rating), and/or the volume of reviews for the search results (e.g., the number of times the search result has been review or rated).

In various embodiments, map service 3430 and/or other service(s) 3450 are configured to provide auto-complete search results that are displayed on the client device, such as within the mapping application. For instance, auto-complete search results may populate a portion of the screen as the user enters one or more search keywords on the multifunction device. In some cases, this feature may save the user time as the desired search result may be displayed before the user enters the full search query. In various embodiments, the auto complete search results may be search results found by the client on the client device (e.g., bookmarks or contacts), search results found elsewhere (e.g., from the Internet) by map service 3430 and/or other service(s) 3450, and/or some combination thereof. As is the case with commands, any of the search queries may be entered by the user via voice or through typing. The multifunction device may be configured to display search results graphically within any of the map display described herein. For instance, a pin or other graphical indicator may specify locations of search results as points of interest. In various embodiments, responsive to a user selection of one of these points of interest (e.g., a touch selection, such as a tap), the multifunction device is configured to display additional information about the selected point of interest including but not limited to ratings, reviews or review snippets, hours of operation, store status (e.g., open for business, permanently closed, etc.), and/or images of a storefront for the point of interest. In various embodiments, any of this information may be displayed on a graphical information card that is displayed in response to the user's selection of the point of interest.

In various embodiments, map service 3430 and/or other service(s) 3450 provide one or more feedback mechanisms to receive feedback from client devices 3402a-3402c. For instance, client devices may provide feedback on search results to map service 3430 and/or other service(s) 3450 (e.g., feedback specifying ratings, reviews, temporary or permanent business closures, errors etc.); this feedback may be used to update information about points of interest in order to provide more accurate or more up-to-date search results in the future. In some embodiments, map service 3430 and/or other service(s) 3450 may provide testing information to the client device (e.g., an A/B test) to determine which search results are best. For instance, at random intervals, the client device may receive and present two search results to a user and allow the user to indicate the best result. The client device may report the test results to map service 3430 and/or other service(s) 3450 to improve future search results based on the chosen testing technique, such as an A/B test technique in which a baseline control sample is compared to a variety of single-variable test samples in order to improve results.

While the invention has been described with reference to numerous specific details, one of ordinary skill in the art will recognize that the invention can be embodied in other specific forms without departing from the spirit of the invention. Therefore, one of ordinary skill in the art would understand that the invention is not to be limited by the foregoing illustrative details, but rather is to be defined by the appended claims

What is claimed is:

1. A method implemented by a map application executing on a computing device, the method comprising:
   displaying, on a display screen, a first display area to display a map;
   displaying, on the display screen, a second display area over the first display area to overlap a first portion of the first display area;
   defining a bounding box around the second display area, wherein a top edge of the bounding box lies above a top edge of the second display area;
   receiving input to pan the map on a second portion of the first display area not overlapped by the second display area;
   determining that the input on the first display area reaches the top edge of the bounding box; and
   based on the determination, reducing a size of the second display area.

2. The method of claim 1, wherein reducing the size of the second display area further comprises sliding the second display area over the first display area so as to overlap a smaller portion of the first display area.

3. The method of claim 1, wherein reducing the size of the second display area further comprises removing the display of the second display area completely from the display screen.

4. The method of claim 1, wherein reducing the size of the second display area further comprises starting an animation that reduces the size of the second display area based on a speed of the input pan.

5. The method of claim 1, wherein said second display area is for displaying information about items displayed on the map.

6. The method of claim 1, wherein displaying the second display area further comprises sliding the second display area over the first display area from the bottom side of the first display area.

7. The method of claim 1, wherein reducing the size of the second display area further comprises sliding the second display area off the first display area towards the bottom side of the first display area.

8. A method implemented by an application that executes on a device with an operating system, the method comprising:
   displaying, on a touch-sensitive display screen, a first display area;
   displaying, on the display screen, a second display area over the first display area to overlap a first portion of the first display area;
   receiving touch swipe input that starts at an edge of one of the first display area and the second display area; and
   rejecting, by the application, the received swipe input;
   causing, by the application, the operating system to display a third display area that overlays over the first and second display areas based on the received swipe input, after the application rejects the received swipe input.

9. The method of claim 8, wherein the second display area is in a first display state, further comprising:
   in response to the touch swipe input, modifying the size of the second display area to conform the second display area to a second display state, wherein the first display state is a minimized state; and
   the second display state is an intermediate state or a maximized state.

10. The method of claim 9,
    wherein the swipe input is received from the bottom of the display screen; and
    modifying the size of the second display area further comprises sliding the second display area from the minimized first display state to an intermediate or maximized second display state.

11. The method of claim 8, wherein rejecting the swipe further comprises rejecting the swipe when the swipe input is received from the top of the display screen.

12. The method of claim 9, wherein
- the swipe input is received from the top of the display screen; and
- modifying the size of the second display area further comprises sliding the second display area down from the maximized first display state to an intermediate or minimized second display state.

13. The method of claim 8, wherein rejecting the swipe further comprises rejecting the swipe when the swipe input is received from the bottom of the display screen.

14. The method of claim 8, wherein the third display area presents a set of controls or a set of data provided by the operating system.

15. The method of claim 8, wherein the application is a map application, the first display area displays a map, and the second display area displays information about locations displayed on the map.

16. The method of claim 8, wherein the device is a mobile device with the touch-sensitive display screen.

17. The method of claim 16, further comprising:
- causing, by the map application, the operating system to generate a third display area that does not modify the first display area and the second display area.

\* \* \* \* \*